(12) United States Patent
Nashiki

(10) Patent No.: US 8,704,472 B2
(45) Date of Patent: Apr. 22, 2014

(54) BRUSHLESS ELECTRIC MOTOR PROVIDED WITH ROTOR HAVING INTERMEDIATE MAGNETIC POLE

(75) Inventor: Masayuki Nashiki, Komaki (JP)

(73) Assignee: Denso Corporation, Kariya (JP)

( * ) Notice: Subject to any disclaimer, the term of this patent is extended or adjusted under 35 U.S.C. 154(b) by 217 days.

(21) Appl. No.: 13/277,463

(22) Filed: Oct. 20, 2011

(65) Prior Publication Data

US 2012/0235615 A1    Sep. 20, 2012

(30) Foreign Application Priority Data

Oct. 20, 2010 (JP) ................................ 2010-235311

(51) Int. Cl.
*H02K 29/03* (2006.01)
(52) U.S. Cl.
USPC ............ 318/400.23; 310/156.53; 310/156.55; 310/156.54; 310/156.44; 310/156.45; 310/209; 310/154.26; 310/154.45; 310/156.01; 318/400.28; 318/400.01; 318/400.25; 318/700
(58) Field of Classification Search
USPC ........ 310/209, 156.53, 156.55, 40 R, 156.54, 310/156.51, 156.52, 156.44, 156.45, 310/156.43, 156.01, 156.07, 156.08, 310/156.11, 156.15, 154.26, 154.45; 318/400.01, 700, 400.28, 400.2, 318/400.23, 400.25
See application file for complete search history.

(56) References Cited

U.S. PATENT DOCUMENTS

| | | | | |
|---|---|---|---|---|
| 4,315,171 A | * | 2/1982 | Schaeffer | 310/49.53 |
| 4,739,203 A | * | 4/1988 | Miyao et al. | 310/67 R |
| 4,847,526 A | * | 7/1989 | Takehara et al. | 310/185 |
| 4,882,515 A | * | 11/1989 | Radomski | 310/263 |
| 5,751,089 A | * | 5/1998 | Stridsberg | 310/266 |
| 6,051,903 A | * | 4/2000 | Pengov | 310/168 |
| 6,133,664 A | * | 10/2000 | Torok et al. | 310/181 |
| 6,274,960 B1 | * | 8/2001 | Sakai et al. | 310/156.02 |
| 6,369,481 B1 | * | 4/2002 | Bahn | 310/166 |
| 6,765,321 B2 | * | 7/2004 | Sakamoto | 310/49.08 |
| 7,105,974 B2 | | 9/2006 | Nashiki | |

(Continued)

FOREIGN PATENT DOCUMENTS

| | | |
|---|---|---|
| CN | 1577785 | 2/2005 |
| CN | 101189782 | 5/2008 |

(Continued)

OTHER PUBLICATIONS

Japanese Official Action dated Sep. 18, 2012 issued in corresponding Japanese Application No. 2010-235311, with English translation.

(Continued)

*Primary Examiner* — Rita Leykin
(74) *Attorney, Agent, or Firm* — Nixon & Vanderhye PC

(57) ABSTRACT

An AC electric motor includes an annular A-phase winding WA wound in the circumferential direction of a stator, a stator pole group SPGA configured to generate magnetic flux φA to interlink with the A-phase winding WA, an annular B-phase winding WB wound in the circumferential direction, and a stator pole group SPGB configured to generate magnetic flux φB to interlink with the B-phase winding WB. The motor additionally includes a third stator pole group SPGC, N and S magnetic poles of the rotor, and X magnetic poles, which serve as third rotor poles, showing magnetic characteristics between the N and S magnetic poles of the rotor. DC currents are supplied to the A-phase and B-phase windings WA and WB to generate rotational torque.

20 Claims, 37 Drawing Sheets

(56) References Cited

U.S. PATENT DOCUMENTS

| | | |
|---|---|---|
| 7,135,802 B2 | 11/2006 | Seki et al. |
| 7,239,061 B2 * | 7/2007 | Huang et al. ............ 310/211 |
| 7,843,078 B2 * | 11/2010 | Santiago et al. ............ 290/44 |
| 8,044,548 B2 * | 10/2011 | Sakai et al. ............ 310/156.43 |
| 8,120,215 B2 * | 2/2012 | Nashiki ............ 310/49.45 |
| 8,334,667 B2 * | 12/2012 | Sakai et al. ............ 318/494 |
| 2005/0007139 A1 | 1/2005 | Iwagami et al. |
| 2005/0012427 A1 | 1/2005 | Seki et al. |
| 2005/0099082 A1 | 5/2005 | Nashiki |
| 2006/0197397 A1 | 9/2006 | Takahashi et al. |
| 2008/0197739 A1 | 8/2008 | Nashiki |
| 2009/0021089 A1 | 1/2009 | Nashiki |
| 2009/0134734 A1 | 5/2009 | Nashiki |
| 2009/0236930 A1 | 9/2009 | Nashiki |
| 2010/0123426 A1 | 5/2010 | Nashiki et al. |

FOREIGN PATENT DOCUMENTS

| | | |
|---|---|---|
| CN | 101847919 | 9/2010 |
| JP | H04-244771 | 9/1992 |
| JP | H06-086583 | 3/1994 |
| JP | H11-164580 | 6/1999 |
| JP | 2002-238190 | 8/2002 |
| JP | 2005-033965 | 2/2005 |
| JP | 2006-246583 | 9/2006 |
| JP | P3944140 | 7/2007 |
| JP | P4007339 | 11/2007 |
| JP | 2010-119263 | 5/2010 |
| WO | WO 2006/126552 | 11/2006 |

OTHER PUBLICATIONS

Office Action (17 pages) dated Nov. 26, 2013, issued in corresponding Chinese Application No. 201110329881.8 and English translation (10 pages).

* cited by examiner

| ROTATIONAL RANGE OF ROTOR | SA<br>0 ~ 60° | SB<br>60 ~ 180° | SC<br>180 ~ 240° | SD<br>240 ~ 360° |
|---|---|---|---|---|
| A-PHASE VOLTAGE | H | H | H | L |
| B-PHASE VOLTAGE | H | L | H | H |
| DETERMINATION RANGE | SA or SC | SB | SC or SA | SD |
| ROTATIONAL POSITION | 0 ~ 60° or<br>180 ~ 240° | 60 ~ 180° | 180 ~ 240°<br>or 0 ~ 60° | 240 ~ 360° |

(a) (b)

BRUSHLESS ELECTRIC MOTOR PROVIDED WITH ROTOR HAVING INTERMEDIATE MAGNETIC POLE

CROSS REFERENCE TO RELATED APPLICATIONS

This application is based on and claims the benefit of priority from earlier Japanese Patent Application No. 2010-235311 filed Oct. 20, 2010, the description of which is incorporated herein by reference.

BACKGROUND OF THE INVENTION

1. Technical Field

The present invention relates to a motor including a control circuit, which is installed such as in automobiles or trucks, and in particular to a brushless-type electric motor as an AC electric motor which is provided with a rotor having an intermediate magnetic pole exerting magnetic characteristics intermediate of an N magnetic pole and an S magnetic pole.

2. Related Art

Three-phase AC motors are used for various purposes. One of the recently suggested three-phase AC motors is provided with annular-shape windings and configured such that the magnetic flux in the motor has its path along the rotor shaft. FIG. 49 is a schematic vertical cross-sectional view illustrating the configuration of such a motor as an example. In the figure, reference Q11 indicates a rotor shaft, reference Q12 indicates N-pole permanent magnets and S-pole permanent magnets mounted on the surface of the rotor, reference Q13 indicates U-phase stator poles, reference Q14 indicates V-phase stator poles and reference Q15 indicates W-phase stator poles. Further, reference Q1A indicates a back yoke portion of a stator magnetic path, reference Q16 indicates an annular U-phase winding provided in the circumferential direction, references Q17 and Q18 indicate annular V-phase windings provided similarly, reference Q19 is an annular W-phase winding provided similarly, reference Q1B is a motor case and reference Q1C is a bearing. FIG. 50 is a linear development view illustrating a circumferential surface configuration of the permanent magnets Q12. In the figure, the circumferential direction corresponds to the horizontal direction in which angle is indicated in mechanical angle. FIG. 50 shows an example of an eight-pole rotor, in which reference Q21 indicates N-pole permanent magnets and reference Q22 indicates S-pole permanent magnets.

FIG. 51 is a linear development view illustrating a circumferential configuration of U-, V- and W-phase stator poles opposed to the permanent magnets of the rotor shown in FIG. 49. The U-, V- and W-phase stator poles Q13, Q14 and Q15 are arranged so as to have a phase difference of 30° in mechanical angle and 120° in electrical angle. Various modifications may be applied to the configuration of the stator poles of the individual phases, which is opposed to the permanent magnets of the rotor. For example, as shown in FIG. 52, the stator poles may each have a rectangular shape. In the figure, reference Q31 indicates U-phase stator poles, reference Q32 indicates V-phase stator poles and reference Q33 indicates W-phase stator poles.

Further, as shown in FIG. 53, the stator poles of the individual phases may have a configuration in which trapezoidal shape and rhombic shape are combined. In the figure, reference Q41 indicates U-phase stator poles, reference Q42 indicates V-phase stator poles and reference Q43 indicates W-phase stator poles. In the stator configuration, the phases each have an equal area with a relative phase difference of 120° in electrical angle therebetween. In this case, magnetic flux passing through the stator poles has a value that changes with rotational angle θr of the rotor. The values of the magnetic flux are approximate to a sinusoidal waveform in contrast to a rectangular waveform obtained from the configuration shown in FIG. 52. Thus, the stator configuration shown in FIG. 52 has an effect of reducing torque ripple.

FIG. 54 shows the U-phase winding Q16 among the annular-shape windings of the phases shown in FIG. 49. FIG. 54 shows by (a) a front view, and shows by (b) a side view. In the figure, a reference U indicates one end of the U-phase winding Q16 and a reference N indicates the other end of the U-phase winding Q16. The V-phase windings Q17 and Q18 and the W-phase winding Q19 shown in FIG. 49 also have the same shape as the U-phase winding Q16 shown in FIG. 54.

FIG. 55 is a linear development view illustrating a circumferential configuration of the annular-shape windings of the phases shown in FIG. 49. The U- and V-phase windings Q16 and Q17 shown in FIG. 49 are wound in parallel sharing each of the slots and thus may be combined into a single loop winding. Specifically, the U-phase winding Q16, which is negative, and the V-phase winding Q17, which is positive, may be equivalently replaced by a winding Q71 shown in FIG. 56. However, the current supplied to the winding Q71 is required to be a sum of the currents supplied to the U- and V-phase windings Q16 and Q17.

In this case, the value of the current passing through the slots is the same between the configurations shown in FIGS. 55 and 56. Thus, electromagnetically, these configurations are equivalent. The combined winding as shown in FIG. 56 is advantageous in that the winding is simplified. Further, the phase difference in electrical angle is 60° between the negative U-phase current (−Iu) supplied to the U-phase winding Q16 and the positive V-phase current Iv supplied to the V-phase winding Q17. Accordingly, an effective value of the sum of these currents (−Iu+Iv) is smaller by a factor of 0.866 than that of the currents before being combined. In terms of Joule heat of the windings, the sum corresponds to the square of the effective value and thus is smaller by a factor of 0.75 than that of the currents before being combined, thereby reducing the generated heat by 25%.

Similarly, the V- and W-phase windings Q18 and Q19 shown in FIG. 55 may be replaced by a winding Q72 shown in FIG. 56 for simplification. When the windings shown in FIG. 56 are adopted, the motor shown in FIG. 49 turns to a three-phase AC motor with two windings.

FIG. 57 shows an example of connection with a three-phase AC inverter.

A current (−Iu+Iv) is supplied to an end 45E of the winding Q71, while a current (−Iv+Iw) is supplied to an end 45F of the winding Q72. On the other hand, a current (−Iw+Iu) is supplied to a connecting point 45G between the windings Q71 and Q72. When the three-phase currents Iu, Iv and Iw have a phase difference of 120° therebetween and form sinusoidal waves of the same amplitude, the currents (−Iu+Iv), (−Iv+Iw) and (−Iw+Iu) will have a phase difference of 120° therebetween and will form sinusoidal waves of the same amplitude. References 451, 452, 453, 454, 455 and 456 indicate transistors configuring the three-phase inverter. References 457, 458, 459, 45A, 45B and 45C indicate diodes connected in parallel with the respective transistors.

It should be noted that JP-B-3944140 discloses a motor having a configuration as shown in FIG. 49. Also, JP-B-4007339 discloses a motor in which the windings Q16, Q17, Q18 and Q19 of the motor shown in FIG. 49 are configured by the simplified windings Q71 and Q72 as shown in FIG. 56.

As described above, a motor as shown in FIGS. 49 and 56 has a simple configuration including windings having an annular-shape. However, since such a motor is required to be applied with three-phase AC voltages and currents, the control circuit has a configuration as shown in FIG. 57, requiring six transistors. Thus, such a motor raises a problem of cost and size. Further, as to the paths of the currents of the three phases, two transistors are connected in series to a DC power source 2E to supply current to the windings. Accordingly, the heat generated due to the voltage drop of the transistors is desired to be improved and reduced.

In recent years, motors are mass-produced, which are used for household electrical appliances, accessories of automobiles and the like. For example, a motor having a size of about 50 mm in diameter is produced by realizing a technique of incorporating a power source for driving the motor, a control circuit, an inverter and the like into a single semiconductor chip smaller than 10 mm×10 mm, and integrally incorporating the semiconductor chip into a part of the motor.

Thus, reduction in both of the cost and the size of a motor system is underway. Accordingly, various techniques are sought for, such as circuit technique, signal detection technique, temperature-change-handling technique, and motor integration technique, which are dedicated to the realization of the reduction. For example, such techniques include a so-called sensorless control technique that can eliminate the use of a position-detection sensor, or a current detection technique that can reduce the size and cost of a device and cause only a small load due to generated heat.

In such applications as various types of fans used near the ears of persons, motors are required to be quite silent. In this way, motor characteristics contributing not only to reducing size and cost but also realizing high-level motor systems are increasingly sought for.

SUMMARY OF THE INVENTION

Therefore, motors having a simpler structure than conventional ones as set forth above are desired to be provided at lower production cost.

An exemplary first embodiment provides a brushless electric motor comprising: a stator having a circumferential direction; a rotor arranged to face with the stator and to be rotatable; an annular A-phase winding WA wound in the circumferential direction of the stator; a stator pole group SPGA configured to generate magnetic flux φA to interlink with the A-phase winding WA; an annular B-phase winding WB wound in the circumferential direction of the stator; a stator pole group SPGB configured to generate magnetic flux φB to interlink with the B-phase winding WB; a third stator pole group SPGC arranged at the stator; N magnetic poles arranged at the rotor; S magnetic poles arranged at the rotor; and X magnetic poles arranged at the rotor as third rotor poles showing a magnetic characteristic which is between magnetic characteristics of the N magnetic poles and the S magnetic poles of the rotor, wherein at least one of the stator pole groups SPGA and SPGB has a magnetic pole width SPH of 180 degrees or less in an electrical angle in the circumferential direction.

With this configuration, unidirectional torque TT1 is generated in a range of 180° or more in electrical angle by supplying current of a certain value to one winding. The magnitude of the torque TT1 is almost equivalent to that of the torque generated by motors of conventional art.

The polarity of N magnetic pole and S magnetic pole of the rotor is determined based on the relationship of the rotor with the current direction in the windings. When the current direction is reversed between the windings, N magnetic pole and S magnetic pole are reversed.

An exemplary second embodiment is provide such that, in the motor according to the first embodiment, the A-phase winding WA is configured to receive a one-way current which serves as a direct current IA, the direct current IA being increased or decreased for control thereof, and the B-phase winding WB is configured to receive a one-way current which serves as a direct current IB, the direct current IB being increased or decreased for control thereof.

With this configuration, a unidirectional current, i.e. DC current, is supplied to each of the two windings according to the rotational position θr of the rotor to thereby obtain continuous rotation torque. Accordingly, this simplifies a control circuit that supplies current to the windings and thus contributes to reducing cost.

An exemplary third embodiment is provided such that, in the motor according to the first embodiment, the X magnetic pole of the rotor is formed with use of an N magnetic pole of a permanent magnet and an S magnetic pole of a permanent magnet.

With this configuration, each X magnetic pole, i.e. a third pole of the rotor, is configured by combining the N and S magnetic poles of the permanent magnets. Accordingly, an attraction force FX acting between the X magnetic poles of the rotor and the stator poles is substantially equivalent to an attraction force FNS acting between the N- or S-poles of the permanent magnets and the stator poles. Thus, the amount of distortion in the radial direction of the stator caused by an attraction force can be reduced to thereby realize a silent motor. Further, as to a circumferential attraction force, the difference is small between the X magnetic poles and N magnetic poles and between the X magnetic poles and S magnetic poles to thereby reduce cogging torque.

An exemplary fourth embodiment is provided such that, in the motor according to the first embodiment, the stator pole group SPGC is composed of C-phase stator poles SPC each having a circumferential width HSC and the stator pole group SPGA is composed of A-phase stator poles SPA each having a circumferential width HAS, the circumferential width HSC being smaller than the circumferential width HAS, and the stator pole group SPGB is composed of B-phase stator poles SPB each having a circumferential width HSB, the circumferential width HSC being smaller than the circumferential width HSB.

With this configuration, magnetic flux φa passing through the A-phase stator poles SPA and magnetic flux φb passing through the B-phase stator poles SPB are increased. Thus, the torque generated by the motor is increased.

An exemplary fifth embodiment is provided such that, in the motor according to the first embodiment, the N magnetic poles and at least ones of the S magnetic poles and the X magnetic poles of the rotor are provided as rotor poles provided with intermediate magnetic characteristics between N magnetic pole characteristics and S magnetic pole characteristics in the circumferential direction, wherein ratios between the N magnetic pole characteristics and the S magnetic pole characteristics change gradually in the circumferential direction.

With this configuration, circumferential change is gradual in the ratio between the N magnetic poles and S magnetic poles of the rotor poles. Accordingly, the torque generated by the stator poles during the rotation of the rotor can exhibit smooth torque pulsation change, thereby reducing vibration of the motor and noise.

An exemplary sixth embodiment is provided such that, in the motor according to the first embodiment, the motor includes four or more magnetic poles, wherein the four or more magnetic poles have a boundary portion RCCW produced between the N magnetic poles and the S magnetic poles of the rotor, the boundary portion RCCW being depicted by advancing counterclockwise thereamong in the circumferential direction and a boundary portion RCW produced between the N magnetic poles and the S magnetic poles of the rotor, the boundary portion RCW being depicted by advancing clockwise thereamong in the circumferential direction, wherein, when viewing a plurality of rotor poles whose shapes assigned to a range of electrical angles of 0 to 360 degrees in the circumferential direction of the rotor, each of the X magnetic poles is produced by magnetically synthesizing magnetic characteristics of two or more rotor poles located between the boundary portion RCCW and the boundary portion RCW in the circumferential direction.

With this configuration, the X magnetic poles, i.e. third rotor poles, are comparatively easily manufactured in the extension of conventional art and thus the manufacturing cost is reduced.

An exemplary seventh embodiment is provided such that, in the motor according to the first embodiment, the N magnetic poles, the S magnetic poles, and the X magnetic poles includes a rotor pole that generate torque by being pulled by stator poles, the rotor pole being made of soft magnetic material.

With this configuration, the rotor poles for generating torque, being attracted to the stator poles, are solely configured by soft-magnetic poles or configured as a composite body of permanent magnets and soft-magnetic poles. Since soft-magnetic rotor poles such as of silicon steel plates can realize a magnetic flux density larger than that of permanent magnets, torque is increased. Further, owing to the reduction in the amount of permanent magnets to be used, low-cost production is realized.

An exemplary eighth embodiment is provided such that, in the motor according to the first embodiment, the S magnetic poles of the rotor are composed of S magnetic pole magnets made of ferrite magnets, the X magnetic poles are composed of N magnetic pole magnets made of ferrite magnets, and the N magnetic poles are composed of soft magnetic members having a higher saturation flux density.

With this configuration, the S magnetic poles are configured by the S magnetic poles of ferrite magnets, which have a flux density of −0.4 tesla, the X magnetic poles are configured by the N magnetic poles of ferrite magnets, which have a flux density of +0.4 tesla, and the N magnetic poles are configured by a soft-magnetic material having a high saturation magnetic flux density of +2 tesla. Accordingly, the differences in the flux densities between the poles are 0.8 tesla and 1.6 tesla. Thus, the differences in the flux density are larger than in a configuration in which the poles are solely configured by ferrite magnets, thereby enhancing torque.

When the X magnetic poles having a flux density of +0.8 are configured by mixedly arranging N magnetic poles of ferrite magnets and soft-magnetic poles, the differences in the flux density between the poles are 1.2 tesla and 1.2 tesla. Thus, the differences in the flux density can be uniformed. Accordingly, a motor having small torque pulsation is configured. Also, using inexpensive ferrite magnets, high performance is achieved.

An exemplary ninth embodiment is provided such that, in the motor according to the first embodiment, the S magnetic poles of the rotor are composed of S magnetic pole magnets made of such as rare-earth magnets having a higher magnetic flux density, the X magnetic poles are composed of N magnetic pole magnets made of such as ferrite magnets which are lesser in material cost, though being lower in a magnetic flux density, and the N magnetic poles are composed of soft magnetic members having a higher saturation flux density.

With this configuration, the S magnetic poles are configured by S magnetic poles such as of neodymium magnets having a high flux density of −1.2 tesla, the X magnetic poles are configured by N magnetic poles such as of ferrite magnets having a flux density of +0.4 tesla, and the N magnetic poles are configured by a soft-magnetic material having a high saturation magnetic flux density of +2. Accordingly, the differences in the flux density between the poles are as large as 1.6 tesla and 1.6 tesla and uniformed. Thus, a motor having high torque and small torque pulsation is realized. In addition, owing to the use of only a small amount of expensive rare-earth magnets, the motor is configured at comparatively low cost.

An exemplary tenth embodiment is provided such that, in the motor according to the first embodiment, the motor includes winding switching means WCA for switching the number of windings of the A-phase winding; and winding switching means WCB for switching the number of windings of the B-phase winding WB.

With this configuration, each winding is provided with a high-voltage terminal and a low-voltage terminal. Also, a means for switching the terminals is provided. The control circuit is connected to the high-voltage terminal in a low-speed range to obtain high torque. In a high-speed range, the control circuit is connected to the low-voltage terminal to realize high-speed rotation. As a result, the capacity of the voltage and current of the control circuit is reduced, thereby reducing the cost of the control circuit.

An exemplary eleventh embodiment is provided such that, in the motor according to the first embodiment, the stator is composed of a soft magnetic member part of which or all of which is produced as magnetic steel sheets which are bent.

With this configuration, magnetic circuit components are easily manufactured at low cost in a small and flat motor, in particular, by bending or drawing electromagnetic steel plates. Also, owing to the to simple loop winding configuration having no coil ends, a small motor is realized at low cost.

An exemplary twelfth embodiment is provided such that, in the motor according to the first embodiment, the stator is composed of a soft magnetic member part of which or all of which is a powder magnetic core produced by performing compression molding with soft magnetic powder.

With this configuration, since a powder magnetic core has small electric resistance in any direction, the eddy-current loss in the soft-magnetic components is reduced and thus the efficiency of the motor is enhanced, even when the motor has a magnetic circuit configuration that passes three-dimensional magnetic flux. Further, since the soft-magnetic components each configured by a powder magnetic core is manufactured by a pressing process using a die, the productivity is enhanced. The magnetic circuit of the motor may be configured not only by components each obtained by bending electromagnetic steel plates, but also components each obtained by simply punching electromagnetic steel plates, or may be configured by powder magnetic cores, or may be configured by combining these components.

An exemplary thirteenth embodiment is provided such that, in the motor according to the first embodiment, the N magnetic poles, the S magnetic poles, and the X magnetic poles of the rotor are disk-shaped permanent magnets.

With this configuration, the disk-shaped permanent magnets are easily manufactured compared to arc-shaped permanent magnets used on the surface of a cylindrically shaped rotor and thus the cost of the motor is reduced. Further, both of the front and rear sides of the disk-shaped permanent magnets can be used as rotor poles of the motor. Accordingly, interlinkage flux of the windings is increased. Also, the stator poles of the phases can be easily imparted with a larger-scale stator pole configuration opposed to the rotor. Thus, torque of the motor is easily enhanced.

An exemplary fourteenth embodiment is provided such that, in the motor according to the fourteenth embodiment, the motor includes a control circuit for controlling drive of the motor, the control circuit having a configuration of which 50% or more portion is arranged radially inside a soft magnetic member of the stator.

With this configuration, the control circuit of the motor is arranged radially inner side of the stator to reduce the size of the motor as a whole.

An exemplary fifteenth embodiment is provided such that, in the motor according to the fourteenth embodiment, the disk-shaped permanent magnets have outer diameters larger than inner diameters of the A-phase windings WA or inner diameters of the B-phase windings WB.

With this configuration, the outer diameter of the disk-shaped permanent magnets of the rotor is increased. Thus, the amount of magnetic flux interlinking the windings of the motor is increased to enhance torque of the motor.

An exemplary sixteenth embodiment is provided such that, in the motor according to the first embodiment, the motor includes: a DC power source PS1; a transistor TR1 connected in series to both the DC power source PS1 and the A-phase winding WA; a transistor TR2 connected in series to both the DC power source PS1 and the A-phase winding WA; a transistor TR3 connected in series to both the DC power source PS1 and the B-phase winding WB; and a transistor TR4 connected in series to both the DC power source PS1 and the B-phase winding WB, wherein the transistors TR1 and TR2 are controlled to supply DC current IA to the A-phase winding WA for control thereof and the transistors TR3 and TR4 are controlled to supply DC current IB to the B-phase winding WB for control thereof.

With this configuration, one DC power source and four transistors enable power running control and regenerative control to thereby reduce cost.

An exemplary seventeenth embodiment is provided such that, in the motor according to the first embodiment, the motor includes a DC power source PS2; a DC power source PS3 connected in series to the DC power source PS2; a transistor TR5 connected in series to both the DC power source PS2 and the A-phase winding WA; a diode 1 connected in series to both the A-phase winding WA and the DC power source PS3; a transistor TR6 connected in series to both the DC power source PS2 and the B-phase winding WB; and a diode 2 connected in series to both the B-phase winding WB and the DC power source PS3, wherein the transistor TR5 is controlled to supply DC current IA to the A-phase winding WA for control thereof and the transistor TR6 is controlled to supply DC current IB to the B-phase winding WB for control thereof.

With this configuration, two DC power sources and two transistors enable power running control and regenerative control to thereby reduce cost. The two DC power sources may be shared between a plurality of other motors.

An exemplary eighteenth embodiment is provided such that, in the motor according to the first embodiment, the motor includes a DC power source PS2; a DC power source PS3 connected in series to the DC power source PS2; a transistor TR7 connected in series to both the DC power source PS2 and the A-phase winding WA; a diode 3 arranged to regenerate energy of the A-phase winding WA to the DC power source PS3 when the transistor TR7 is turned an on-state thereof, which provides an energization state, to an off-state thereof, which provides an interrupt state; a transistor TR8 connected in series to both the DC power source PS3 and the B-phase winding WB; and a diode 4 arranged to regenerate energy of the B-phase winding WB to the DC power source PS2 when the transistor TR8 is turned an on-state thereof, which provides an energization state, to an off-state thereof, which provides an interrupt state, wherein the transistor TR7 is controlled to supply DC current IA to the A-phase winding WA for control thereof and the transistor TR8 is controlled to supply DC current IB to the B-phase winding WB for control thereof.

With this configuration, two DC power sources and two transistors enable power running control and regenerative control to thereby reduce cost. The two DC power sources may be shared between a plurality of other motors.

An exemplary nineteenth embodiment is provided such that, in the motor according to the first embodiment, the motor includes a DC power source PS1; a transistor TR9 connected in series to the A-phase winding WA; a winding WAX wound in a slot which is the same as a slot in which the A-phase winding WA is wound; a diode 5 connected in series to both the winding WAX and the DC power source PS1; a transistor TR10 connected in series to the B-phase winding; a winding WBX wound in a slot which is the same as a slot in which the B-phase winding WB is wound; and a diode 6 connected in series to both the winding WBX and the DC power source PS1, wherein the transistor TR9 is controlled to control DC current IA passing through the A-phase winding WA and the transistor TR10 is controlled to control DC current IB passing through the B-phase winding WB.

With this configuration, one DC power source and two transistors enable power running control and regenerative control to thereby reduce cost.

An exemplary twentieth embodiment is provided such that, in the motor according to the first embodiment, the motor includes the A-phase winding WA or the B-phase winding WB is composed of windings WX3, WX4 wound parallel to each other in the same slot, the winding WX3 is connected in series to the transistor TR11, the transistor TR11 is connected parallel to the diode D7, the winding WX4 is connected in series to the transistor TR12, and the diode D8 is connected parallel to the transistor TR12.

With this configuration, two windings are wound in parallel with each other using bifilar winding, for example, to obtain interlinkage flux $\phi$. Thus, the winding for exciting and driving a magnetic circuit is electrically separated from the winding for regenerating magnetic energy, for example, to the power source. Accordingly, the DC power source or the control circuit is simplified.

DETAILED DESCRIPTION OF PREFERRED EMBODIMENTS

The present invention suggests a motor system, including a control circuit, which has a simple structure and is produced at low cost. In the applications of such a motor system, such as various types of fans used in everyday life, silence is an important factor. Therefore, the present invention also suggests a motor configuration contributing to silence.

First Embodiment

Figure 1:
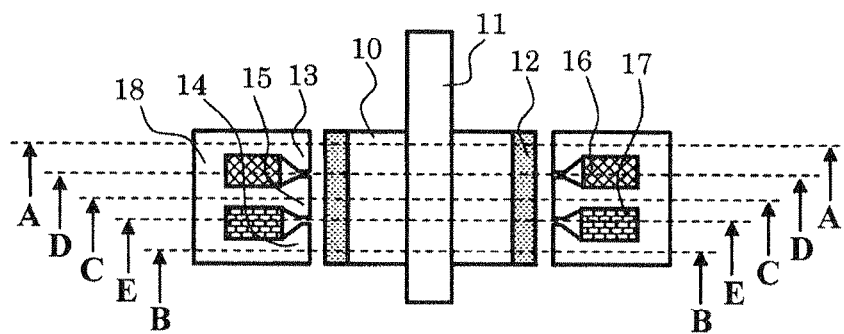
FIG. 1 is a vertical cross-sectional view illustrating a motor of the present invention, which is driven by currents of two phases.

FIG. 1 is a vertical cross-sectional view illustrating a motor of the present invention.

In the figure, reference 10 indicates a rotor, reference 11 indicates a rotor shaft, and reference 12 indicates N magnetic poles, S magnetic poles and X magnetic poles including permanent magnets which are arranged on the surface of the rotor. Reference 13 indicates A-phase stator poles, reference 14 indicates B-phase stator poles and reference 15 indicates C-phase stator poles. Reference 18 indicates a back yoke of the stator. Reference 16 indicates an annular A-phase winding and reference 17 indicates an annular B-phase winding, which are wound in the circumferential direction of the stator. The windings 16 and 17 are substantially annularly shaped in order to facilitate manufacture of the windings. Also, these windings may be altered into wave winding, drum winding, loop winding or the like.

The figure omits, and does not show, the bearing of the motor, the case of the motor, members for fixing the case to the stator, and the like.

Figure 2:
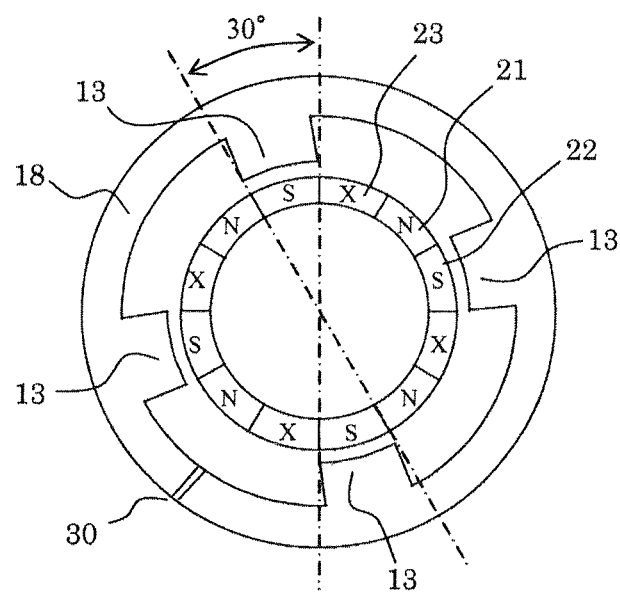
FIG. 2 is a cross-sectional view of the motor illustrated in FIG. 1, taken along a line A-A.

FIG. 2 shows a cross section taken along a line A-A of FIG. 1.

Reference 13 indicates the A-phase stator poles. Four A-phase stator poles are arranged along the circumference being evenly spaced apart from each other. The whole circumference of the motor corresponds to an electrical angle of 360°×4=1440°. FIG. 2 shows an example in which each A-phase stator pole 13 has a circumferential width at a portion facing the rotor, corresponding to 30° in mechanical angle and 120° in electrical angle. Reference 21 indicates N magnetic poles and reference 22 indicates S magnetic poles of the rotor. Reference 23 indicates third poles which are referred to as S magnetic poles in the present invention. As will be specifically described later, the X magnetic poles exert magnetic characteristics (e.g., magnetic flux is zero) which are magnetically intermediate of N magnetic poles and S magnetic poles. The letter "X" in the "X magnetic poles" has no special meaning.

Reference 30 indicates an electrically disconnected portion which is provided for the purpose of cutting off loop current passing in the circumferential direction of a soft-magnetic member of the stator. When the magnetic paths of a stator are provided by punching and bending electromagnetic steel plates, for example, the electrical resistance of the electromagnetic steel plates cannot be ignored. Reducing the circulating current excited by motor current is effective for enhancing the motor efficiency. The disconnected portion 30 also exerts its effect when provided in a portion other than that shown in FIG. 3.

However, when the soft-magnetic member of the stator is formed of a powder magnetic core obtained by applying an insulating film to iron powder, followed by pressing with a die, the powder magnetic core will have a large electrical resistance and thus can dispense with the electrically disconnected portion 30. When electromagnetic steel plates having large electrical resistance are used, the loop current becomes small and thus the Joule loss can be reduced to a level of causing practically no problem. A design for reducing the loop current may also be available.

Figure 3:
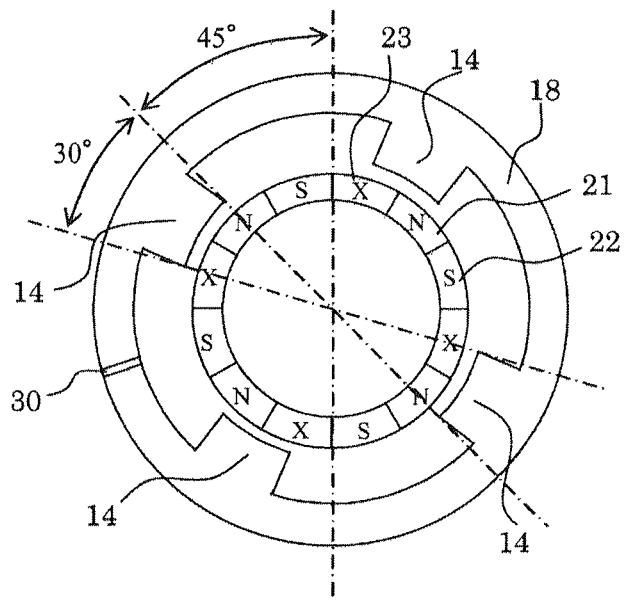
FIG. 3 is a cross-sectional view of the motor illustrated in FIG. 1, taken along a line B-B.

FIG. 3 shows a cross section taken along a line B-B of FIG. 1.

Reference 14 indicates B-phase stator poles. Four B-phase stator poles are arranged along the circumference being evenly spaced apart from each other. The whole circumference of the motor corresponds to an electrical angle of 360°×4=1440°. FIG. 3 shows an example in which each B-phase stator pole 14 has a circumferential width at a portion facing the rotor, corresponding to 30° in mechanical angle and 120° in electrical angle.

Figure 4:
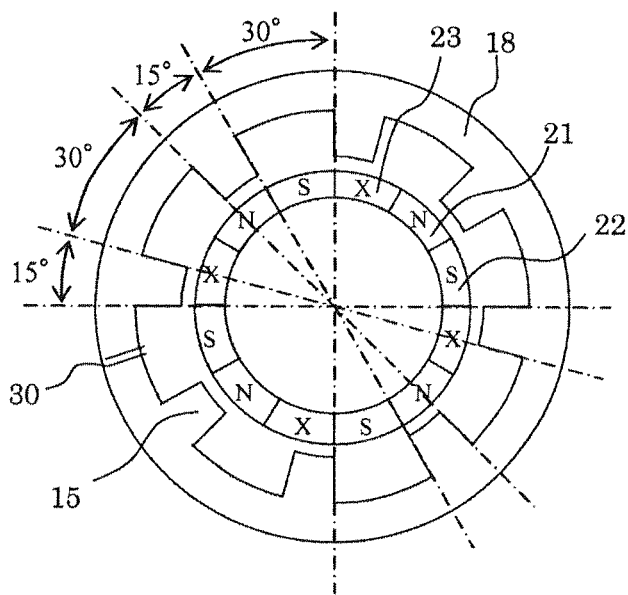
FIG. 4 is a cross-sectional view of the motor illustrated in FIG. 1, taken along a line C-C.

FIG. 4 shows a cross section taken along a line C-C of FIG. 1.

Reference 15 indicates C-phase stator poles. Eight C-phase stator poles are arranged along the circumference being evenly spaced apart from each other. The C-phase stator poles are positioned at an intermediate portion with respect to the direction along the rotor shaft. The whole circumference of the motor corresponds to an electrical angle of 360°×4=1440°. FIG. 4 shows an example in which each C-phase stator pole 15 has a circumferential width at a portion facing the rotor, corresponding to 15° in mechanical angle and 60° in electrical angle. The circumferential widths of the A-, B- and C-phase stator poles have been explained, in the above, to be 120°, 120° and 60° in electrical angle, respectively. However, these widths are rendered to be slightly smaller because, in practice, gaps are required to be provided between the stator poles to reduce flux leakage.

Figure 5:
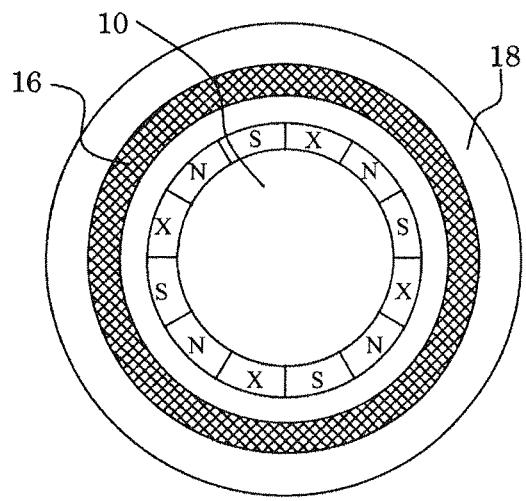
FIG. 5 is a cross-sectional view of the motor illustrated in FIG. 1, taken along a line D-D.

FIG. 5 shows a cross section taken along a line D-D of FIG. 1.

Reference 16 indicates an annular A-phase winding. The A-phase winding 16 is interlinked with A-phase flux φa that passes through the A-phase stator poles 13.

Figure 6:
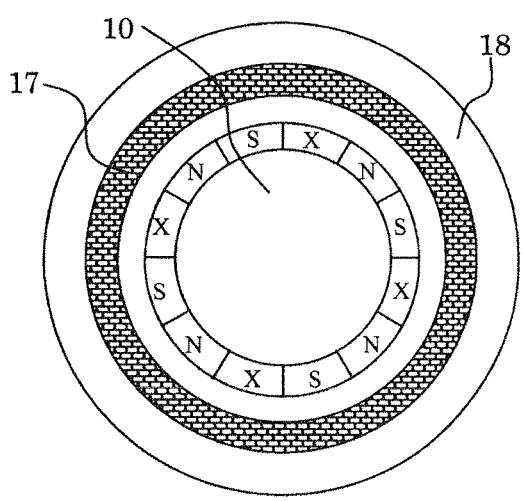
FIG. 6 is a cross-sectional view of the motor illustrated in FIG. 1 taken along a line E-E.

FIG. 6 shows a cross section taken along a line E-E of FIG. 1.

Reference 17 indicates an annular B-phase winding. The B-phase winding 17 is interlinked with B-phase flux φb that passes through the B-phase stator poles 14. However, the direction of interlinkage of the A- and B-phase fluxes φa and φb is relatively reversed between the A- and B-phase windings 16 and 17. Accordingly, the direction of the generated voltages is also reversed. For this reason, these windings are required to be connected in the reverse direction.

Figure 7A:
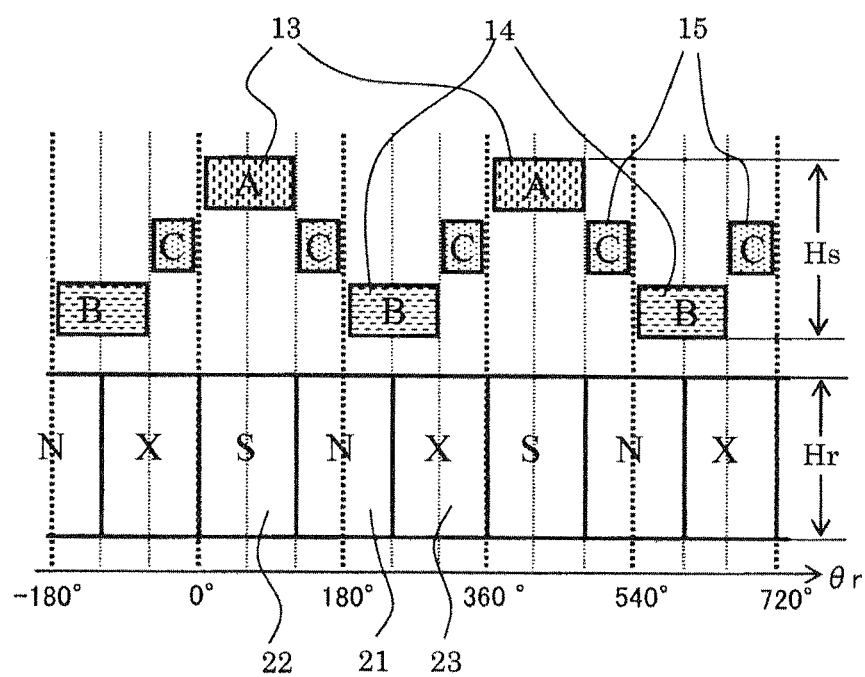
FIGS. 7A and 7B are linear development views illustrating opposing circumferential surface configurations of stator poles and rotor salient poles of the motor illustrated in FIG. 1.

FIG. 7A is a circumferential linear development view illustrating a stator pole configuration and a rotor pole of configuration of the opposing surfaces of the stator and the rotor of the motor illustrated in FIG. 1. These configurations also correspond to the configurations of an air gap surface. In the figure, the horizontal direction corresponds to the circumferential direction in which rotational angle θr is indicated in electrical angle.

The upper half of FIG. 7A shows the radially inner side configuration of the stator poles and the lower half shows the outer peripheral configuration of the rotor. Reference 13 in FIG. 7A indicates the inner peripheral configuration of the A-phase stator poles. Reference 14 indicates the inner peripheral configuration of the B-phase stator poles. Reference 15 indicates the inner peripheral configuration of the C-phase stator poles. In FIG. 7A, the vertical direction corresponds to the direction along the rotor shaft. The entire length of the stator in the direction along the rotor shaft is Hs, while the length of the rotor in the direction along the rotor shaft is Hr. FIG. 7A shows an example in which Hs and Hr have an equal value. The A-, B- and C-phase stator poles 13, 14 and 15 each have a length of about Hs/3 in the direction along the rotor shaft.

In the configuration example shown in FIG. 1, the magnetic circuit configuration of the motor of the present invention is three-dimensional. Thus, since illustrating such a three-dimensional configuration is difficult, FIGS. 1, 7A and 7B each show a configuration example of stator poles which can be comparatively easily illustrated. However, the length of the stator poles 13, 14 and 15 in the direction along the rotor shaft may be extended, as shown in the A-, B- and C-phase stator pole configuration in FIG. 7B, so as to have a length which is about three times larger than the length shown in FIG. 7A. A larger length of the stator poles in the direction along the rotor shaft can increase interlinkage flux of the windings accordingly and thus can increase torque accordingly. Thus, stator pole configuration may be variously altered.

The configuration of the rotor shown in FIG. 7A corresponds to the linear development of the circumferential configuration of the rotor shown in FIG. 1. In FIG. 7A, the N, S and X magnetic poles 21, 22 and 23 are adjacently arranged in the circumferential direction. The magnetic poles indicated by reference 23 are referred to as X magnetic poles having magnetic characteristics intermediate of the N- and S-poles 21 and 22 of the permanent magnets. Reference 21 indicates the N-pole permanent magnets and reference 22 indicates the S-pole permanent magnets. Specific examples of the X magnetic pole 23 will be explained later referring to FIGS. 12A to 12D. For example, the rotor may have a configuration in which N-pole permanent magnets and S-pole permanent magnets are mixedly arranged at an even ratio. In this case, average magnetic characteristics of the X magnetic poles are equivalent to a state where no magnets are present. Further, relative permeability of the X magnetic poles is equivalent to that of the permanent magnets. The magnetic attraction force between the X magnetic poles and the stator poles is as large as that between the N magnetic poles and the stator poles and between the S magnetic poles and the stator poles.

Figure 7B:
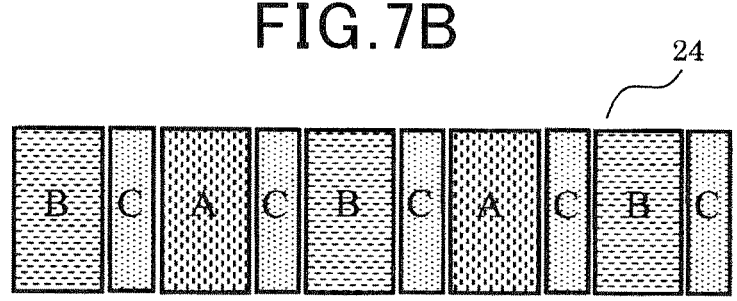

Each of the rotor poles 21, 22 and 23 has a circumferential length corresponding to 120° in electrical angle. The technique of generating torque and the qualitative relationship between current and voltage in the motor shown in FIGS. 7A and 7B are the same as those of the motor shown in FIG. 8. In the description referring to FIG. 8, the characteristics of the motor shown in FIGS. 7A and 7B will also be described.

Figure 8:
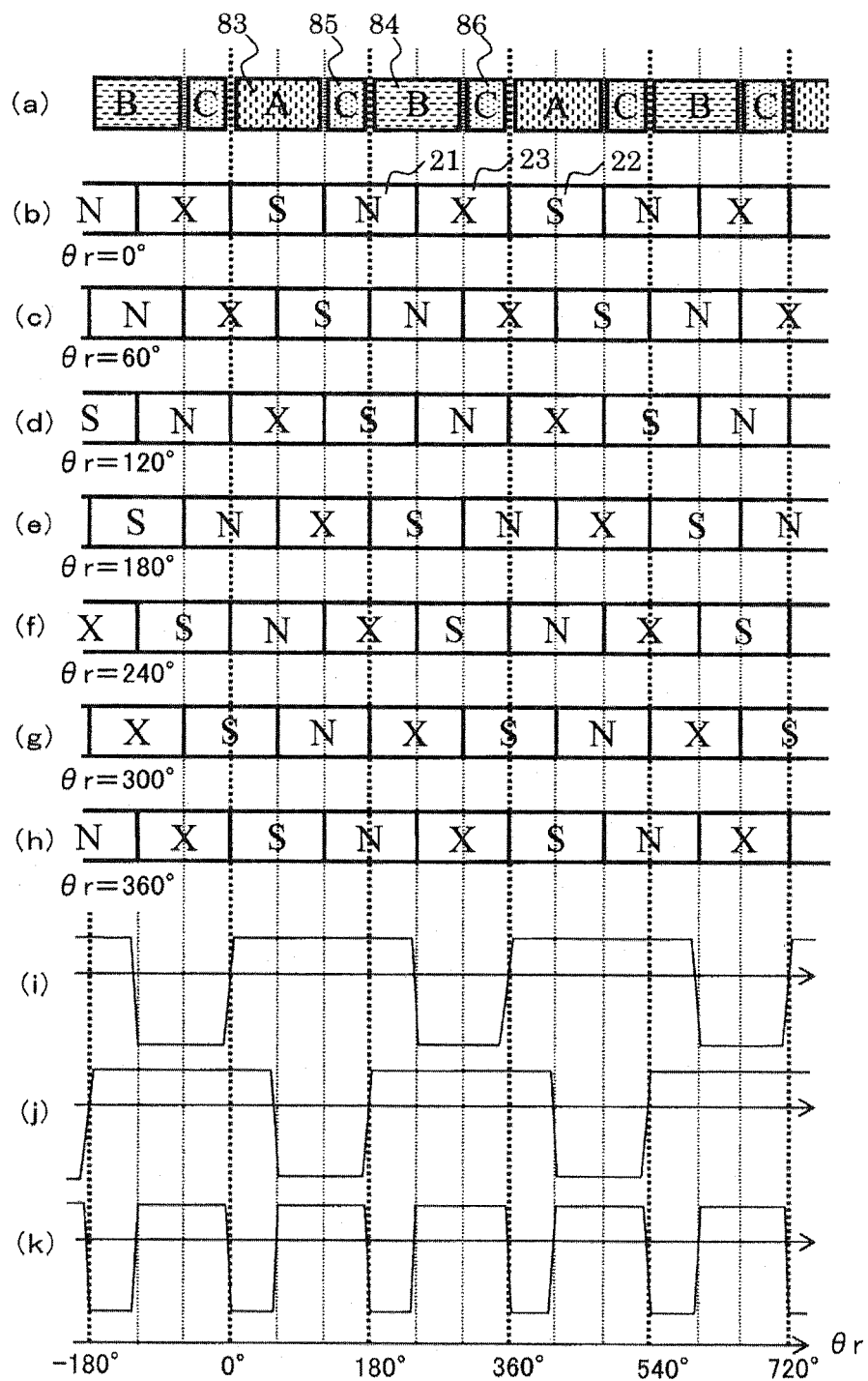
FIG. 8 is a linear circumferential development view, illustrating a stator pole configuration and a rotor pole configuration at a portion where the stator and the rotor are opposed to each other in the motor configuration illustrated in FIG. 1.

Referring to FIG. 8, hereinafter is described an example of operation of the motor of the present invention.

FIG. 8 shows a motor in which the radially inner side configuration of the stator poles of the individual phases is altered from that of the motor shown in FIG. 1. In the figure, the surface configuration of the rotor is shown at each of the rotational positions θr of the rotor. Further, the figure shows voltage of each of the windings when the rotor is rotated at a constant rotational speed. The horizontal axis in FIG. 8 indicates the rotational angle θr of the rotor ranging from −180° to 720° in electrical angle. The vertical axis in FIG. 8 as shown in each of (a) to (h) corresponds to the direction along the rotor shaft.

FIG. 8 shows by (a) A-phase stator poles 83, B-phase stator poles 84 and C-phase stator poles 85 and 86. These stator poles are the same as the stator poles 24 shown in FIG. 7B.

The A-phase stator pole 83 is arranged in an electrical angle range of 0° to 120° to pass the magnetic flux of the permanent magnets of an opposed portion of the rotor. The passing magnetic flux is an A-phase flux $\phi a$.

The B-phase stator pole 84 is arranged in an electrical angle range of 180° to 300° to pass the magnetic flux of the permanent magnets of an opposed portion of the rotor. The passing magnetic flux is a B-phase flux $\phi b$.

The C-phase stator pole is divided into two, i.e. the C-phase stator poles 85 and 86. The C-phase stator poles 85 and 86 have an electrical angle range of 120° to 180° and an electrical angle range of 300° to 360°, respectively, to pass the magnetic flux of the permanent magnets of opposed portions of the rotor. The passing magnetic flux is a C-phase flux $\phi c$. In this case, the A- and B-phases have a relationship therebetween in which the phases are shifted from each other by 180° in the circumferential direction. Since a sum of the magnetic flux entering from the rotor into the stator side is zero, the following Formula (1) is established:

$$\phi a + \phi b + \phi c = 0$$

FIG. 8 shows by (b) the rotor poles, i.e. the N magnetic poles 21, the S magnetic poles 22 and the X magnetic poles 23, opposed to the stator poles. In the example shown by (b) of FIG. 8, each of these rotor poles has a circumferential width corresponding to an electrical angle 120°. The rotational position of the rotor shown by (b) of FIG. 8 is expressed by θr=0°. This corresponds to the rotational position of the rotor shown in FIG. 2. The rotational position of the rotor shown by (c) of FIG. 8 is expressed by θr=60°. The rotational position of the rotor shown by (d) of FIG. 8 is expressed by θr=120°. The rotational position of the rotor shown by (e) of FIG. 8 is expressed by θr=180°. The rotational position of the rotor shown by (f) of FIG. 8 is expressed by θr=240°. The rotational position of the rotor shown by (g) of FIG. 8 is expressed by θr=300°. The rotational position of the rotor shown by (h) of FIG. 8 is expressed by θr=360° which exerts the same electromagnetic effects as θr=0° shown by (b) of FIG. 8. With the change of the rotational position θr of the rotor, the positions of the rotor poles opposed to the stator poles change. Accordingly, the magnitude of the fluxes $\phi a$, $\phi b$ and $\phi c$ passing through the stator poles is permitted to change with the rotation of the rotor.

The rotational direction of the rotor in FIG. 2 corresponds to the rotational direction from a first quadrant to a second quadrant side. Counterclockwise rotational direction CCW is rendered to be forward rotation in which the value of the rotational position θr of the rotor increases. Description is provided on the basis that the forward rotational direction in FIG. 8 corresponds to a shifting from the left side to the right side.

FIG. 8 shows by (i) an inductive voltage Va which is generated in the A-phase winding 16 in a state where the rotor is rotated at a constant rotational speed. The A-phase inductive voltage Va is in proportion to the temporal changes of the A-phase flux φa that is the interlinkage flux of the A-phase winding 16. When the number of turns of the A- and B-phase windings 16 and 17 is Nw, the following Formula (2) is established:

$$Va = Nw \times d(\phi a)/dt \qquad (2)$$

The A-phase flux φa is supplied by the N, S and X magnetic poles 21, 22 and 23 of the rotor, to which each A-phase stator pole 83 is opposed. Accordingly, the A-phase flux φa changes with the rotational transfer of the rotational position θr of the rotor.

The A-phase inductive voltage Va of (i) of FIG. 8 is described in order of the rotational positions θr of the rotor.

At the rotational position θr=0°, as will be understood from the comparison of (a) with (b), each A-phase stator pole 83 substantially completely faces the S magnetic pole 22 of the rotor. Accordingly, the A-phase flux φa has a negative maximum value −φmax. When the rotor rotates in the forward direction, i.e. when the rotor position is shifted rightward as viewed in (b) of FIG. 8, the X magnetic pole 23 of the rotor comes to face the A-phase stator pole 83. Thus, the A-phase flux φa is increased from a negative maximum value −φmax and approximated to zero. Thus, the A-phase inductive voltage Va has a value, as derived from Formula (2), which value is in proportion to a magnetic flux density Bm of the N and S magnetic poles 21 and 22. Thus, the A-phase inductive voltage Va has a positive value in proportion to a rate of rotation change Δφa/Δθr of the A-phase flux.

$$Va = Nw \times d(\phi a)/d\theta r \times d\theta r/dt \qquad (3)$$

When θr=0° is shifted to 120°, the following Formulas (4) and (5) are established:

$$d(\phi a)/d\theta r \approx Pn \times Bm \times Hr \times R \times \Delta\theta r/\Delta\theta r \qquad (4)$$

$$= Pn \times Bm \times Hr \times R \qquad (5)$$

where Pn is the number of magnetic pole pairs, Hr is the length of each permanent magnet, i.e. each rotor pole, in the direction along the rotor shaft, and R is a rotor radius. Further, dθr/dt is a rotational speed of the rotor.

FIG. 8 shows by (c) a state of θr=60° where the A-phase inductive voltage Va of Formulas (3), (4) and (5) is generated. When the rotational position of the rotor is θr=120° as shown by (d) of FIG. 8, the A-phase stator pole 83 is substantially completely opposed to the X magnetic pole 23 of the rotor, as will be understood from the comparison of (a) with (d) of FIG. 8. Accordingly, the A-phase flux φa has a value of substantially zero. When the rotor is rotated forward in this state, i.e. when the rotor position is shifted rightward as viewed in (d) of FIG. 8, the N magnetic pole 21 of the rotor comes to face the A-phase stator pole 83. Thus, the A-phase flux φa is increased from zero and approximated to a positive maximum value φmax. When θr=120° is shifted to 240°, the following Formulas (6) and (7) are established:

$$d(\phi a)/d\theta r \approx Pn \times Bm \times Hr \times R \times \Delta\theta r/\Delta\theta r \qquad (6)$$

$$= Pn \times Bm \times Hr \times R \qquad (7)$$

When an average magnetic flux density of the X magnetic poles is zero and the N and S magnetic poles 21 and 22 have an even magnetic flux density, the value obtained from Formula (5) equals to that obtained from Formula (7). Thus, the A-phase inductive voltage Va, as derived from Formula (7), has a positive value.

FIG. 8 shows by (e) a state of θr=180° where the A-phase inductive voltage Va of Formulas (6) and (7) is generated. When the rotational position of the rotor is θr=240° as shown by (f) of FIG. 8, the A-phase stator pole 83 is substantially completely opposed to the N magnetic pole 21 of the rotor, as will be understood from the comparison of (a) with (f) of FIG. 8. Accordingly, the A-phase flux φa has substantially the positive maximum value φmax. When the rotor is rotated forward in this state, i.e. when the rotor position is shifted rightward as viewed in (d) of FIG. 8, the S magnetic pole 22 of the rotor comes to face the A-phase stator pole 83. Thus, the A-phase flux φa is decreased from the positive maximum value φmax and approximated to the negative maximum value −φmax. When θr=240° is shifted to 360°, the following Formulas (8) and (9) are established:

$$d(\phi a)/d\theta r \approx Pn \times 2 \times Bm \times Hr \times R \times \Delta\theta r/\Delta\theta r \qquad (8)$$

$$= -2 \times Pn \times Bm \times Hr \times R \qquad (9)$$

In this way, in a range of from θr=240° to 360°, the A-phase inductive voltage Va has a negative value which is twice of the value as derived from Formula (5) or (7). It should be noted that an average value in the range of θr=0° to 360° is zero.

FIG. 8 shows by (j) an inductive voltage Vb which is generated in the B-phase winding 17 in a state where the rotor is rotated at a constant rotational speed. The inductive voltage Vb has characteristics symmetrical to those of the inductive voltage Va generated in the A-phase winding 16. The B-phase inductive voltage Vb is in proportion to the temporal changes of the B-phase flux φb that is the interlinkage flux of the B-phase winding 17. The B-phase inductive voltage Vb is expressed by Formula (10) as follows:

$$Vb = Nw \times d(\phi b)/dt \qquad (10)$$

The direction of interlinkage of the flux φb of the B-phase winding 17 is reverse of the direction of interlinkage of the flux φa of the A-phase winding 16. Therefore, the direction of connection of the B-phase winding 17 is required to be reversed. The B-phase flux φb is supplied by the N, S and X magnetic poles 21, 22 and 23 of the rotor, to which each B-phase stator pole 84 is opposed. Accordingly, the B-phase flux φb changes with the rotational transfer of the rotational position θr of the rotor.

The B-phase inductive voltage Vb of (j) of FIG. 8 is described in order of the rotational positions θr of the rotor.

At the rotational position θr=0°, as will be understood from the comparison of (a) with (b), substantially one half of each B-phase stator pole 84 faces the X magnetic pole 23 of the rotor and substantially the other one half of the B-phase stator pole 84 faces the N magnetic poles 21. Accordingly, the B-phase flux φb is about ½ of the positive maximum value φmax. When the rotor is rotated forward in this state, i.e. when the rotor position is shifted rightward as viewed in (b) of FIG. 8, the portion of the N magnetic pole 21 opposed to the B-phase stator pole 84 increases. Accordingly, the B-phase flux φb is increased from φmax/2 and approximated to the maximum value φmax. Thus, the B-phase flux φb has a value, as derived from Formula (10), which value is in proportion to the magnetic flux density Bm of the N and S magnetic poles 21 and 22. Thus, the B-phase inductive voltage Vb shows a positive value in proportion to a rate of rotation change $\Delta\phi b/\Delta\theta r$ of the B-phase flux.

$$Vb = Nw \times d(\phi b)/d\theta r \times d\theta r/dt \qquad (11)$$

When $\theta r=0°$ is shifted to $60°$, the following Formulas (12) and (13) are established:

$$d(\phi b)/d\theta r \approx Pn \times Bm \times Hr \times R \times \Delta\theta r/\Delta\theta r \qquad (12)$$
$$= Pn \times Bm \times Hr \times R \qquad (13)$$

When the rotational position of the rotor is $\theta r=60°$ as shown by (c) of FIG. 8, the B-phase stator pole 84 is substantially completely opposed to the N magnetic pole 21 of the rotor, as will be understood from the comparison of (a) with (c) of FIG. 8. Accordingly, the A-phase flux $\theta a$ has substantially the positive maximum value $\phi max$. When the rotor is rotated forward in this state, i.e. when the rotor position is shifted rightward as viewed in (c) of FIG. 8, the S magnetic pole 22 of the rotor comes to face the B-phase stator pole 84. Thus, the B-phase flux $\phi b$ is decreased from the positive maximum value $\phi max$ and approximated to the negative maximum value $-\phi max$. When $\theta r=60°$ is shifted to $180°$, the following Formulas (14) and (15) are established:

$$d(\phi b)/d\theta r \approx -Pn \times 2 \times Bm \times Hr \times R \times \Delta\theta r/\Delta\theta r \qquad (14)$$
$$= -2 \times Pn \times Bm \times Hr \times R \qquad (15)$$

FIG. 8 shows by (d) a state of $\theta r=120°$ and thus the B-phase inductive voltage Vb of Formula (14) or (15) is obtained. When the rotational position of the rotor is $\theta r=180°$ as shown by (e) of FIG. 8, the B-phase stator pole 84 is substantially completely opposed to the S magnetic pole 22 of the rotor, as will be understood from the comparison of (a) with (e) of FIG. 8. Accordingly, the B-phase flux $\phi b$ has substantially the negative maximum value $-\phi max$. When the rotor is rotated forward in this state, i.e. when the rotor position is shifted rightward as viewed in (e) of FIG. 8, the X magnetic pole 23 of the rotor comes to face the B-phase stator pole 84. Thus, the B-phase flux b is increased from the negative maximum value $-\phi max$ and approximated to zero. When $\theta r=180°$ is shifted to $300°$, the following Formulas (14) and (15) are established:

$$d(\phi b)/d\theta r \approx Pn \times Bm \times Hr \times R \times \Delta\theta r/\Delta\theta r \qquad (16)$$
$$= Pn \times Bm \times Hr \times R \qquad (17)$$

FIG. 8 shows by (f) a state of $\theta r=240°$ and thus the B-phase inductive voltage Vb of Formula (16) or (17) is obtained. When the rotational position of the rotor is $\theta r=300°$ as shown by (g) of FIG. 8, the B-phase stator pole 84 is substantially completely opposed to the X magnetic pole 23 of the rotor, as will be understood from the comparison of (a) with (g) of FIG. 8. Accordingly, the B-phase flux $\phi b$ is substantially zero. When the rotor is rotated forward in this state, i.e. when the rotor position is shifted rightward as viewed in (g) of FIG. 8, the N magnetic pole 21 of the rotor comes to face the B-phase stator pole 84. Thus, the B-phase flux $\phi b$ is increased from zero and approximated to the positive maximum value $\phi max$. When $\theta r=300°$ is shifted to $240°$, the following Formulas (18) and (19) are established:

$$d(\phi b)/d\theta r \approx Pn \times Bm \times Hr \times R \times \Delta\theta r/\Delta\theta r \qquad (18)$$
$$= Pn \times Bm \times Hr \times R \qquad (19)$$

FIG. 8 shows by (k) a state where the rotor is rotated at a constant rotational speed. In this state, the inductive voltage corresponds to that of the winding interlinked with the C-phase flux $\phi c$ passing through the C-phase stator poles. Although the motor being described does not include a C-phase winding, the state where the A- and B-phase windings 16 and 17 are connected in series corresponds to the C-phase winding. However, the polarity is reversed. Inductive voltage Vc of the virtual phase C is expressed by the following Formula (20):

$$Vc = -Nw \times d(\phi a + \phi b)/dt = -Va - Vb \qquad (20)$$

Accordingly, a sum of the individual inductive voltages equals to zero and thus the following Formula (21) is also established:

$$Va + Vb + Vc = 0 \qquad (21)$$

However, in each of the formulas set forth above, the motor is idealized by rendering winding resistance to be zero for ignorance and rendering flux leakage of each phase to be zero.

Figure 9:
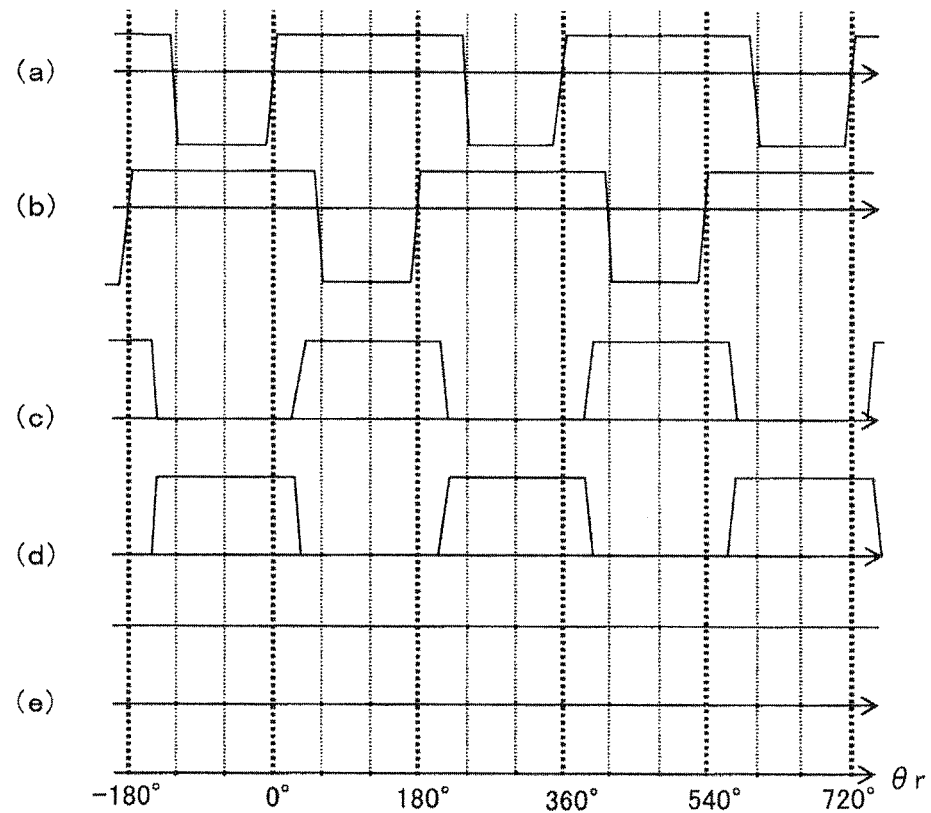
FIG. 9 is a diagram illustrating examples of voltages Va, Vb and Vc, currents Ia and Ib, and torque Tm of the motor illustrated in FIG. 8.

Referring now to FIG. 9, a specific example of a technique of supplying a current is described. The current to be supplied generates constant rotation torque when the rotor is rotated forward, i.e. rotated in the counterclockwise direction CCW at a constant rotational speed. The description is provided on the basis that the motor has characteristics shown in FIGS. 1, 7A, 7B and 8.

The basic configuration is that the A-phase flux $\phi a$ passing through each A-phase stator pole 83 interlinks the A-phase winding 16, and the B-phase flux $\phi b$ passing through each B-phase stator pole 84 interlinks the B-phase winding 17. From the viewpoint of electrical power input, a mechanical output Pm is considered to have a constant value under the condition that a sum P1 of Pa and Pb has a constant value, where Pa is a product of the A-phase current Ia and the A-phase inductive voltage Va, and Pb is a product of the B-phase current Ib and the B-phase inductive voltage Vb. In this case, the following Formulas (22) and (23) are established:

$$P1 = Pa + Pb \qquad (22)$$
$$= Ia \times Va + Ib \times Vb$$
$$= Tm \times \omega = Pm \qquad (23)$$

Substituting Formulas (3) and (11) into Formula (23), a motor torque Tm is expressed as follows:

$$Tm = 1/\omega \times Ia \times (Nw \times d(\phi a)/d\theta r \times d\theta r/dt) +$$
$$1/\omega \times Ib \times (Nw \times d(\phi b)/d\theta r \times d\theta r/dt)$$
$$= Nw \times (Ia \times d(\phi a)/d\theta r + Ib \times d(\phi b)/d\theta r)$$

In this case, $\omega = d\theta r/dt$ is a rotational speed of the motor and the loss inside the motor is idealized to be zero. For example, when a positive A-phase current Ia is supplied to the A-phase winding 16 in a state where the A-phase inductive voltage Va has a positive value, proportionate torque is generated. The same applies to phase B.

Formula (22) set forth above is provided from the viewpoint of an electrical aspect. However, when explained from a viewpoint of an electromagnetic aspect, a positive A-phase current Ia is supplied to the A-phase winding 16 so that the A-phase flux φa is further increased in a state where the A-phase inductive voltage Va has a positive value in Formula (2), i.e. in a state where the A-phase flux φa is increasing. Thus, an attraction force is generated between the A-phase stator poles and the rotor to generate torque. The same applies to phase B.

FIG. 9 shows by (a) the A-phase inductive voltage Va equals to the one shown in FIG. 8 by (j). Since the A-phase inductive voltage Va is substantially a constant positive voltage over an electrical angular range of 240°, substantially constant positive torque is obtained over the electrical angular range of 240° by supplying a DC current to the A-phase winding 16 in this electrical angle.

Similarly, FIG. 9 shows by (b) the B-phase inductive voltage Vb equals to the one shown in FIG. 8 by (j). In the case of the B-phase inductive voltage Vb as well, substantially constant voltage is effectively obtained over an electrical angular range of 240°. Thus, when DC current is alternately supplied to the A- and B-phase windings 16 and 17, continuous rotation torque is obtained.

FIG. 9 shows by (c) an example of the A-phase current Ia having a trapezoidal waveform with a width approximately corresponding to an electrical angle 180°. FIG. 9 shows by (d) an example of the B-phase current Ib having a trapezoidal waveform with a width approximately corresponding to an electrical angle 180°. FIG. 9 shows by (e) constant torque Tm generated by the motor. Torques generated by the A- and B-phase currents Ia and Ib are just interpolated with each other to supply continuous current, whereby the constant torque Tm is generated. However, the technique shown in FIGS. 8 and 9 is a technique of generating one-way torque and rotating/driving the rotor. If large average torque output is needed even though the torque ripple may be slightly increased, the widths of waveforms of the currents supplied to the individual phases may be broadened. Thus, similar to (a) and (b) of FIG. 9, the widths of waveforms of supplied currents may be broadened up to an electrical angle 240°. As a matter of course, torque may be increased by increasing the current value.

Figure 10:
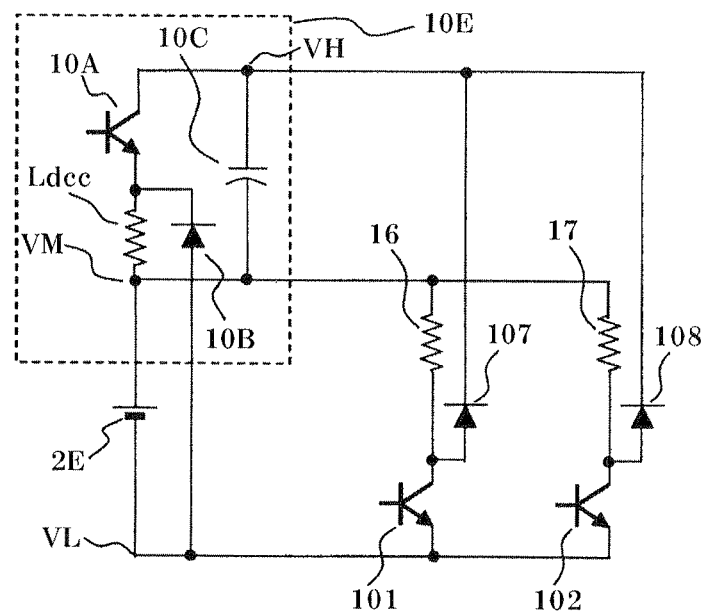
FIG. 10 is a diagram illustrating an example of a control circuit for supplying one-way current to the windings of the motor illustrated in FIG. 1.

Referring to FIG. 10, hereinafter is described an example of a control circuit of the motor of the present invention, for supplying the A- and B-phase currents Ia and Ib.

In a power source section, reference 2E indicates a DC voltage source, such as a battery of an automobile. Reference VL is a common potential, reference VM is a potential of the DC voltage source 2E and reference VH is a third potential used such as for regeneration. Reference 16 is the A-phase winding shown in FIG. 1, reference 101 is a transistor used for driving the A-phase current Ia, and reference 107 is a diode used for regenerating magnetic energy, for example, which is accumulated in the A-phase winding 16. Reference 17 is the B-phase winding, reference 102 is a transistor used for driving the B-phase current Ib, and reference 108 is a diode used for regenerating magnetic energy, for example, which is accumulated in the B-phase winding 17.

When, for example, the transistors 101 and 102 are controlled by pulse-width modulation, as PWM, desired DC current is supplied to the A- and B-phase windings 16 and 17. In this case, since the number of transistors connected in series to each of the windings 16 and 17 is one, turn-on power loss of the transistors is small and thus the loss of the control circuit is small. Accordingly, highly efficient driving is realized. In the control of a three-phase AC motor, turn-on power loss of two transistors is caused.

Various types of power control elements may be used as the transistors mentioned above. For example, in small-size motors, power MOSFETs or IGBTs are widely used. Recently, new elements, such as super junction MOSFETs or SiC transistors, are attracting attention.

In a section shown by a broken line in FIG. 10, reference 10C indicates a capacitor, reference 10A indicates a transistor, reference Ldcc indicates a choke coil and reference 10B indicates a diode. The broken-line section as indicated by reference 10E is a so-called DC-DC converter. In this control circuit, magnetic energy regenerated from the motor windings is stored as electric charges in the capacitor 10C. After that, the energy of the electric charges is transferred to the DC voltage source 2E using the choke coil Ldcc. The DC-DC converter 10E has a function of transferring the electric charges of the capacitor 10C to the DC voltage source 2E.

The DC voltage source 2E and the DC-DC converter 10E may be used for driving a plurality of motors or shared with other loads. For example, in driving ten motors of the present invention, the control circuit may be configured by twenty transistors, twenty diodes and a set of DC-DC converter 10E.

Briefly, the motor of the present invention is driven by two transistors and two diodes. Accordingly, the motor of the present invention and its control circuit both have a simple configuration, thereby reducing cost and size. The DC-DC converter 10E enclosed by the broken line may be replaced by a different DC power source, such as a battery. Further, various modifications may be made, such as a modification in which a motor current is generated between the potentials VM and VH, and regenerative power is generated between the potentials VL and VM.

Figure 11:
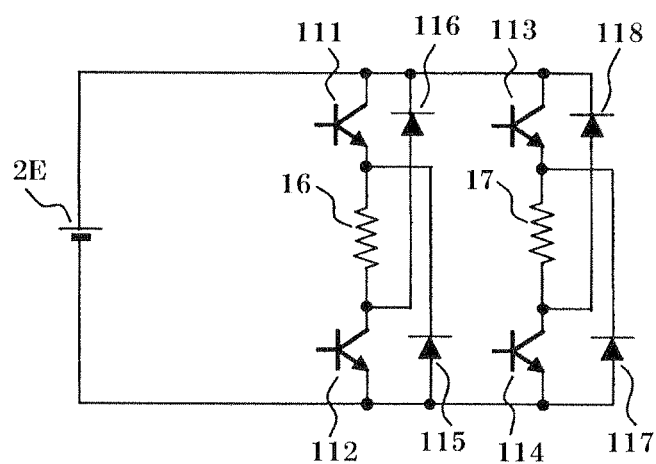
FIG. 11 is a diagram illustrating an example of a control circuit for supplying one-way current to the windings of the motor illustrated in FIG. 1.

Referring to FIG. 11, hereinafter is described another example of control circuit for supplying the A- and B-phase circuits Ia and Ib.

References 111 and 112 indicate transistors for supplying the A-phase current Ia to the A-phase winding 16. References 115 and 116 indicate diodes which are able to regenerate magnetic energy or the like accumulated in the winding 16 to the DC voltage source 2E. Further, when either one of the transistors 111 and 112 is turned on during the supply of current, the A-phase current Ia, instead of being regenerated to the power source, may be supplied as flywheel current via the transistors and the diodes.

The configuration of the control circuit shown in FIG. 11 enables driving of one motor using four transistors. Thus, a simple configuration is provided compared to a three-phase AC motor. Here, the DC-DC converter 10E necessary for the configuration shown in FIG. 10 can be dispensed with.

However, compared to the configuration of the control circuit shown in FIG. 10 requiring only two transistors per one motor, the configuration shown in FIG. 11 requires more number of transistors, i.e. four transistors. Which of these control circuits should be used depends on the number of motors used in the peripherals, situation of manufacture, and the like.

As shown in FIGS. 10 and 11, the motor of the present invention is driven by a control circuit having a simple structure and produced at low cost. The factors of simplification lie in the configuration in which the motor of the present invention is driven by two windings and in the matter that the current is a DC current. Compared to the control circuit for the three-phase AC motor of conventional art shown in FIG. 57, the number of elements of the control circuit is reduced.

Further, regarding the configuration of the control circuit shown in FIG. 10, the number of transistors connected in series to the winding of each phase is one and thus the loss due to the on-state-voltage drop of the transistor is reduced. Accordingly, the efficiency of the control circuit is expected to be enhanced.

Referring to FIGS. 12A to 12D, hereinafter are described specific examples of the X magnetic pole 23, i.e. a third magnetic pole, of the rotor, shown in FIGS. 7A, 7B and 8.

FIGS. 12A to 12D each show a rotor surface configuration of the X magnetic pole. In the figures, the horizontal direction corresponds to the circumferential direction of the rotor and the vertical direction corresponds to the direction along the rotor shaft. The X magnetic pole of the rotor shown in FIG. 1 has characteristics intermediate of an N magnetic pole and an S magnetic pole. For example, an X magnetic pole may have a configuration shown in FIG. 12A. As shown, an N magnetic pole permanent magnet 121 and an S magnetic pole permanent magnet 122 are arranged in the direction along the rotor shaft. The N magnetic pole permanent magnet 121 and the S magnetic pole permanent magnet 122 are arranged in parallel.

Figure 12A:
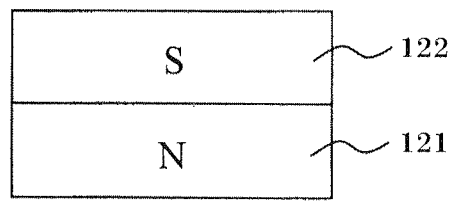
FIGS. 12A to 12D are diagram each illustrating an example of an X magnetic pole of a rotor.

When the stator poles have a configuration as shown in FIG. 7B or FIG. 8 by (a), in the magnetic flux passing through the stator poles, the magnetic flux at the portion where each N magnetic pole magnet 121 faces the stator poles cancels the magnetic flux at the portion where each S magnetic pole magnet 122 faces the stator poles, creating intermediate characteristics. As a result, the effects exerted by the X magnetic pole as shown in FIG. 12A to the stator poles correspond to the rotor pole characteristics in which magnetic flux is zero. In other words, the rotor pole characteristics correspond to the characteristics intermediate of the N and S magnetic poles 21 and 22 of the rotor.

What is important moreover is that, although an average value of the X magnetic poles as shown in FIG. 12A is magnetically zero, magnetic flux reciprocates at portions between the X magnetic poles and the stator poles. Similar to the N and S magnetic poles, an attraction force is generated between the X magnetic poles of the rotor and the stator poles. Fluctuations of attraction force generated between the rotor and the stator poles and acting on the stator poles are very often the main cause of the vibration of the motor and noise and thus are very noteworthy. In reducing vibration of the motor and noise, it is important that the radial attraction force of the X magnetic poles have characteristics similar to those of the N and S magnetic poles.

Further, from the viewpoint of cogging torque and torque ripple, the attraction force between the stator poles and the X magnetic poles of the rotor is an important factor. In reducing cogging torque and torque ripple of the motor, it is important that the circumferential attraction force of the X magnetic poles have characteristics similar to those of the N and S magnetic poles.

FIG. 8 shows by (b) an example in which the length of the N magnetic poles 21 in the direction along the rotor shaft is substantially the same as the length of the S magnetic poles 22 in the direction along the rotor shaft. However, the ratio of these lengths may be freely selected, such as 1:2, depending on the characteristics required by motors.

The X magnetic poles may have magnetic characteristics deviated in some degree to N magnetic pole characteristics or to S magnetic pole characteristics, if the problematic factors, such as torque ripple and vibration, are accepted in some degree or if a different measure against the problematic matters is taken. Further, the X magnetic poles may be realized by spaces. Alternatively, the X magnetic poles may be realized by non-magnetic magnetic poles such as of a resin. Alternatively, the X magnetic poles may be realized by magnetic poles having low magnetic permeability. Alternatively, the X magnetic poles may be realized by permanent magnets having different magnetic characteristics.

Figure 12B:
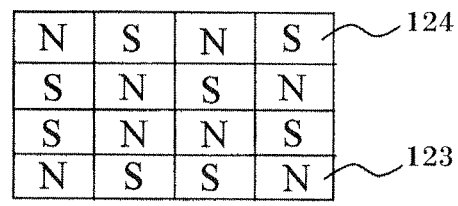
Figure 12C:
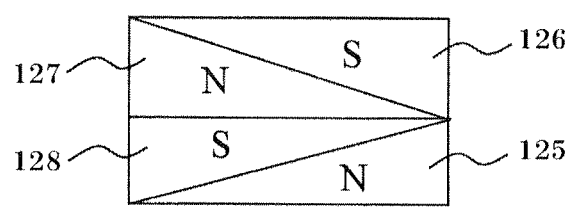

FIG. 12B shows an example in which an X magnetic pole is realized by arranging a plurality of small N magnetic pole magnets 123 and small S magnetic pole magnets 124. In this case, magnetic leakage is likely to increase between the N and S magnetic pole magnets 123 and 124. Therefore, the attraction force between the stator poles and the magnets may be slightly reduced, and this should be taken into account. Further, as shown in FIG. 12C, an X magnetic pole may be configured by triangular N magnetic poles 125 and 127 and triangular S magnetic poles 126 and 128. In this way, a magnetically neutral X magnetic pole may be provided using such various configurations.

Figure 12D:
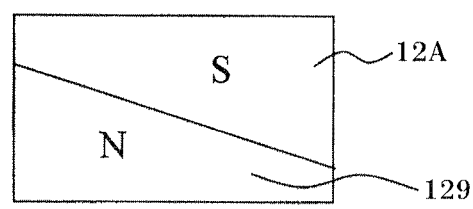

In FIG. 12D, an X magnetic pole is configured using trapezoidal N magnetic pole magnet 12A and S magnetic pole magnet 129. In such an X magnetic pole, the magnetic characteristics turn from N magnetic pole characteristics to S magnetic pole characteristics from the left to right direction as viewed in the figure.

The X magnetic poles of the rotor are used each being circumferentially adjacent to an N magnetic pole and an S magnetic pole. Accordingly, such an arrangement of the X magnetic poles may be used as a technique for realizing smooth switching, by obtaining rotation torque with the alternate driving of the windings of two phases. Such an arrangement of the X magnetic poles is also effective for reducing cogging torque. The N- and S-pole magnets 12A and 129 are not necessarily required to have symmetrical shapes, but may have various shapes other than the trapezoidal shape. Further, the X magnetic poles of the rotor exhibit magnetic characteristics that fall between an N magnetic pole side maximum magnetic flux density Bnmax and an S magnetic pole side maximum magnetic flux density Bsmax, and thus exhibit relative magnetic characteristics. Accordingly, as shown in FIGS. 12A to 12D as well as FIGS. 18, 19 and 20 later, the X magnetic poles can be realized in various modes according to the specifications of motor designs.

Hereinafter, the characteristics of the motor of the present invention are described.

As described referring to the motor configuration shown in FIGS. 1 to 11 and FIGS. 12A to 12D, the motor of the present invention has a small size and produced at low cost. The loop windings shown in FIG. 1 having a simple shape can be easily manufactured and permitted to have a high space factor. Also, since winding resistance can be reduced, Joule heat is reduced. Thus, the motor has a high efficiency.

Further, the motor has a comparatively simply configured magnetic circuit. Accordingly, small-size motors, when manufactured with a configuration as obtained by sheet-metal bending, can be speedily mass-produced using a die and thus can be easily manufactured. Also, since the number of parts is small, such motors can be efficiently assembled.

The motor of the present invention is configured so that the control circuit is simplified. Accordingly, the number of transistors for supplying current to the windings of the motor is reduced. Thus, the cost and size of the control circuit of the motor is reduced.

When current is supplied to the windings using the control circuit shown in FIG. 10, continuous rotation torque is generated by only controlling two DC currents, i.e. the A-phase current Ia and the B-phase current Ib. When a plurality of motors are driven, the number of transistors per one motor is two.

Further, the configuration of the control circuit shown in FIG. 10 can reduce the on-state-voltage drop of the transistors and thus the control circuit has a high efficiency. In addition, such a control circuit having a high efficiency can reduce the size in the heat radiation design.

Also, as in the example shown in FIG. 7B, in the surface configuration of the stator, which surface is opposed to the rotor, magnetic impedance for the rotor is substantially constant in the circumferential direction.

Further, the magnetic characteristics of the rotor poles may be uniformed between the individual phases, with respect to the stator poles. In this case, radial vibration of the motor and noise are reduced. Further, cogging torque and torque ripple are also reduced. As a result, a silent motor is realized.

Figure 49:
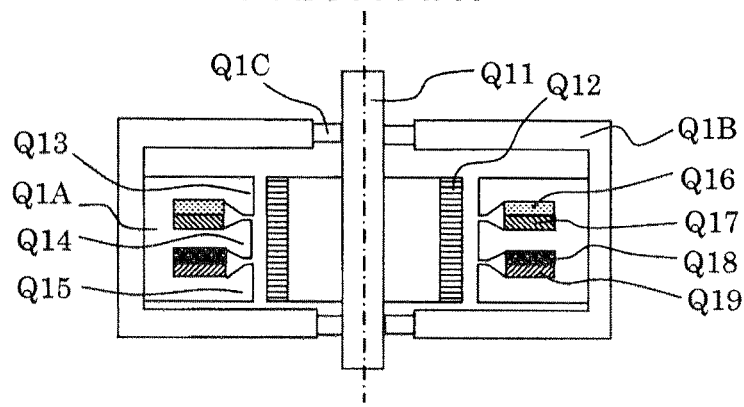
FIG. 49 is a vertical cross-sectional view, illustrating a three-phase AC motor including loop windings of conventional art.
Figure 50:
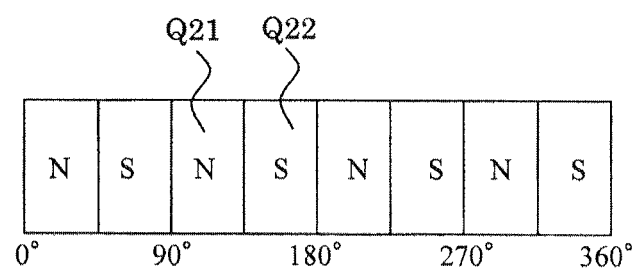
FIG. 50 is a linear development view, illustrating a circumferential configuration of permanent magnets of a rotor.
Figure 51:
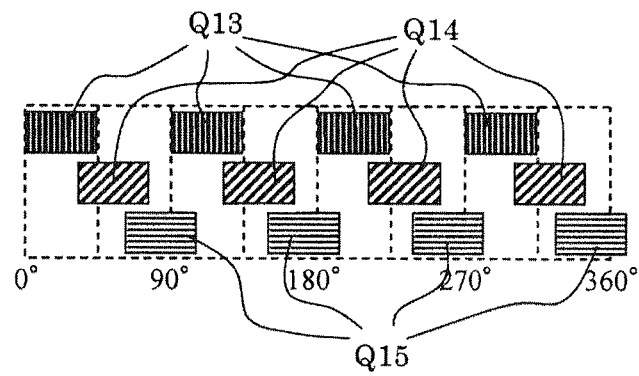
FIG. 51 is a linear development view, illustrating an example of a stator pole configuration of the motor illustrated in FIG. 49.
Figure 52:
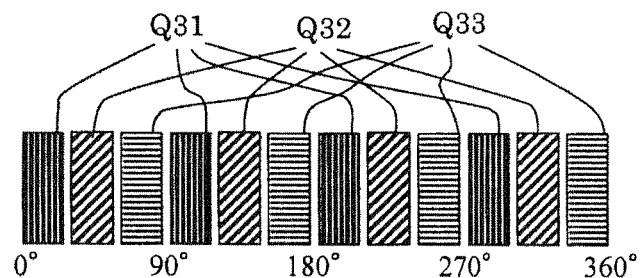
FIG. 52 is a linear development view, illustrating an example of a rotor pole configuration of the motor illustrated in FIG. 49.
Figure 53:
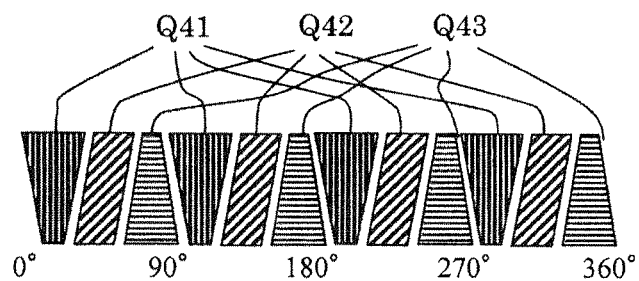
FIG. 53 is a linear development view, illustrating a rotor configuration of the motor illustrated in FIG. 49.
Figure 54:
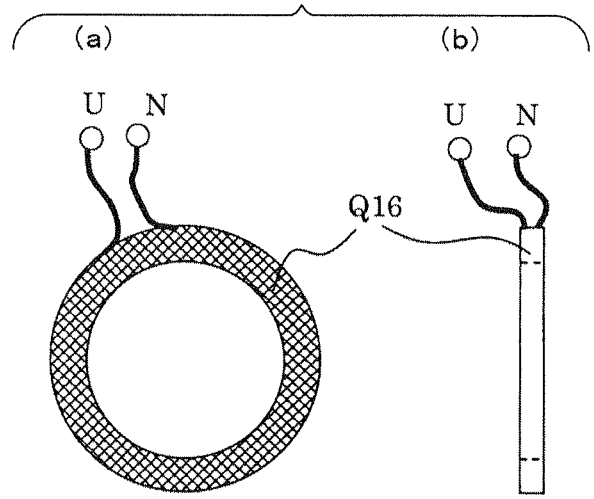
FIG. 54 is a diagram illustrating examples of front and side views of the U-phase winding illustrated in FIG. 49.
Figure 55:
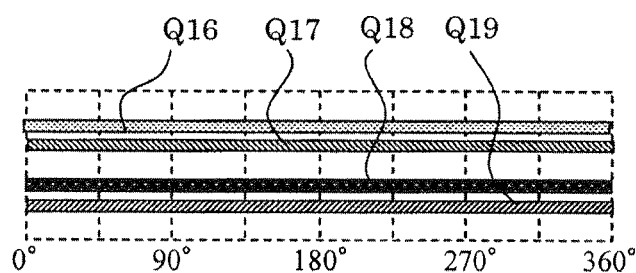
FIG. 55 is a linear development view illustrating a configuration of the loop windings illustrated in FIG. 49.
Figure 56:
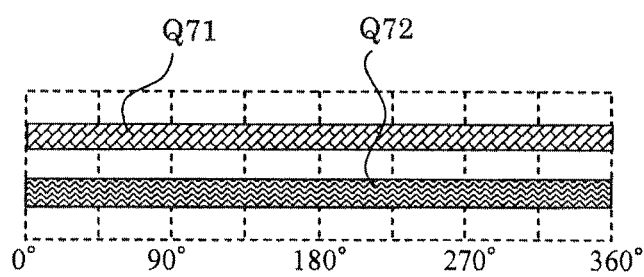
FIG. 56 is a linear development view illustrating a configuration of the loop windings illustrated in FIG. 49.
Figure 57:
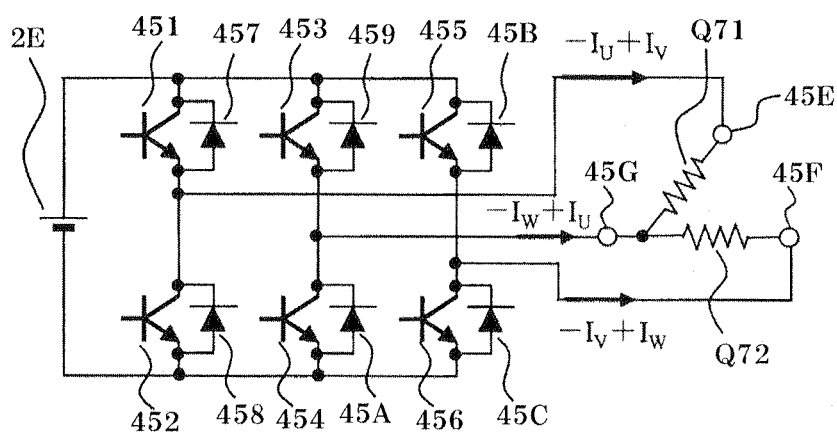
FIG. 57 is a diagram illustrating an example of a configuration of a three-phase AC inverter for controlling the three-phase AC motor having the configuration as illustrated in FIG. 49 or 56.

In this regard, in a brushless motor having concentrated winding based on conventional art, windings are required to be wound about individual teeth of the stator. Thus, such a brushless motor of conventional art has suffered from the problems of time taken for manufacturing the windings and the increase of Joule heat ascribed to the space factor of the windings. Thus, brushless motors of conventional art have suffered from the problems of cost and efficiency. Further, such brushless motors having concentrated winding of conventional art and motors having a loop winding structure as shown in FIG. 49 are based on three-phase AC voltage and three-phase AC current. In driving such motors, six transistors as shown in FIG. 57 are needed. Accordingly, problems of cost, size and efficiency of the drive circuits are raised. The motor of the present invention, when comparatively expressed with respect to a three-phase AC motor, may be a two-phase DC motor.

The motor of the present invention has a main application area based on on-way rotation and thus has various applications including fans, pumps and the like. Such applications cover a broad range of machines for use such as in household electric appliances, automobiles and industries. Taking fans as an example, fans of small size to large size are variously used. In particular, fans used in the vicinities of persons are strongly desired to be silent.

The trapezoidal current waveforms shown in FIG. 9 may be well designed so that torques of the A- and B-phase currents Ia and Ib are more smoothly connected to thereby reduce torque ripple. As will be described later, it is also important to reduce cogging torque and the rate of rotation change of attraction force in the radial direction of the stator and the rotor in order to achieve silence.

Further, high-quality fans, for example, are required to achieve well-controllable variable speed operation instead of the mechanical stepwise variable speed operation based on conventional art. Thus, from a viewpoint of saving energy, high efficiency is also strongly desired. The motor of the present invention is not only produced at lost and has a small size, but also is able to fill such needs.

In the application of fans, an outer-rotor structure in which a rotor is arranged along the outer periphery is very often desired. The motor shown in FIGS. 1 and 8 may be modified to have an outer-rotor structure. Further, the application area based on one-way rotation includes various types of pumps. Since motors for driving electric cars have a main purpose of driving the cars in the forward direction, the one-way rotation motor shown such as in FIGS. 1 and 8 may be used increasing the size. Thus, the motor of the present invention may be used as motors covering various sizes from extremely-compact size to large size.

Hereinafter is described a technique for realizing the characteristics of the present invention described above.

The motor configuration shown in FIG. 8 as an example includes the rotor having the N, S and X magnetic poles 21, 22 and 23 whose circumferential width is 120° in electrical angle, and permits the X magnetic poles 23 to have magnetic characteristics which are intermediate of the N and S magnetic poles 21 and 22. Further, each A-phase stator pole 83 has a circumferential width of 120° in electrical angle. As a result, as shown in FIG. 8 by (a), unidirectional constant torque is generated over an electrical angular range of 240° with the supply of positive current as A-phase current. The motor is structured such that the provision of the X magnetic poles 23 enables driving with the supply of DC current over an electrical angular range of 180° or more, although torque is reduced. Each B-phase stator pole 84 is also characteristic of having a phase difference of 180° in the circumferential direction with respect to each A-phase stator pole 83. Similarly, unidirectional constant torque is generated over an electrical angular range of 240°.

As a result, the motor is ensured to generate continuous rotation torque with the alternate supply of DC currents of two phases. Since the number of transistors for supplying current to the motor is reduced to two, the control circuit is drastically simplified. The two currents of being DC currents is very effective in simplifying the control circuit. As will be described later, in controlling a plurality of motors of the present invention, the number of transistors per one motor may be further decreased. For example, in controlling four motors of the present invention, the motors are controlled by six transistors, reducing the number of transistors per one motor to 1.5.

On the other hand, three-phase AC motors of conventional art generate torque over an electrical angular range of 180° or less with the supply of DC current to the winding of one phase. In brushless motors applied with concentrated winding and mainly used in household electric appliances, the driving range is 120° or less. Normally, a brushless motor is controlled by six transistors. However, such a brushless motor may be driven with three DC currents using three transistors. In this case, the form factor of current is decreased from $(2/3)^{0.5}=0.816$ to $(1/3)^{0.5}=0.577$ and thus the motor efficiency is reduced.

The motor of the present invention shown in FIG. 8 is controlled in a current supply range of 180° to 240° in electrical angle. Thus, the form factor of current is increased from $(1/2)^{0.5}=0.707$ to $(2/3)^{0.5}=0.816$. In this case, the motor efficiency and the size of the control circuit are greatly different between the three DC currents of the brushless motor and the two DC currents of the motor of the present invention.

Hereinafter are described requirements for establishing the above characteristics of the motor of the present invention.

One winding is required to be supplied with DC current to generate unidirectional torque over a range of 180° or more in electrical angle. When the rotor has N and S magnetic poles of conventional art, an angular range where torque is generated by supplying DC current to one winding and applying magnetomotive force to one stator pole is 180° or less in electrical angle.

Basic requirements in the present invention are: to provide an X magnetic pole, i.e. a third rotor pole; to render a sum of WRK and WX (WRK+WX) to be 180° or more in electrical angle, where WRK is a circumferential width of each attraction-side rotor pole and WX is a circumferential width of each X magnetic pole; and to allow each stator pole to have a circumferential width WRK of 180° or less in electrical angle, each stator pole generating attraction force between the stator and the rotor poles.

$$WRK+WX>180° \quad (24)$$

$$WRK<180° \quad (25)$$

Figure 19:
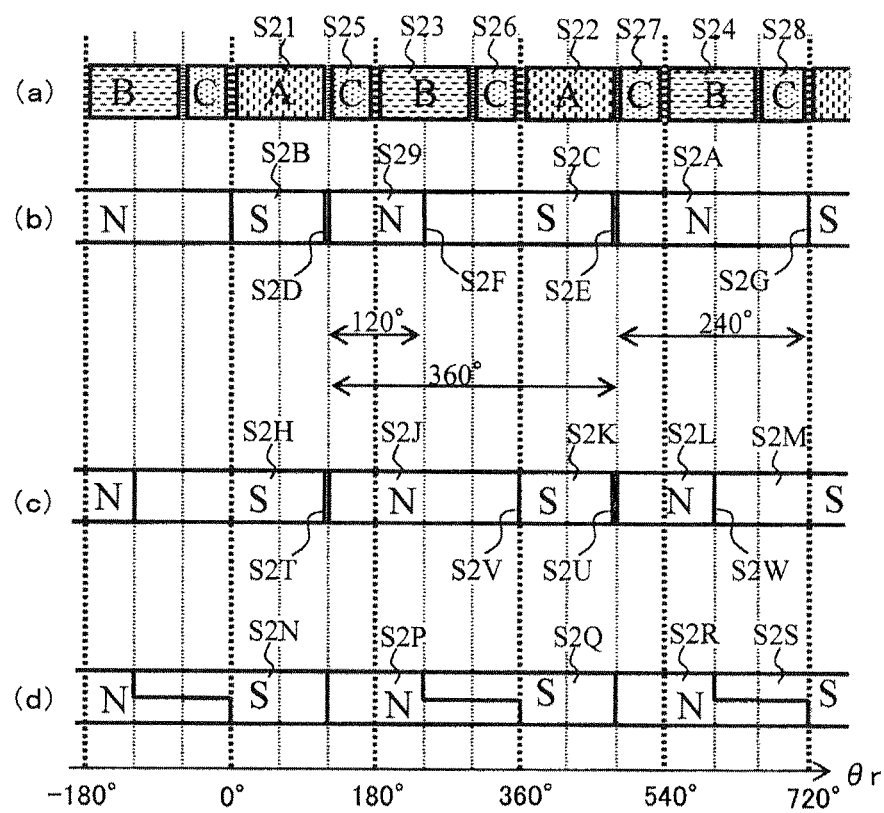
FIG. 19 is a diagram illustrating a configuration in which circumferential boundary positions of rotor poles are shifted in the circumferential direction to obtain partial pole characteristics of the rotor as an average of the multiple poles.

The X magnetic pole of the rotor here may have various configurations. The X magnetic pole may have different configuration other than the ones shown in FIGS. 12A to 12D and 16. As shown in FIG. 19 later, in a multi-pole motor whose whole circumference corresponds to 720° or more in electrical angle, an average value can configure the X magnetic pole. Specifically, of the rotor poles throughout the circumference, portions of a plurality of rotor poles in the same electrical angular range are averaged as to the characteristics. The average value will exhibit the characteristics of the rotor poles in the range. This exhibition of the characteristics by an average value is used in configuring the X magnetic pole. The plurality of portions of the rotor poles in the same electrical angular range are collectively defined to be the X magnetic pole. Further, as will be shown in FIG. 20 later, the X magnetic pole of the rotor may be configured not only by a permanent magnet but also by a soft-magnetic material providing high magnetic flux density. Alternatively, the X magnetic pole may be configured by a plurality of soft-magnetic materials having a different saturation magnetic flux density.

A requirement for generating continuous torque over an electrical angular range of 180° or more by supplying DC current to one winding and applying magnetomotive force to one stator pole is that the circumferential width WRK of each stator pole is larger than the circumferential width WX of each X magnetic pole.

$$WRK>WX \quad (26)$$

Figure 16:
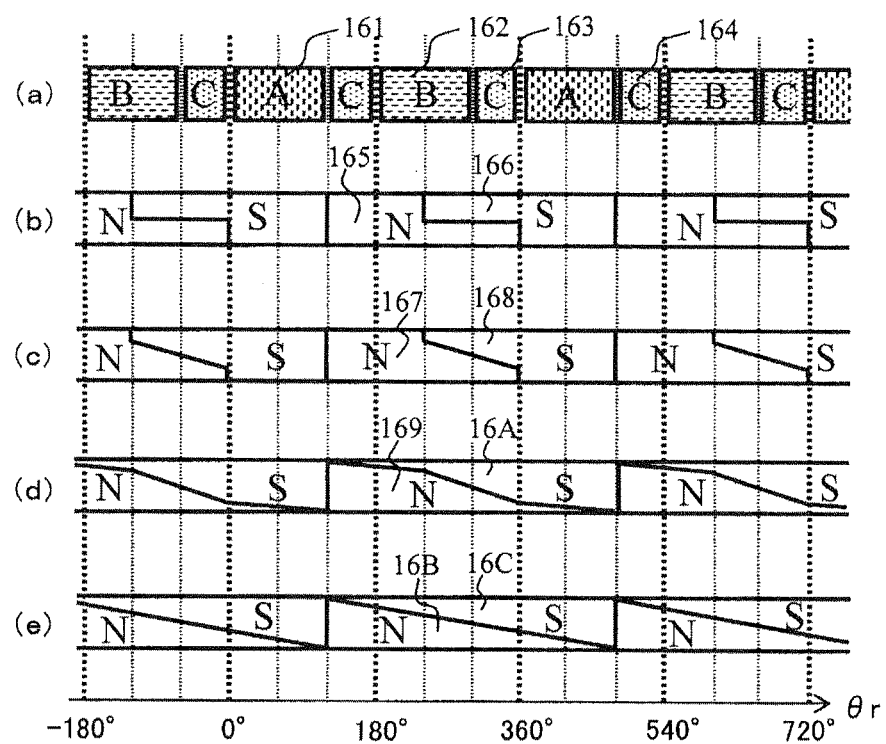
FIG. 16 is a diagram illustrating various configurations of an X magnetic pole of a rotor.

A requirement for generating continuous torque throughout the circumference of a motor by appropriately supplying DC current to two windings is that the motor is provided with two sets of stator poles meeting Formulas (24), (25) and (26) set forth above. When a boundary dividing between an X magnetic pole and an adjacent rotor pole is not clear, as shown in FIG. 16 by (d) or (e), correction is necessary based on Formulas (24), (25) and (26). Also, the shape of the surface of each stator pole opposed to the rotor poles may not necessarily be a substantially rectangular shape but may be a skewed shape, or abnormal shape, such as a trapezoidal shape, rhombic or sinusoidal shape. In this case as well, correction is necessary based on Formulas (24), (25) and (26).

The following method may be used for obtaining continuous rotation torque with two windings to which respective DC currents are supplied. Specifically, if one unit UA is able to generate unidirectional torque over a range WUA of (180°+α), a range over which the other unit UB generates unidirectional torque may only have to be larger than a range WUB (180°−α). Thus, if the range of generating unidirectional torque by the unit UB is 180° or less, the motor configured by the units UA and UB is able to generate continuous rotation torque.

$$WUA+UB>360° \quad (27)$$

Considering more simply, two sets of the unit UA that can generate unidirectional torque over a range of (180°+α) may be arranged. However, the combination of the units UA and UB may be more desirable depending on the arrangement of sensors used for the motor, the convenience of drawing winding terminals, the convenience of manufacturing the motor, and the like.

In practice, the requirements for achieving continuous torque may be relaxed. If the generation of torque is discontinuous in some degree, rotation at a constant speed is realized making use of the inertia of the rotor, and thus the rotational speed can be controlled. In this sense, Formulas (24), (25) and (26) are not absolute requirements for the motor of the present invention and thus some requirements may be omitted.

The polarity of the N or S magnetic pole of the rotor is determined by the relationship of the rotor with the direction of current in the windings. When the direction of current of the windings is reversed, the N and S magnetic poles are required to be reversed in the description. The present invention shall encompass a configuration in which the polarity of the rotor poles and the direction of current in the windings are reversed.

The motor of the present invention has been described so far focusing on the generation of unidirectional torque, and configuration and operation concerning unidirectional rotation. However, partially, the motor is also able to generate torque of reverse direction or apply regenerative braking. For example, negative torque is generated when current is applied in a range where the voltage is negative in (i) or (j) of FIG. 8 to enable regenerative operation. Further, continuous supply of current may generate negative torque, although intermittently, to enable rotation in reverse direction.

Further, as will be described later, supply of two-way current, i.e. positive and negative currents, will improve the form factor of the current of the motor to thereby improve the motor efficiency. Furthermore, since rotation is realized by outputting forward torque and reverse torque to enable powering and regenerative operations, four-quadrant operation can be performed. However, the control circuit will be complicated.

Examples of the X magnetic pole as a third magnetic pole have been described referring to FIGS. 12A to 12D. The X magnetic pole is not necessarily required to be provided in the form of a permanent magnet. Instead, a permanent magnet corresponding to the X magnetic pole may be demagnetized to achieve the magnetic characteristics intermediate of the N and S magnetic poles. However, in this case, substantially no attraction force is generated between the X magnetic pole of the rotor and the opposed stator poles. Accordingly, vibration caused in the stator core and noise are required to be taken care of. Also, in another scheme, the X magnetic pole of the rotor is configured using a non-magnetic material. A non-magnetic material, such as a resin, may be used to facilitate manufacture. The X magnetic pole of the rotor may be configured by a space.

Alternatively, a non-magnetic metal material such as aluminum or stainless steel may be used. When a metal material is used, the influence such as of eddy current is required to be taken care of.

Second Embodiment

Figure 13:
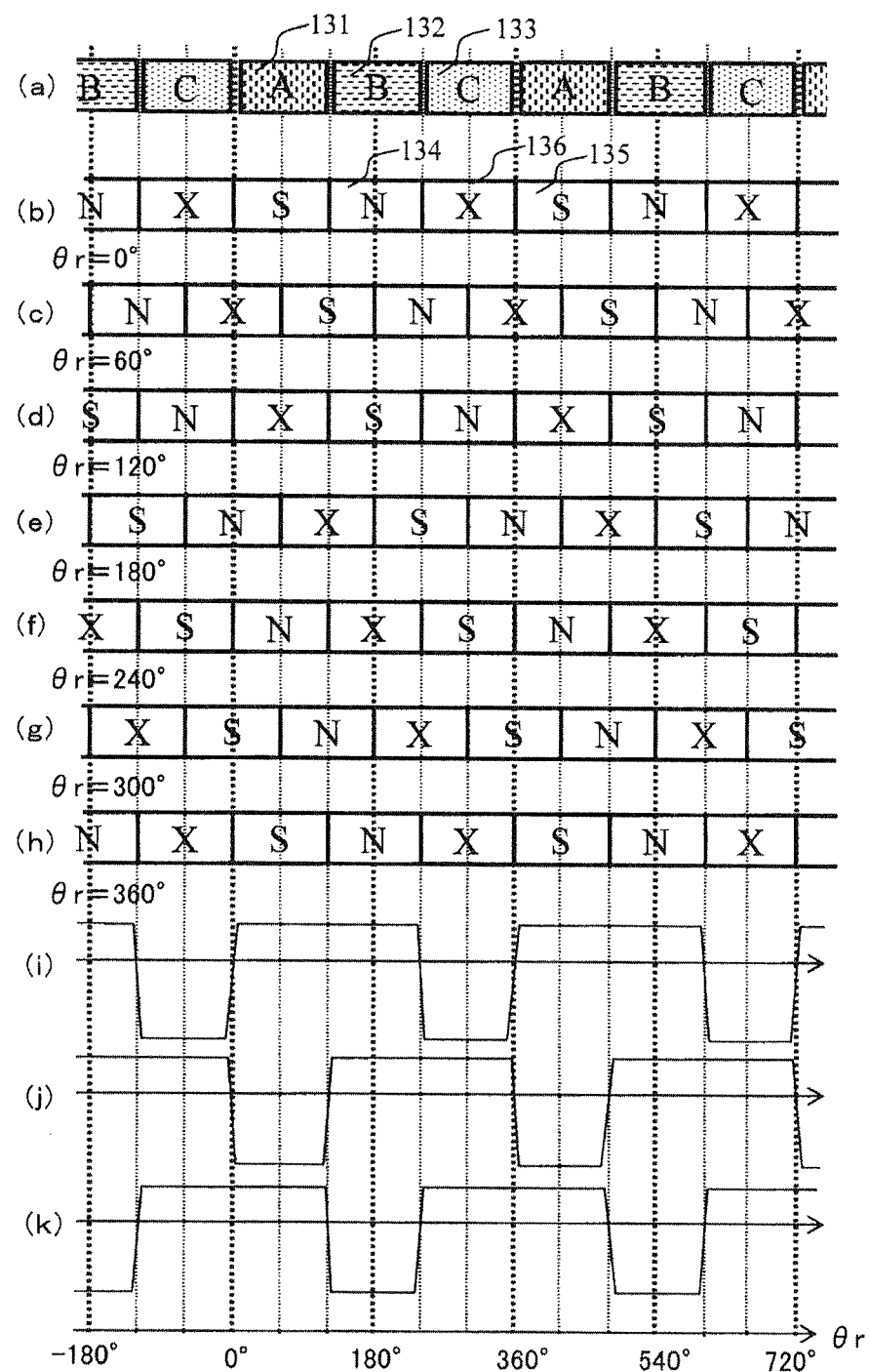
FIG. 13 is a linear circumferential development view, illustrating a stator pole configuration and a rotor pole configuration at a portion where the stator and the rotor are opposed to each other in the motor configuration illustrated in FIG. 1.

Referring now to FIG. 13, hereinafter is described an example in which stator poles have altered configuration.

FIG. 13 shows a motor configuration which is a modification of the motor configuration shown in FIG. 8. Similar to the example shown in FIG. 8, the horizontal axis in the figure indicates rotational angle θr ranging −180° to 720° in electrical angle. The figure is a horizontal development of the cylindrically shaped motor as shown in FIG. 1. The vertical axis in each of (a) to (h) of FIG. 13 corresponds to the direction along the rotor shaft.

FIG. 13 shows by (a) A-phase stator poles 131, B-phase stator poles 132 and C-phase stator poles 133. These stator poles have a phase difference of 120° in electrical angle. FIG.

8 shows by (a) the A- and B-phase stator poles 83 and 84 whose relative phase difference is 180°. The configuration of the stator poles shown in FIG. 13 by (a) is differently configured in this point.

Each A-phase stator pole 131 is arranged over an electrical angular range of 0° to 120° to pass magnetic flux of the opposed permanent magnets of the rotor. The passing magnetic flux is A-phase flux φa. Each B-phase stator pole 132 is arranged over an electrical angular range of 120° to 240° to pass magnetic flux of the opposed permanent magnets of the rotor. The passing magnetic flux is B-phase flux φb. Each C-phase stator pole 133 is arranged over an electrical angular range of 240° to 360° to pass magnetic flux of the opposed permanent magnets of the rotor. The passing magnetic flux is C-phase flux φc.

FIG. 13 shows by (b) an example of rotor poles opposed to the stator poles. The rotor poles include N magnetic poles 134, S magnetic poles 135 and X magnetic poles 136. In the example, each rotor pole has a circumferential width corresponding to an electrical angle of 120°. The rotational position of the rotor shown by (b) of FIG. 13 is θr=0°. This corresponds to the rotational position shown in FIG. 2. The rotational position of the rotor shown by (c) of FIG. 13 is θr=60°. The rotational position of the rotor shown by (d) of FIG. 13 is θr=120°. The rotational position of the rotor shown by (e) of FIG. 13 is θr=180°. The rotational position of the rotor shown by (f) of FIG. 13 is θr=240°. The rotational position of the rotor shown by (g) of FIG. 13 is θr=300°. The rotational position of the rotor shown by (h) of FIG. 13 is θr=360° which, exerts electromagnetic effects equivalent to those exerted by θr=0° shown by (b) of FIG. 13. As the rotational position θr of the rotor changes, the positions of the rotor poles opposed to the stator poles change. Accordingly, the magnitudes of the fluxes φa, φb and φc passing through the stator poles change with the rotation of the rotor.

In FIG. 2, the rotational direction of the rotor corresponds to a rotational direction from the first quadrant to the second quadrant side, and the rotational direction in the counterclockwise direction CCW corresponds to a forward rotation in which the value of the rotational position θr of the rotor increases. In FIG. 13, the forward rotational direction is described as a shifting from the left to right direction in the figure.

FIG. 13 shows by (i) inductive voltage Va generated in the A-phase winding 16 in a state where the rotor is rotated at a constant rotational speed. The A-phase inductive voltage Va is in proportion to the rate of temporal change of the A-phase flux φa that is the interlinkage flux of the A-phase winding 16. When the number of turns of the A- and B-phase windings 16 and 17 is Nw, Formula (2) set forth above is established. The A-phase flux φa is supplied by the N, S and X magnetic poles 134, 135 and 136 of the rotor, to which the A-phase stator poles 131 are opposed. Accordingly, the A-phase flux φa changes with the rotational transfer of the rotational position θr of the rotor.

Hereinafter is described the A-phase inductive voltage Va shown by (i) of FIG. 13 in order of the rotational positions θr of the rotor.

At the rotational position θr=0° of the rotor, each A-phase stator pole 131 is substantially completely opposed to the S magnetic pole 135 of the rotor, as will be understood from the comparison of (a) with (b) of FIG. 13. Accordingly, the A-phase flux φa has a negative maximum value −φmax. When the rotor is rotated forward in this state, i.e. when the rotor position is shifted rightward as viewed in (b) of FIG. 13, each X magnetic pole of the rotor comes to face the A-phase stator pole 131. Thus, the A-phase flux φa increases from the negative maximum value −φmax and approximated to zero. Thus, the A-phase inductive voltage Va has a value, as derived from Formula (2), which is in proportion to the magnetic flux density Bm of the N and S magnetic poles 134 and 135. Accordingly, the A-phase inductive voltage Va has a positive value in proportion to a rate of rotation change Δφa/Δθr of the A-phase flux, establishing Formulas (3), (4) and (5) set forth above. In (c) to (h) of FIG. 13 as well, each stator pole 131 takes an action similar to the A phase stator pole 83 shown in FIG. 8. The characteristics shown in FIG. 13 by (i) are similar to those shown in FIG. 8 by (i).

FIG. 13 shows by (j) inductive voltage Vb generated in the B-phase winding 17 in a state where the rotor is rotated at a constant rotational speed. The B-phase inductive voltage Vb is in proportion to the rate of temporal change of the B-phase flux φb that is the interlinkage flux of the B-phase winding 17. Thus, Formula (10) set forth above is established. The rotational angle position of each B-phase stator pole 132 shown by (j) of FIG. 13 is smaller by 60° than that of the B-phase stator pole 84 shown in FIG. 8. Accordingly, FIG. 13 shows by (j) the characteristics in which the waveform is shifted leftward by 60° as viewed in the figure, compared to the waveform shown by (j) of FIG. 8.

FIG. 13 shows by (k) inductive voltage corresponding to the inductive voltage of winding, which is interlinked with the C-phase flux c passing through the C-phase stator poles in a state where the rotor is rotated at a constant rotational speed. Although a C-phase winding is absent from the motor shown in the figure, a state where the A- and B-phase windings 16 and 17 are connected in series corresponds to the C-phase winding. However, the polarity is reversed. Thus, virtual C-phase inductive voltage Vc is as expressed by Formula (20) set forth above and results in as shown in FIG. 13 by (k). However, the values shown are theoretical values based on an ideal motor in which winding resistance is rendered to be zero for ignorance and magnetic flux leakage of the phases is rendered to be zero.

When the motor has the configuration and characteristics shown in FIG. 13, A-phase current Ia and B-phase current Ib are supplied. Specifically, the A-phase current Ia is supplied in a range where the A-phase inductive voltage Va of the A-phase winding 16, as shown in FIG. 13 by (i), has a positive value. The B-phase current Ib is supplied in a range where the B-phase inductive voltage Vb of the B-phase winding 17, as shown in FIG. 13 by (j), has a positive value. Thus, the A- and B-phase currents Ia and Ib are alternately supplied to continuously generate rotation torque. At the connection from phase B to phase A, overlapped angle is substantially zero. Accordingly, the motor exhibits characteristics which require accurate current switching at high speed. In FIG. 13 shows modification of the motor configuration shown in FIG. 8. In this way, the motor configuration shown in FIG. 8 may be used with a modification to some extent.

Figure 14:
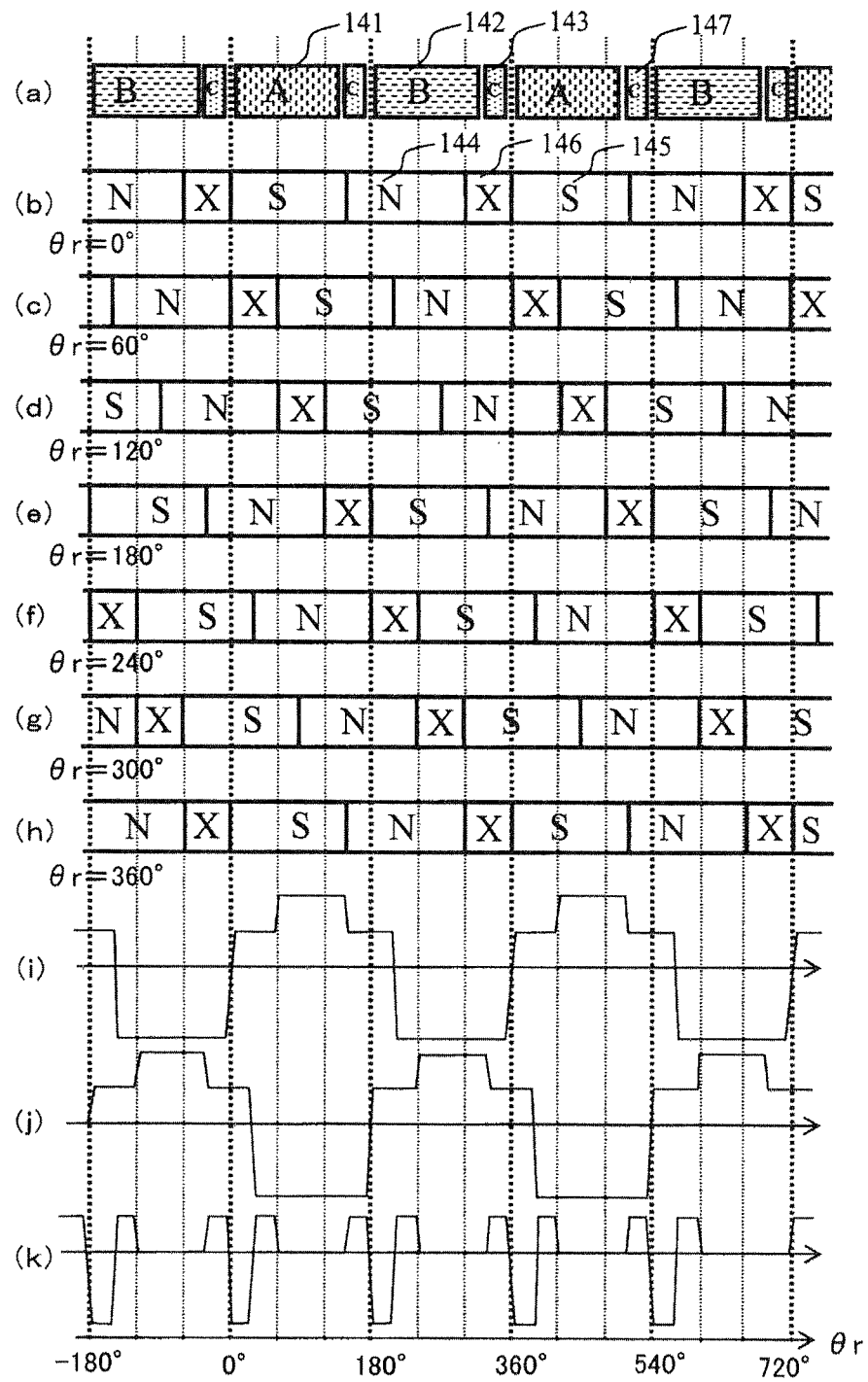
FIG. 14 is a linear circumferential development view, illustrating a stator pole configuration and a rotor pole configuration at a portion where the stator and the rotor are opposed to each other in the motor configuration illustrated in FIG. 1.

Referring to FIG. 14, hereinafter is described a motor configuration for enhancing the torque and output of the motor shown in FIG. 8. In FIG. 14, the horizontal axis indicates rotational angle θr ranging from −180° to 720°. FIG. 14 is a horizontal development of the cylindrically shaped motor shown in FIG. 1. The vertical axis in each of (a) to (h) of FIG. 14 corresponds the direction along the rotor shaft.

FIG. 14 shows by (a) A-phase stator poles 141, B-phase stator poles 142 and C-phase stator poles 143 and 147. Each A-phase stator pole 141 has a circumferential width corresponding to an electrical angle of 140°. Each B-phase stator pole 142 has a circumferential width corresponding to an electrical angle of 140°. Each of the two C-phase stator poles 143 and 147 has a circumferential width corresponding to an electrical angle of 40°. In order to increase torque, a larger circumferential width is provided to the A- and B-phase stator poles 141 and 142 and a narrow width is provided to the C-phase stator poles 143 and 147, compared to the motor configuration shown in FIG. 8.

FIG. 14 shows by (b) an example of rotor poles opposed to the stator poles and including N magnetic poles 144, S magnetic poles 145 and X magnetic poles 146. Each of the rotor poles in the example has a circumferential width corresponding to an electrical angle of 120°. Each N magnetic pole 144 has a circumferential width corresponding to an electrical angle of 150°. Each S magnetic pole 144 has a circumferential width corresponding to an electrical angle of 150°. Each X magnetic pole 146 has a circumferential width corresponding to an electrical angle of 60°. In order to increase torque, a larger circumferential width is provided to the N magnetic poles 144 and S magnetic poles 144, and a narrow circumferential width is provided to the X magnetic poles 146, compared to the motor configuration shown in FIG. 8.

The rotational position of the rotor shown in FIG. 14 by (b) is θr=0°. This corresponds to the rotational position shown in FIG. 2. The rotational position of the rotor shown in FIG. 14 by (c) is θr=60°. The rotational position of the rotor shown in FIG. 14 by (d) is θr=120°. The rotational position of the rotor shown in FIG. 14 by (e) is θr=180°. The rotational position of the rotor shown in FIG. 14 by (f) is θr=240°. The rotational position of the rotor shown in FIG. 14 by (g) is θr=300°. The rotational position of the rotor shown in FIG. 14 by (h) is θr=360° which exerts electromagnetic effects equivalent to those exerted by θr=0°. As the rotational position θr of the rotor changes, the positions of the rotor poles opposed to the stator poles change. Accordingly, magnitudes of the flux φa, φb and φc passing through the stator poles change with the rotation of the rotor.

FIG. 14 shows by (i) inductive voltage Va generated in the A-phase winding 16 in a state where the rotor is rotated at a constant rotational speed, i.e. in a state where the rotor poles 144, 145 and 146 are shifted in the figure from the left to the right. The A-phase inductive voltage Va is in proportion to the rate of temporal change of the A-phase flux φa, i.e. interlinkage flux of the A-phase winding 16. When the number of turns of the A- and B-phase windings 16 and 17 is Nw, Formula (2) set forth above is established. The A-phase flux φa is supplied by the N, S and X magnetic poles 144, 145 and 146 to which the A-phase stator poles 131 are opposed. Accordingly, the A-phase flux φa changes with the rotational transfer of the rotational position θr of the rotor.

Hereinafter is described the A-phase inductive voltage Va shown in FIG. 14 by (i) in order of the rotational positions θr of the rotor.

At the rotational position θr=0° of the rotor, each A-phase stator pole 141 is substantially completely opposed to the S magnetic pole 145 of the rotor, as will be understood from the comparison of (a) with (b) of FIG. 14. Accordingly, the A-phase flux θa has a negative maximum value −φmax. When the rotor is rotated forward in this state, i.e. when the rotor position is shifted rightward as viewed in (b) of FIG. 14, each X magnetic pole 136 of the rotor comes to face the A-phase stator pole 141. Thus, the A-phase flux φa is increased from the negative maximum value −φmax and approximated to zero. Thus, the A-phase inductive voltage Va has a value, as derived from Formula (2), which is in proportion to a magnetic flux density Bm of the N and S magnetic poles 144 and 145. Accordingly, the A-phase inductive voltage Va has a positive value which is in proportion to the rate of rotation change Δφa/Δθr of the A-phase flux to establish Formulas (3), (4) and (5) set forth above. In (c) to (h) of FIG. 14, the performance of the stator poles 141 is different from that of the A-phase stator poles 83 shown in FIG. 8, and exerts characteristics as shown in FIG. 14 by (i).

FIG. 14 shows by (j) inductive voltage Vb generated in the B-phase winging 17 in a state where the rotor is rotated at a constant rotational speed. The B-phase inductive voltage Vb is in proportion to the rate of temporal change of the B-phase flux φb that is the interlinkage flux of the B-phase winding 17. Thus, Formula (10) set forth above is established. The B-phase stator poles 142 have a phase difference of 180° in electrical angle with respect to the A-phase stator poles 141 and have the same configuration as the A-phase stator poles 141. Accordingly, in the characteristics shown in FIG. 14 by (j), the waveform is shifted by 180° in electrical angle compared to the waveform shown in FIG. 14 by (i).

FIG. 14 shows by (k) inductive voltage corresponding to the inductive voltage of winding, which interlinks with the C-phase flux φc passing through C-phase stator poles. Although a C-phase winding is absent from this motor, a state where the A- and B-phase windings 16 and 17 are connected in series corresponds to the C-phase winding. However, the polarity is reversed. Thus, the virtual C-phase inductive voltage Vc is as expressed by Formula (20) set forth above and results in as shown in FIG. 13 by (k). However, the values shown are theoretical values based on an ideal motor in which winding resistance is rendered to be zero for ignorance and magnetic flux leakage of the phases is rendered to be zero.

When the motor has the configuration and characteristics shown in FIG. 14, the A-phase current Ia and the B-phase current Ib are supplied. Specifically, the A-phase current Ia is supplied in a range where the A-phase inductive voltage Va of the A-phase winding 16, as shown in FIG. 14 by (i), has a positive value. The B-phase current Ib is supplied in a range where the B-phase inductive voltage Vb of the B-phase winding 17, as shown in FIG. 14 by (j), has a positive value. Thus, the A- and B-phase currents Ia and Ib are alternately supplied to continuously generate rotation torque.

Figure 15:
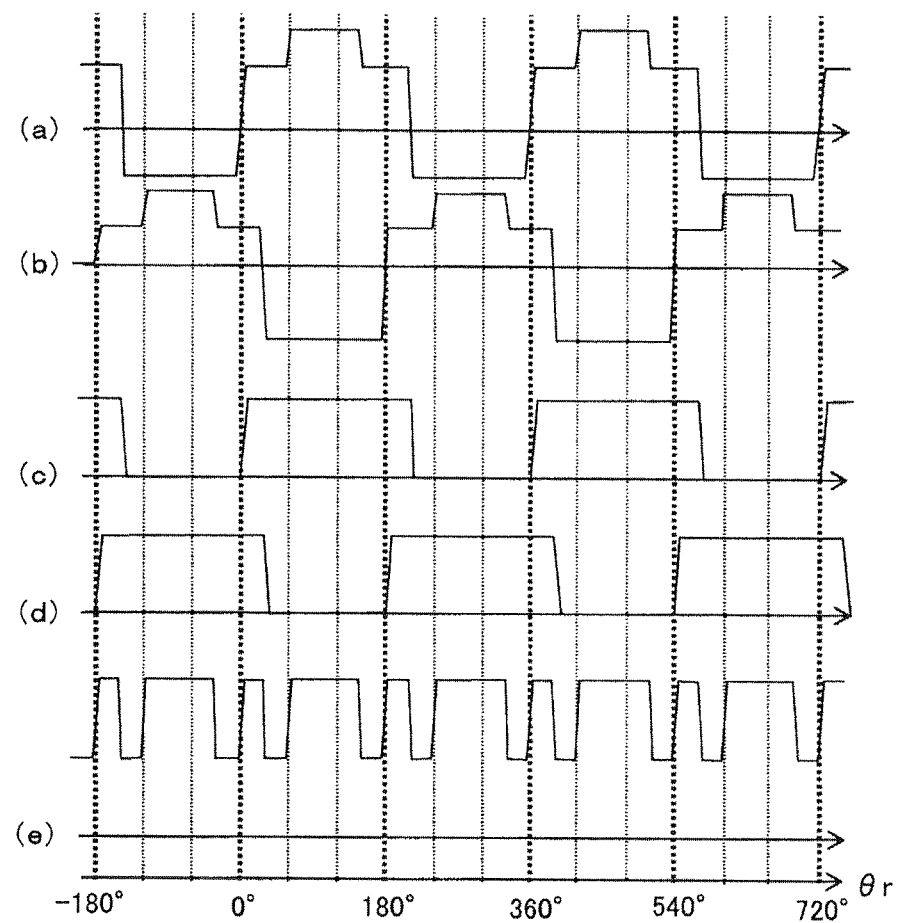
FIG. 15 is a diagram illustrating examples of voltages Va, Vb and Vc, currents Ia and Ib, and torque Tm of the motor illustrated in FIG. 14.

FIG. 15 shows an example of voltage and current. In FIG. 15, (a) and (b), which are the same as (a) and (b) of FIG. 14, correspond to the A- and B-phase inductive voltages Va and Vb, respectively. FIG. 15 shows by (c) that a constant A-phase current Ia is supplied in a range where the A-phase inductive voltage Va has a positive value. FIG. 15 shows by (d) that a constant B-phase current Ib is supplied in a range where the B-phase inductive voltage Vb has a positive value. The resulting torque is as shown in FIG. 15 by (e). The values of the A- and B-phase inductive voltages Va and Vb are large compared to those of (i) and (j) of FIG. 8. It will be understood that the average value of the torque is large accordingly.

The C-phase stator poles 143 and 147 do not directly generate torque. Thus, relative decrease of the circumferential width of phase C increases the circumferential pole width of phases A and B to thereby enhance average torque. In addition, the presence of the X magnetic poles 146 of the rotor is not favorable in some degree from the viewpoint of enhancing the rate of rotation change of the magnetic flux interlinking the windings. Thus, by decreasing the circumferential width of each of the X magnetic poles, torque can be enhanced. In this case, however, torque ripple tends to increase and thus some measures are required to be taken.

The A- and B-phase inductive voltages Va and Vb are not flat, or do not have constant values, in ranges where these voltages have positive values. Thus, if torque ripple is required to be reduced, some improvement is necessary. For example, the shape of each stator pole indicated to be rectangular may be partially elongated and deformed in the direction along the rotor. At the same time, the shape of each rotor pole may be partially elongated and deformed in the direction along the rotor shaft. Thus, inductive voltage characteristics of the individual windings and torque characteristics can be improved. Further, in supplying the A- and B-phase currents Ia and Ib, the value of the currents may be improved so that torque ripple is reduced. The waveforms of the supplied currents may be altered by correcting the circuit. If the waveforms are altered under the control of a microcomputer, the alteration is comparatively easy because the control software only has to be corrected.

Third Embodiment

FIG. 16 shows examples of various alterations of the rotor poles.

FIG. 16 shows by (a) a linear development of the surface configuration of the stator poles of the individual phases, which surface configuration is opposed to the rotor. The surface configuration shown in FIG. 16 by (a) is completely the same as the one shown in FIG. 8 by (a). FIG. 16 shows by (b) a configuration obtained by applying FIG. 12A to the X magnetic poles 23 shown in FIG. 8 by (b). Reference 165 indicates N magnetic poles and reference 166 indicates S magnetic poles. FIG. 16 shows by (c) a configuration obtained by applying FIG. 12D to the X magnetic poles 23 shown in FIG. 8 by (b). Reference 167 indicates N magnetic poles and reference 168 indicates S magnetic poles. FIG. 16 shows by (d) an example obtained by altering one end of each of the N and S magnetic poles in (c) of FIG. 16. Reference 169 indicates N magnetic poles and reference 16A indicates S magnetic poles. FIG. 16 shows by (e) an example obtained by altering one end of each of the N and S magnetic poles in (d) of FIG. 16. Reference 16B indicates N magnetic poles and reference 16C indicates S magnetic poles. In (e) of FIG. 16, the N and S magnetic poles 16B and 16C each have a shape of a triangle.

Figure 17:
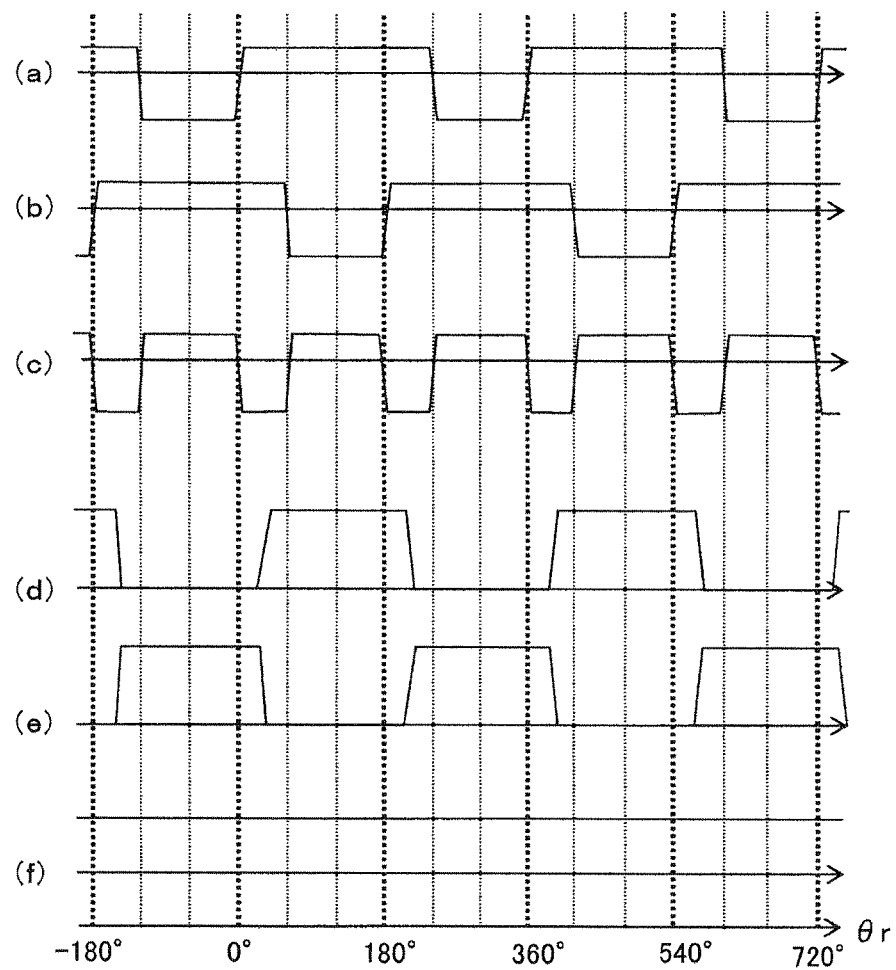
FIG. 17 is a diagram illustrating currents Ia and Ib and torque Tm in the case of the rotor poles illustrated in FIG. 16 by (b)

FIG. 17 shows examples of inductive voltage and current and examples of torque of a motor obtained by combining the stator poles shown in FIG. 16 by (a) and the rotor configuration shown in FIG. 16 by (e). FIG. 17 shows by (a) A-phase inductive voltage Va. FIG. 17 shows by (b) B-phase inductive voltage Vb. FIG. 17 shows by (c) C-phase inductive voltage Vc. FIG. 17 shows by (d) an example of A-phase current Ia. FIG. 17 shows by (e) an example of B-phase current Ib. Thus, when currents of the individual phases are alternately supplied to flat portions of the voltages of the individual phases, the resultant torque has small torque ripple, as shown in FIG. 17 by (f).

Since the magnets each have a triangular shape, at least in the region of the magnets, the change of attraction force between the stator and the rotor is smoothed, which change is due to the shifting of magnets. Thus, favorable characteristics of low vibration and low noise are obtained. In this regard, the maximum and minimum values of interlinkage flux of the A-phase stator poles 161 in (e) of FIG. 16 are approximately ⅔ of these values in (b) of FIG. 16. Accordingly, as far as torque is concerned, the torque obtained in (b) of FIG. 16 is larger.

Fourth Embodiment

Figure 18:
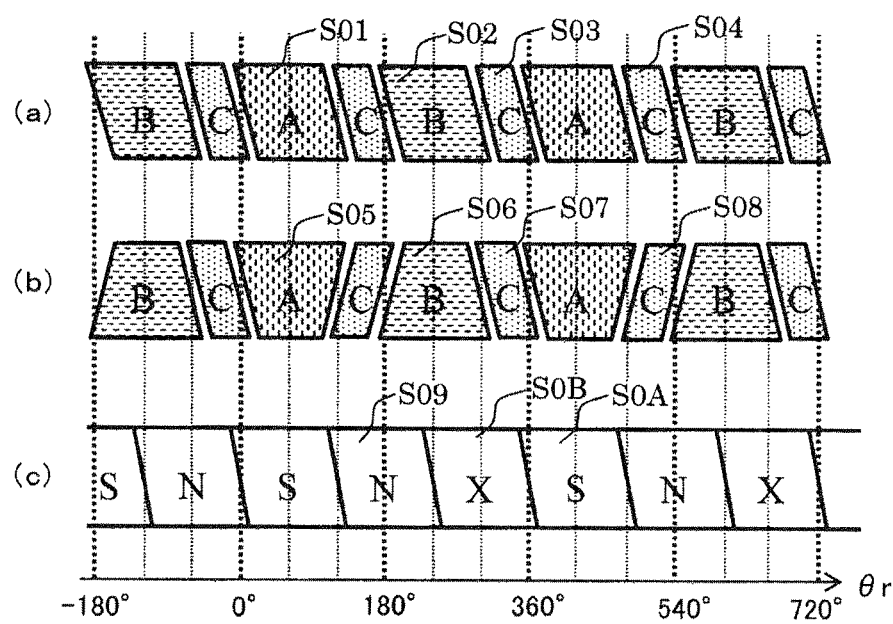
FIG. 18 is a diagram illustrating an example of stator poles each having a trapezoidal shape, or a skewed shaped.

FIG. 18 shows by (a) an example of a skewed shapes of stator poles as indicated by references S01 S02, S03 and S04.

FIG. 18 shows by (c) an example of a skewed configuration of rotor poles S09, S0A and S0B. When a circumferential end of the stator poles comes near a circumferential boundary portion of the rotor poles, the rate of rotation change of the attraction force generated between the stator and the rotor tends to be increased. In this regard, by skewing either one of the stator and the rotor, the rate of rotation change of the attraction force is decreased. As a result, vibration of the stator and the rotor is reduced and thus noise is reduced. The rate of change of the inductive voltages of the windings is also decreased when the positive and negative voltages are reversed. The effect of skewing, which depends on the relative positioning of the stator and the rotor, will be exerted if only relatively skewed configurations are provided. For example, when the stator and the rotor are reversely skewed from each other by a degrees, the motor will have an effect equivalent to the effect that would be obtained by 2×α degrees of skewing.

FIG. 18 shows by (b) a horizontal development of a circumferential surface configuration of the stator poles opposed to the rotor. In the configuration, the shapes of poles as indicated by references S05, S06, S07 and S08 are altered from the rectangular shape shown in FIG. 8 by (a) to trapezoidal and rhombic shapes.

The A-phase stator poles S05 correspond to the ones indicated by reference 13 in FIGS. 1, 2 and 7A. Considering a path through which magnetic flux passes from the rotor to the stator side, the trapezoidal poles S05 each having a broadened upper side as viewed in FIG. 18 are favorable in reducing magnetic saturation of the magnetic path. The B-phase stator poles S06 correspond to the ones indicated by reference 14 in FIGS. 1, 3 and 7A. Considering a path through which magnetic flux passes from the rotor to the stator side, the trapezoidal poles S06 each having a broadened lower side as viewed in FIG. 18 are favorable in reducing magnetic saturation of the magnetic path.

The trapezoidal shape of the A-phase stator poles S05 is reversed from that of the B-phase stator poles S06. The C-phase stator poles S07 and S08 correspond to the ones indicated by reference 14 in FIGS. 1, 4 and 7A. The poles S07 and S08 have substantially a rhombic shape. Since the C-phase stator poles are located at a center with respect to the direction along the rotor shaft, the magnetic flux from the rotor side is passed from both ends of each C-phase stator pole with respect to the direction along the rotor shaft to the center side. As will be understood from the comparison of (a) with (b) of FIG. 18, the magnetic fluxes passing through the stator poles of both of (a) and (b) have the same rate of rotation change and thus exert the same inductive voltage characteristics. Alterations in the shapes of stator poles and rotor poles have been shown in FIG. 18. However, these shapes may be variously altered such as into a sinusoidal shape.

The stator poles may cause flux leakage therebetween and in the vicinity thereof. Accordingly, the gaps between the stator poles are required to be appropriately provided. When the motor generates peak torque, the leaked magnetic flux becomes one of the causes of generating magnetic saturation in the stator magnetic paths.

Fifth Embodiment

Referring to FIG. 19, hereinafter will be described another technique of configuring the X magnetic poles of the rotor.

FIG. 19 shows a motor analogous to the one shown in FIG. 1. FIG. 19 is a linear development of circumferential configurations of the stator poles and the rotor poles in the surfaces of the stator and the rotor which are opposed to each other. In FIG. 19, the horizontal axis indicates rotational position θr of the rotor and the vertical axis corresponds to the direction along the rotor shaft. FIG. 19 shows an example of a motor whose whole circumference ranges from 0° to 720° in electrical angle.

FIG. 19 shows by (a) stator poles of the individual phases having the same configuration and characteristics as those of the stator poles of the individual phases shown in FIG. 8 by (a). References S21 and S22 indicate A-phase stator poles, references S23 and S24 indicate B-phase stator poles and references S25, S26, S27 and S28 indicate C-phase stator poles.

FIG. 19 shows by (b) a rotor pole configuration. References S29 and S2A indicate N magnetic poles having circumferential lengths of 120° and 240°, respectively, taking a different shape. References S2B and S2C indicate S magnetic poles having circumferential lengths of 240° and 120°, respectively, taking a different shape. References S2D, S2E, S2F and S2G indicate circumferential boundary portions between the rotor poles. The boundary portions S2D and S2E indicated by a double line have an interval of 360° therebetween in electrical angle.

On the other hand, FIG. 19 shows by (a) that the two A-phase stator poles S21 and S22 are similarly positioned in terms of electrical angle. Flux φa interlinking the A-phase winding 16 is a sum of flux φa1 passing from the rotor side to the A-phase stator pole S21 and flux φa2 passing from the rotor side to the stator pole S22. Thus, a relation φa=φa1+φa2 is established.

The rotor pole configuration includes a configuration R1 ranging from 0° to 360° in electrical angle, and a configuration R2 ranging from 360° to 720° in electrical angle which is different from the configuration R1. Thus, although the configurations R1 and R2 are different from each other, the interlinkage flux φa of the A-phase winding is twice as large as flux φave obtained from a configuration corresponding to an average of the configurations R1 and R2.

The interlinkage flux φa may be equivalently considered as being φa=φa1+φa2=2φave. FIG. 19 shows by (c) a configuration obtained by shifting the rotor poles shown in FIG. 19 by (b) in the circumferential direction by an angle 360°. FIG. 19 shows by (d) an average obtained by dividing by 2 the addition of (c) and (b) of FIG. 19. Rotor poles S2H, S2J, S2K and S2L shown in FIG. 19 by (c) have the same shapes and characteristics as those of the rotor poles S2C, S2A, S2B and S29, respectively, shown in FIG. 19 by (b). Rotor poles S2M and S2H shown in FIG. 19 by (c) indicate the same magnet.

Referring to (d) of FIG. 19, let us discuss the magnetic characteristics exhibited at each rotational position θr of the rotor. In a range of 0° to 120°, both of poles S2B and S2H are S magnetic poles. An average of these magnetic poles is also considered to be an S magnetic pole in a range of 0° to 120° of a pole S2N.

In a range of 120° to 240°, both of magnetic poles S29 and S2J are N magnetic poles. An average of these magnetic poles is also considered to be an N magnetic pole in a range of 120° to 240° of a pole S2P.

In a range of 240° to 360°, the pole S2C is an S magnetic pole and the pole 523 is an N magnetic pole. An average of these magnetic poles is considered, as shown in a range of 240° to 360° in FIG. 19 by (d), to be an S magnetic pole in the upper half of the pole S2Q and an N magnetic pole in the lower half of the pole S2P.

In a range of 360° to 480°, both of magnetic poles S2C and S2K are S magnetic poles. An average of these magnetic poles is also considered to be an S magnetic pole in a range of 360° to 480° of the pole S2Q.

In a range of 480° to 600°, both of poles S2A and S2L are N magnetic poles. An average of these magnetic poles is also considered to be an N magnetic pole in a range of 480° to 600° of a pole S2R.

In a range of 600° to 720°, the pole S2A is an N magnetic pole and the pole S2M is an S magnetic pole. An average of these magnetic poles is considered, as shown in a range of 600° to 720° in FIG. 19 by (d), to be an S magnetic pole in the upper half of the pole S2S and an N magnetic pole in the lower half of the pole S2R. Thus, the rotor pole configuration and characteristics as shown in the figure are provided. The matters concerning phase A also apply to the B-phase stator poles S23 and S24.

After all, the characteristics of the motor configured by the stator poles of the individual phases shown in FIG. 19 by (a) and the rotor poles shown in FIG. 19 by (b), are equivalent to the characteristics of the motor configured by these stator poles and the rotor poles shown in FIG. 19 by (d). The rotor poles shown in FIG. 19 by (d) are completely equivalent to the rotor shown in FIG. 8 by (b) with the application of the X magnetic pole configuration shown in FIG. 12A to the X magnetic poles. Accordingly, the motor configured by (a) and (b) of FIG. 19 resultantly realizes the characteristics of the N, S and X magnetic poles 21, 22 and 23 shown in FIG. 8 by (a) and (b).

In other words, in (b) of FIG. 19, an X magnetic pole is equivalently configured between the range 240° to 360° and the range 600° to 720° of the rotor. FIG. 19 shows by (b) a technique for realizing an X magnetic pole which is different from the X magnetic pole configuration examples shown in FIGS. 12A to 12D.

The technique shown in (a) and (b) of FIG. 19 includes a technique for circumferentially shifting a part of the circumferential boundary positions between the N and S magnetic poles of the rotor, and a technique for averaging the same-phase stator poles among multiple poles. As mentioned above, the magnetic pole boundary portions S2D and S2E indicated by double lines are fixed being spaced apart by an electrical angular range of 360°. Other two magnetic pole boundary portions S2F and S2G arranged between the boundary portions S2D and S2E are positioned at 240° and 720°, respectively, being relatively shifted in position by 120° in electrical angle. The boundary portion S2G is positioned at 360° in electrical angle. As a result, it is considered that the magnetic characteristics between the electrical angles 240° and 360° exhibit average characteristics. Other configuration requirements are as expressed such as by Formulas (24), (25), (26) and (27).

Figure 20:
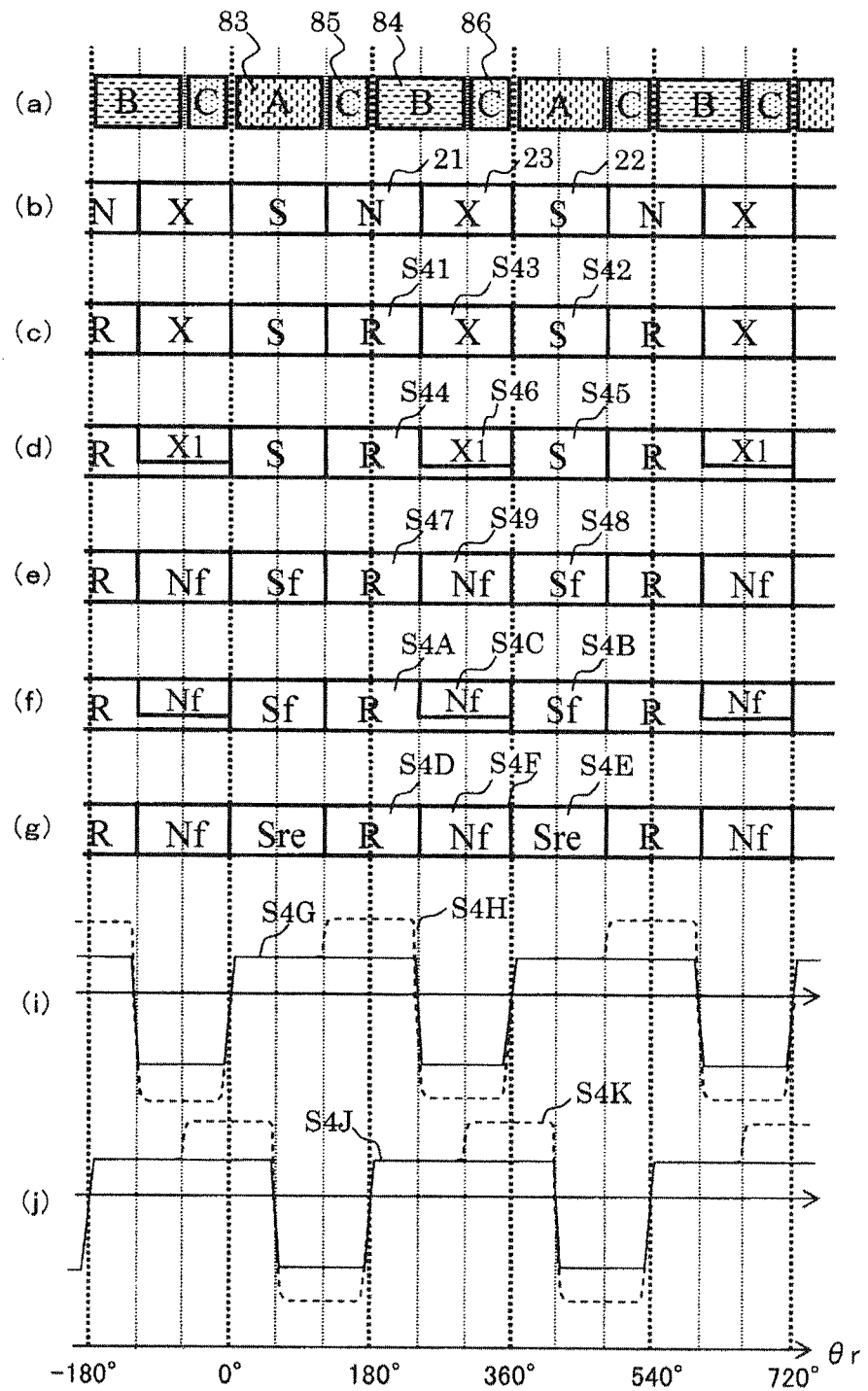
FIG. 20 is a diagram illustrating an example of a specific magnetic pole configuration of a rotor.

Further, as shown in FIG. 20, the rotor poles may partially be configured by a soft-magnetic material having high saturation magnetic flux density to increase peak torque of the motor. This can reduce the amount of permanent magnets and thus contributes to reducing cost. The rotor poles may mixedly include permanent magnets and soft-magnetic poles.

Sixth Embodiment

Referring to FIG. 20, hereinafter is described a configuration in which rotor poles are partially configured by a soft-magnetic material.

FIG. 20 shows by (a) and (b) stator poles and rotor poles of the individual phases, having the same configuration and characteristics as those of the stator poles of the individual phases shown in FIG. 8 by (a) and (b). The direction of the magnetic flux generated from the rotor side to the stator side is rendered to be plus. For example, S magnetic poles 22 are rendered to have a flux density Bs of −1.0 tesla, X magnetic poles 23 are rendered to have a flux density Bx of 0 tesla and N magnetic poles 22 are rendered to have a flux density Bn of +1.0 tesla. FIG. 20 shows an example using permanent magnets, such as rare-earth magnets, having high magnetic flux density.

The relationship such as between the voltages of the windings, magnetic flux density and torque of the motor is expressed such as by Formulas (2), (3) and (4). Thus, rates of rotation change dφa/dθr and dφb/dθr of interlinkage fluxes φa and φb of the windings, and torque Tm are in proportion to differences (Bx−Bs) and (Bn−Bx) in magnetic flux density between the rotor poles. Substituting specific magnetic flux densities, (Bx−Bs)=1.0 tesla, and (Bb−Bx)=1.0 tesla are obtained. A- and B-phase inductive voltages Va and Vb have voltage waveform configurations as shown in FIG. 8 by (i) and (j).

The torque Tm of the motor is configured to be generated by applying magnetomotive force from the rotor side to the stator side with the supply of current to the windings, and by generating magnetic flux. Accordingly, soft-magnetic poles, such as of silicon steel plates, may be used in place of the N magnetic poles 21, i.e. N-pole permanent magnets.

FIG. 20 shows by (c) an example in which the N magnetic poles 21 are replaced by soft-magnetic poles S41. Rotor poles such as of silicon steel plates have a large saturation magnetic flux density approximate to 2 tesla. Accordingly, the (Nb−Bx) mentioned above shows a value approximate to 2 tesla, thereby enhancing maximum torque. At the same time, since the amount of magnets is reduced, cost is also reduced. The A- and B-phase inductive voltages Va and Vb in this case have voltage waveform configurations as indicated by broken lines S4H and S4K, respectively, in (i) and (j) of FIG. 20. Angle ranges, which are not indicated by the broken lines, show voltage waveform configurations as indicated by S4G and S4J. However, use of soft-magnetic poles necessitates the use of a load of excitation current, for torque may be reduced in a small current range.

In (c) of FIG. 20, the differences (Bx−Bs) and (Bn−Bx) in magnetic flux density are unbalanced. An improved example is shown in FIG. 20 by (d).

A portion S46 of a permanent magnet having an average magnetic flux density of zero is combined with a soft-magnetic pole S44, so that the X magnetic pole in a range of 240° to 360° will have a magnetic flux density of +0.5 tesla. In this range, if the length of the soft-magnetic pole in the direction along the rotor shaft is ¼ of the entire length, an average magnetic flux density when current is applied is about 0.5 tesla. In this case, flux densities Bs, Bx and Bn are −1.0 tesla, +0.5 tesla and 2.0 tesla, respectively. Accordingly, (Bx−Bs)=1.5 tesla and (B−Bx)=1.5 tesla are obtained. As a result, inductive voltage waveforms having less unevenness are realized. Compared to the example shown in FIG. 20 by (b), the amplitude is larger by a factor of 1.5 and thus the voltage waveform configurations of (i) and (j) of FIG. 8 are obtained. The S magnetic pole S45 is configured similar to the S magnetic pole S42.

An example of a rotor pole configuration using ferrite magnets will be described referring to (e) of FIG. 20. Reference S48 indicates S magnetic poles, i.e. S magnetic poles of ferrite magnets, having a flux density Bs of −0.4 tesla. Reference 549 indicates X magnetic poles, i.e. N magnetic poles of ferrite magnets, having a flux density Bx of +0.4 tesla. Reference S47 indicates N magnetic poles, i.e. soft-magnetic poles, having a flux density Bn of +2.0 tesla. In this case, the differences in magnetic flux density are (Bx−Bs)=0.8 tesla and (Bn−Bx)=1.6 tesla. The A- and B-phase inductive voltages Va and Vb in this case have voltage waveform configurations as indicated by the broken lines S4H and S4K, respectively, in (i) and (J) of FIG. 20.

Ferrite magnets have characteristics of low magnetic flux density but high saturation magnetic flux density. Torque may be enhanced using these characteristics. Compared to rare-earth magnets, for example, ferrite magnets have characteristics of inexpensiveness and light weight. In the example shown in FIG. 20 by (e), voltages are a little imbalanced.

Referring to (f) of FIG. 20, a technique of improving the voltage balance is described.

In an electrical angular range of 240° to 360° in (f) of FIG. 20, the X magnetic pole is ensured to have a magnetic flux density of +0.8 tesla. In the electrical angular range of 240° to 360°, ¾ of the range is formed of an N magnetic pole S49, i.e. a ferrite magnet, and the remaining ¼ of the range is formed of a soft-magnetic pole S47. In this case, an average flux density Bx is about 0.8 tesla. Thus, the flux densities Bs, Bx and Bn are −0.4 tesla, +0.8 tesla and 2.0 tesla, respectively, obtaining (Bx−Bs)=1.2 tesla and (Bn−Bx)=1.2 tesla. As a result, inductive voltage waveforms having less unevenness are realized. Thus, voltage waveform configurations as shown in (i) and (j) of FIG. 8 are realized. The S magnetic pole S4B is configured similar to the S magnetic pole S48.

As another technique, the X magnetic poles S49 may be formed of N magnetic poles of so-called bond magnets which are obtained by shaping a rare-earth magnet powder and a resin to thereby provide a flux density Bx of +0.8 tesla. In this case, since the flux density Bs is −0.4 tesla and the flux density Bn is +2.0 tesla, the differences in the magnetic flux density are (Bx−Bs)=1.2 tesla and (Bn−Bx)=1.2 tesla. Owing to the improvement of the voltage balance, The A- and B-phase inductive voltages Va and Vb in this case will have voltage waveform configurations as shown in (i) and (j), respectively, of FIG. 8.

Referring to (g) of FIG. 20, hereinafter is described a technique of combining rare-earth magnets, for example, having high magnetic flux density, inexpensive ferrite magnets, and inexpensive soft-magnetic poles having high magnetic flux density, with good balance.

Reference S4E indicates S magnetic poles having a magnetic flux density of −1.2 tesla and formed such as of rare-earth magnets. Reference S4F indicates X magnetic poles formed of N magnetic poles of ferrite magnets and having a magnetic density of +0.4 tesla. Reference S4D indicates N magnetic poles configured by a soft-magnetic material and having a magnetic flux density Bn of 2.0 tesla. In this case, the differences in magnetic flux density are (Bx−Bx)=1.6 tesla and (Bn−Bx)=1.6 tesla. Being well balanced, inductive voltage waveforms having less unevenness are realized.

Specifically, the voltage waveform configurations of (i) and (j) of FIG. 8 are realized. Since the differences in magnetic flux density are as large as 1.6 tesla, large-torque characteristics are exhibited. Rare-earth magnets having high magnetic flux density are expensive. In this regard, the amount of rare-earth magnets can be reduced in the configuration shown in FIG. 20 by (g). Accordingly, a motor having high performance is manufactured at comparatively low cost.

There are a variety of soft magnetic materials ranging from those which have high saturation magnetic flux density to those which have low saturation magnetic flux density. Such soft-magnetic materials may be used as the situation demands. When a soft-magnetic material has a low saturation magnetic flux density, the material can be used for various configurations. For example, a rotor-pole configuration may be provided using a material of low saturation magnetic flux density. Another rotor-pole configuration may be provided using a material of high saturation magnetic flux density, with pieces of the material being arranged spaced apart from each other. Still another rotor-pole configuration may be provided using a non-magnetic material.

The configuration of the poles shown in FIG. 20 may be altered into the stator pole configuration and the rotor pole configurations shown such as in FIG. 14. Thus, torque may be further enhanced. In the example of current supply shown in FIG. 9 as well, if larger average torque output is needed, the current supply width of the A-phase current Ia and the B-phase current may be broadened up to an electrical angle of 240°. In this way, average torque is increased.

Seventh Embodiment

Figure 21:
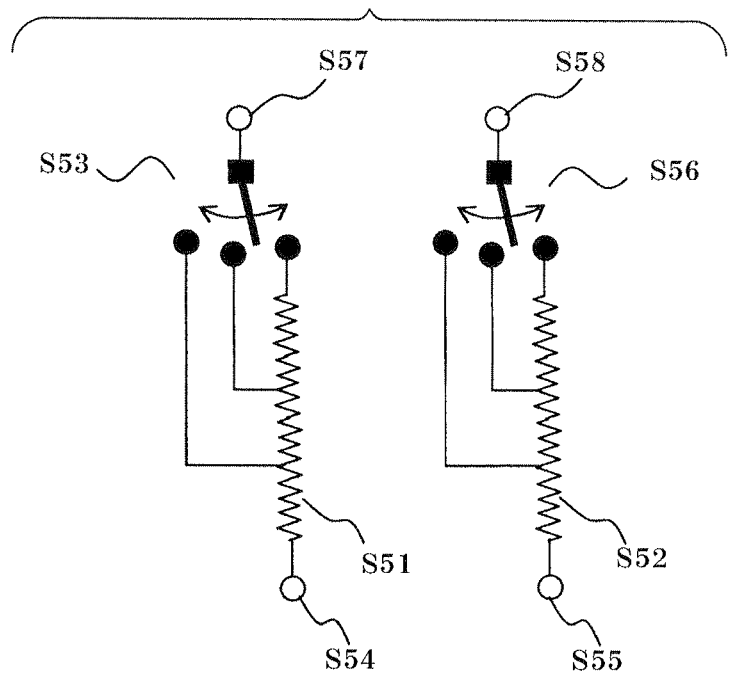
FIG. 21 is a diagram illustrating an example of a configuration for controlling switching of windings.

Referring to FIG. 21, hereinafter is described a technique of realizing driving with high-speed rotation by changing the number of turns of windings, using a winding switching means.

References S51 and S52 indicate two-phase windings such as of a motor shown in FIG. 1. Reference S54 indicates an end terminal of the winding 551 and reference 555 indicates an end terminal of the winding S52. As shown in the figure, the windings S51 and S52 have different ends from each of which the winding is ensured to be drawn at three positions. Thus, it is ensured that a tap of the windings is selected by using winding selecting means S53 and S56. By selecting a tap from each of the windings S51 and S52, the number of turns of the windings S51 and S52 to be controlled and to be supplied with current can be changed. References S57 and S58 indicate terminals of the windings S51 and S52, respectively, connected to the respective selected taps.

With this configuration, the number of turns of each of the windings can be selected from three different numbers of turns. Accordingly, a voltage across the winding terminals S54 and 557 and a voltage across the winding terminals S55 and S58 can be selected. In this way, the motor is controlled with a motor drive circuit that uses a constant voltage source to output torque under an operation with a broader range of revolution speed.

The voltage of each winding is in proportion to the number of turns of the winding. Accordingly, all turns of each winding are used at low-speed rotation and a tap of small number of turns is used at high-speed rotation. When control of constant output is needed, the range of constant output can be broadened by the winding selection. The number of taps used for the switching in the windings may be two, or may be several depending on needs. A simplest technique of providing winding taps is discussed here. However, for example, the number of turns may be changed by dividing the winding of each phase into two to change connection between serial connection and parallel connection. Thus, various winding switching configurations may be available.

Specifically, electromagnetic contactors may be used as the means S53 and S56 for switching winding taps. When such contactors are used for switching windings, the switching should be performed after reliably cutting off the currents. Thus, sparking of the contactors is prevented from occurring, and accordingly, the size of the contactors can be comparatively reduced. Alternatively, semiconductors, such as IGBTs, thyristors and triacs, may be used as the means for switching winding taps.

Further, as a means for changing the voltage of each winding of the motor, the length of the air gap between the stator and the rotor may be changed. Specifically, for example, the rotor may have a length Lr in the axial direction, which is larger than a length Ls in the stator in the axial direction by a factor of two. In this case, the stator may be permitted to have an inner diameter at one end which is larger/smaller by 10 mm than an inner diameter at the other end, so that the stator has a tapered shape. On the other hand, the rotor may be permitted to have a diameter at each end, which is smaller than the inner diameter of the stator by a length corresponding to twice of the length of the air gap. Thus, the rotor will have a tapered shape with the same taper angle as that of the stator. Further, the stator is permitted to be movable in its position relative to the rotor in the direction of the rotor shaft by a length up to the length Ls of the stator in the axial direction. When the position of the stator with respect to the rotor in the direction along the rotor shaft is relatively shifted by the length Ls in this configuration, the amount of air gap can be increased by 10 mm in terms of the diameter. The length of the air gap on one side may be made variable by 5 mm. Thus, by changing the length of the air gap, the magnetic flux between the stator and the rotor can be changed. Accordingly, the inductive voltages of the motor are changed to thereby broaden the variable range of the revolution speed of the motor. Further, according to an alternative technique, the effective length of the rotor may be mechanically changed. According to another alternative technique, the amount of magnetic flux of the rotor may be mechanically changed.

Eighth Embodiment

Figure 22:
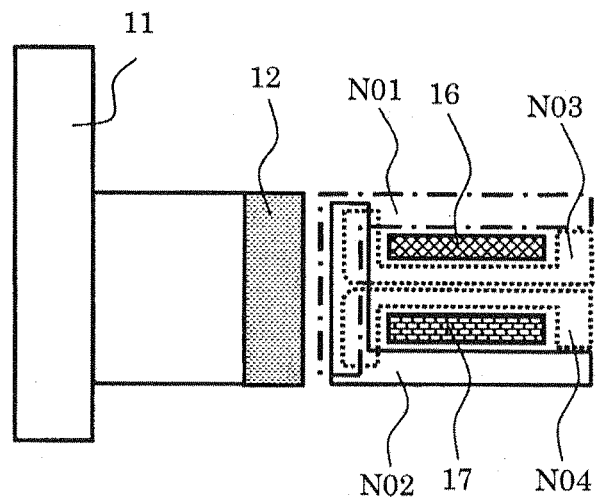
FIG. 22 is a vertical cross-sectional view illustrating a motor in which the magnetic paths of the motor illustrated in FIG. 1 are achieved by bending electromagnetic steel plates.

Referring to FIG. 22, hereinafter is described a specific structure of the motor of the present invention. FIG. 22 is a vertical cross-sectional view of the specific structure.

The components constituting the electromagnetic functions of the motor of the invention shown such as in FIG. 1 are roughly divided into the loop windings of the stator, the magnetic circuit of the stator and the rotor poles.

FIG. 22 shows a technique of manufacturing the magnetic circuit of the stator of the motor shown in FIG. 1 by punching and bending electromagnetic steel plates. In the applications such as of accessories of automobiles and household electric appliances, small-size motors are very often used. Such motors are usually located in gaps between various mechanisms and thus are often required to have a flat and thin structure. FIG. 22 shows a motor structure exhibiting characteristics as a motor for an area corresponding to 0.5 Nm or less in terms of torque.

Reference 11 indicates a rotor shaft and reference 12 indicates rotor poles, such as permanent magnets. Reference 16 indicates an A-phase winding and reference 17 indicates a B-phase winding. Reference N01 indicates a member configuring A-phase stator poles and a magnetic path. The configuration of the A-phase stator poles is similar to the one shown by references 13 and 18 of FIG. 2, reference 24 of FIG. 7B and reference 83 of FIG. 8.

This soft-magnetic member N01 is manufactured by punching flat electromagnetic steel plates into an appropriate shape using a pressing die or the like, followed by bending or drawing using a die or the like. Manufacture through the processes using dies can shorten processing time and facilitate automation, enabling mass production at low cost. Taking as an example a motor having small torque output, the magnetic circuit can be formed by a single electromagnetic steel plate. When large torque is desired, two or three electromagnetic steel plates are stacked to increase magnetic flux to be passed therethrough and to thereby enhance torque.

Reference N02 indicates a member configuring B-phase stator poles and a magnetic path. The configuration of the B-phase stator poles is similar to the one shown by references 14 and 18 of FIG. 3, reference 24 of FIG. 7B and reference 84 of FIG. 8. This soft-magnetic member N02 is manufactured in a manner similar to that of the soft-magnetic member N01.

References N03 and N04 each indicate member configuring C-phase stator poles and a magnetic path. The configuration of each C-phase stator poles is similar to the one shown by references 15 and 18 of FIG. 4, reference 24 of FIG. 7B and references 85 and 86 of FIG. 8. These soft-magnetic members N03 and N04 are manufactured in a manner similar to those of the soft-magnetic members N01 and N02. However, the soft-magnetic members N03 and N04 are different from the soft-magnetic members N01 and N02 in the location and the shape. Accordingly, these materials N03 and N04 may be designed such as to have an integrated configuration. Further, when large torque is desired, the number of electromagnetic steel plates may be changed.

Various types of electromagnetic steel plates may be used, such as SPCC, silicon steel plates and electromagnetic stainless steel plates, depending on needs, such as cost, easiness of manufacture and performance. Also, the thickness of such electromagnetic steel plates may be increased according to the magnitude of torque. Since electromagnetic stainless steel plates are easily processed and have large electric resistance, eddy-current loss is comparatively small. When a soft-magnetic member having such a configuration is used, measures for reducing eddy current have to be taken as necessary. First of all, in order to reduce current induced in the circumferential direction, it is effective to provide a cut surface at a portion in the circumferential direction to increase electric resistance in the circumferential direction.

In order to reduce eddy current at portions of electromagnetic steel plates, it is effective to provide cuts at portions convenient for the electromagnetic steel plates to suppress flow of eddy current. When electromagnetic steel plates are used being stacked, it is effective to apply an electrically insulating coating to the surface of each electromagnetic steel plate or to interpose an electrically insulating film between the plates. Further, various soft-magnetic members, such as powder magnetic cores, solid cores and amorphous sheets, may be used, other than electromagnetic steel plates, for the magnetic paths of the stator and the rotor. Powder magnetic cores can be provided by applying electrically-insulating coating to the surface of a powdered soft-magnetic material, followed by pressing with a die for formation into a desired shape. Accordingly, powder magnetic cores exhibit characteristics of reducing eddy-current loss and enabling broadening of the magnetic path cross-sectional area to increase fluxes φa and φb of the phases. In addition, high-capacity motors may also be realized.

Ninth Embodiment

Figure 23:
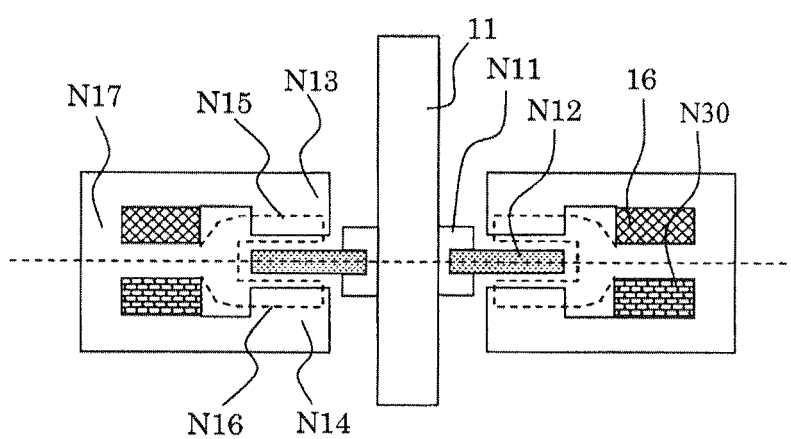
FIG. 23 is a diagram illustrating an example of a vertical cross-sectional view of a motor of the present invention which is provided with disk-shaped permanent magnets.

Referring to FIG. 23, hereinafter is described an example of the motor of the present invention, in which disk-shaped permanent magnets are used.

Figure 24A:
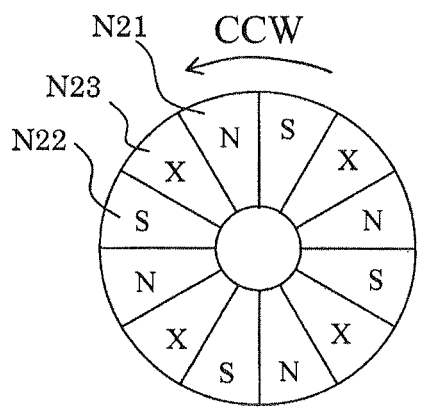
FIGS. 24A and 24B are diagrams illustrating examples of a permanent magnet configuration on one side in the direction of the rotor shaft of the motor illustrated in FIG. 23, and a stator pole configuration opposed to the permanent magnet configuration, as viewed from the same direction.
Figure 25A:
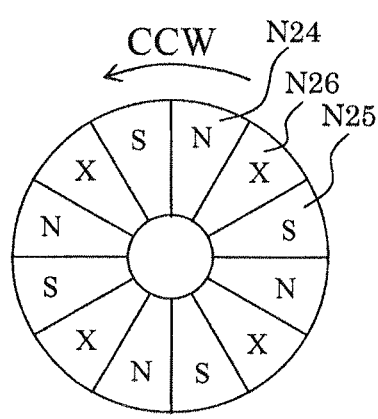
FIGS. 25A and 25B are diagrams illustrating examples of a permanent magnet configuration and a stator pole configuration opposed thereto, as viewed from a direction opposite to the direction in FIG. 24.

Reference N12 indicates permanent magnets as shown in FIGS. 24A and 25A. Reference N11 indicates a fixation member supporting the permanent magnets N12. Reference 16 indicates an A-phase winding and reverence N30 indicates a D-phase winding. Reference N13 shown by a solid line indicates A-phase stator poles. References N15 and N16 shown by a broken line indicate C-phase stator poles. Reference N17 indicates a back yoke portion of the stator. The soft-magnetic member of the stator may be manufactured, as described above, using electromagnetic steel plates, powder magnetic core or the like.

The permanent magnets N12 have a surface configuration opposed to the A-phase stator poles N13, as shown in FIG. 24A as viewed from the top in FIG. 23. Reference N21 indicates N magnetic poles, reference N22 indicates S magnetic poles and reference N23 indicates X magnetic poles of the rotor. The A-phase stator poles N13 has a surface configuration opposed to the permanent magnets 12, as shown in FIG. 24B as viewed from the top in FIG. 23.

Figure 24B:
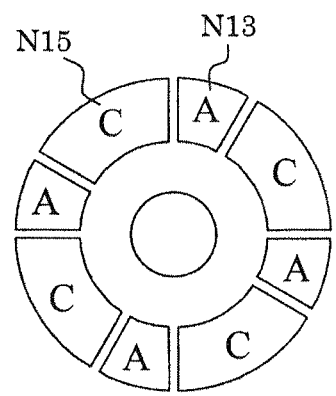

As shown in FIG. 24B, the C-phase stator poles N15 occupy all of the space other than the space occupied by the A-phase stator poles N13. In this case, interlinkage flux φa of the A-phase stator poles N13 exhibits characteristics which are qualitatively the same as those of the interlinkage flux φa of the A-phase stator poles 83 shown in FIG. 8 by (a).

The permanent magnets N12 have a surface configuration opposed to the D-phase stator poles N14, as shown in FIG. 25A as viewed from the top in FIG. 23. Reference N24 indicates N magnetic poles, reference N25 indicates S magnetic poles and reference N26 indicates X magnetic poles of the rotor. FIG. 25A shows a rear side of the disk-shaped permanent magnets shown in FIG. 24A. Accordingly, the rear side of each N magnetic pole is an S magnetic pole, a rear side of each S magnetic pole is an N magnetic pole, and a rear side of each X magnetic pole is an X magnetic pole assuming an average magnetic flux density to be zero. With this magnetization, when the rotor is rotated in the counterclockwise direction CCW, the order of poles is S, X and N magnetic poles in FIG. 25, and N, X and S magnetic poles in FIG. 25B. Thus, the order of poles is reversed.

Figure 25B:
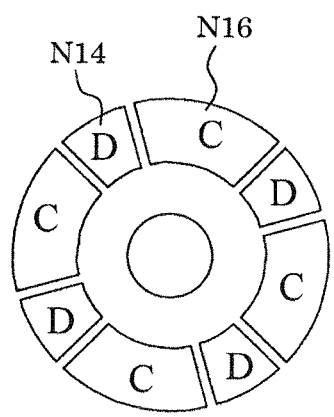

The D-phase stator poles N14 have a surface configuration opposed to the permanent magnets N12, as shown in FIG. 25B as viewed from the top in FIG. 23. As shown in FIG. 25B, the C-phase stator poles N16 occupy all of the space other than the space occupied by the D-phase stator poles N14. In this case, flux φd passing through the D-phase stator poles N14 exhibits characteristics in which the sign of the flux is reversed from that of the flux φb passing through the B-phase stator poles 84 shown in FIG. 8 by (a), as expressed by φd=−φb. The reason why the sign is reversed is that the disk-shaped permanent magnets have a front and rear relationship as shown in FIGS. 25A and 24A. Accordingly, current Id of the D-phase winding N30 which is interlinked with the D-phase flux φd is required to have a sign reversed from that of the B-phase current Ib, as expressed by Id=−Ib. As a result, both of voltage and current of the windings are reversed between phases B and D. Thus, generated B- and D-phase torque components are unidirectional.

Permanent magnets, such as the permanent magnets 12 used in the rotor shown in FIG. 1, i.e. the permanent magnets as indicated by references 21, 22 and 23 in FIG. 2, are required to be accurately formed into an arc shape. Manufacture and assemblage of such permanent magnets are not easy and the cost therefor is not low. In this regard, the permanent magnets N12, N21, N22, N23, N24, N25 and N26 of the rotor shown in FIGS. 23, 24A, 24B, 25A and 25B have a simple disk-shaped shape. This simple shape facilitates the manufacture of the magnets and assemblage of the rotor, and thus the motor can be produced at low cost. Further, this simple shape enables use of both of front and rear sides of the permanent magnets, and thus the C-phase stator poles N15 and N16 are provided with a wider space. Accordingly, a high degree of freedom is achieved in the alteration of the circumferential width of the A- and D-phase stator poles N13 and N14 and the rotor poles. In addition, motor characteristics may be easily improved. When the permanent magnets N12 are rotated, centrifugal force, vibration and attraction force are applied. Accordingly, the strength of the magnets will be at issue from a viewpoint of achieving reliability. Taking this into account, the surface, for example, of each permanent magnet N12 may be protected by a non-magnetic material to enhance the strength.

Tenth Embodiment

Figure 26:
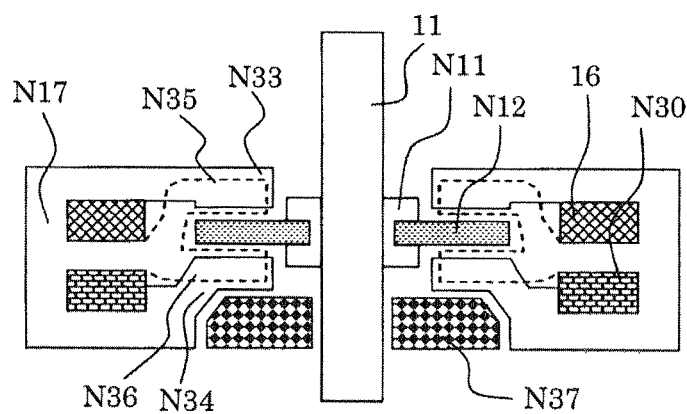
FIG. 26 is a diagram illustrating a configuration in which a control circuit of the motor illustrated in FIG. 23 is arranged on a radially inner side of the stator.

Referring to FIG. 26, hereinafter is described size reduction of the motor as a whole including the control circuit of the motor. As shown in FIGS. 23 and 26, the degree of freedom is enhanced in the configurations of the peripheries of the rotor by using the disk-shaped permanent magnets N12. Reference N33 shown by a solid line indicates A-phase stator poles. Reference N34 shown by a solid line indicates D-phase stator poles. References N35 and N36 shown by a broken line indicate C-phase stator poles. Reference N37 indicates a control circuit of the motor. In order to ensure the space for the control circuit N37, the motor configuration shown in FIG. 23 has been altered. The arrangement and configuration shown in FIG. 26 simplify and reduce the motor configuration including the control circuit N37.

Eleventh Embodiment

Figure 27:
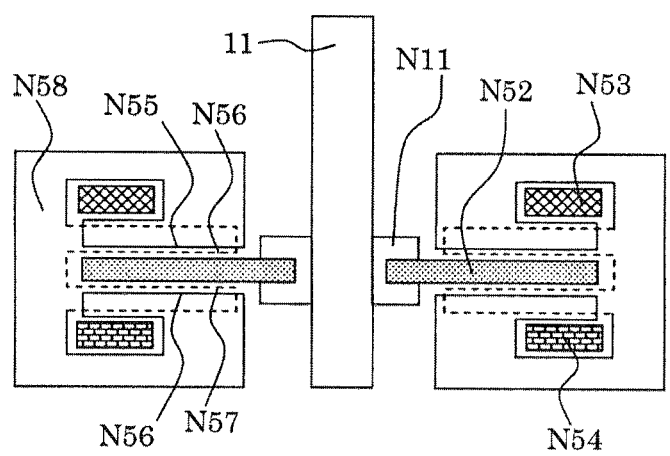
FIG. 27 is a diagram illustrating an example of a motor having a configuration in which the outer diameter of the permanent magnets of the rotor of the motor illustrated in FIG. 23 is larger than the inner diameter of the windings.

Referring to FIG. 27, hereinafter is described a method of obtaining high torque by changing the location and configuration of the rotor.

Torque Tm of the motor is in proportion to the A- and B-phase inductive voltages Va and Vb as expressed by Formulas (22) and (23), and also in proportion to the A- and B-phase interlinkage fluxes φa and φb as expressed by Formulas (2) and (10). As a technique of raising torque in a limited motor configuration, the diameter of the rotor may be increased as shown in FIG. 27.

In the case of disk-shaped permanent magnets as indicated by reference N52, the amount of magnetic flux is proportionate to a square of the diameter. Accordingly, for example, when the diameter of the rotor is increased by a factor of 1.5, the torque is increased by a factor of 2.25.

In FIG. 27, the disk-shaped permanent magnets N52 each have an outer diameter larger, by a factor of about 1.5, than the outer diameter of each of the permanent magnets N12 shown in FIG. 23. Accordingly, torque which is larger by a factor of about 2.25 can be expected. Reference N55 shown by a solid line indicates S-phase stator poles. Reference N56 shown by a solid line indicates D-phase stator poles. References N56 and N57 shown by a broken line indicate C-phase stator poles. Reference N58 indicates a back yoke of the stator. The back yoke N58 has a larger length in the direction along the rotor shaft than the back yoke N17 shown in FIG. 23.

In the motor having a configuration as shown in FIG. 1, there is a structural limit in increasing the diameter of the rotor. It is known that such a cylindrically shaped rotor is used for an outer-rotor motor configuration as a means for increasing interlinkage flux of the windings. Such an outer-rotor motor configuration, in which the radially outer side of the motor is rotated, is positively used in specific applications, such as fans, for which the radially outer side rotation is convenient. As far as magnetic flux and torque are concerned, the motor shown in FIG. 27 is almost equivalent to a configuration obtained by altering the motor shown in FIG. 1 into a motor having the outer-rotor configuration. Moreover, having an inner-rotor configuration, the motor shown in FIG. 27 can be used in broad range of general applications. It is considered that the disk-shaped permanent magnets N52 contribute to increasing the degree of freedom of the motor structure, and thus to realizing the motor shown in FIG. 27.

Twelfth Embodiment

Figure 28:
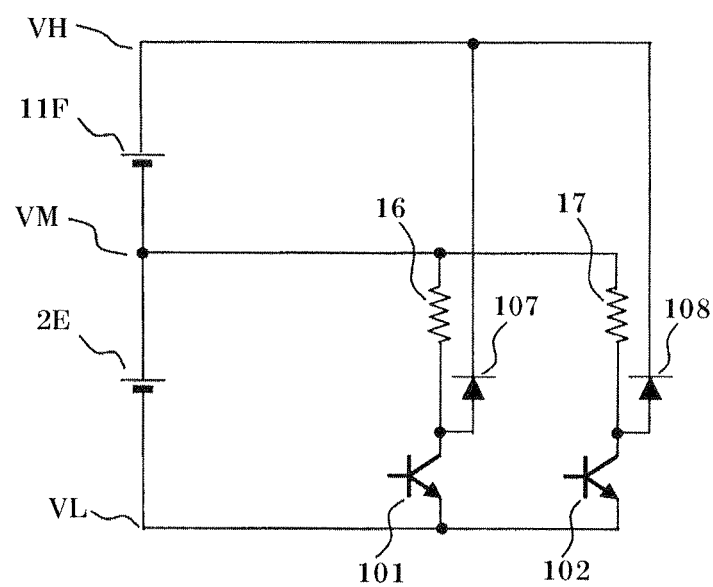
FIG. 28 is a diagram illustrating a motor driven by two DC power sources and two transistors.

Referring to FIG. 28, hereinafter is described an example of a control circuit of the motor of the present invention.

FIG. 28 shows a configuration in which the DC-DC converter 10E shown in FIG. 10 is replaced by a DC voltage source 11F. In particular, if the DC voltage source 11F is used in a peripheral device and can be extensively used, the number of parts of the control circuit of the motor will be reduced as shown in the figure. This is very advantageous from a viewpoint of cost. The DC voltage source 11F may be shared between a plurality of motors.

Thirteenth Embodiment

Figure 29:
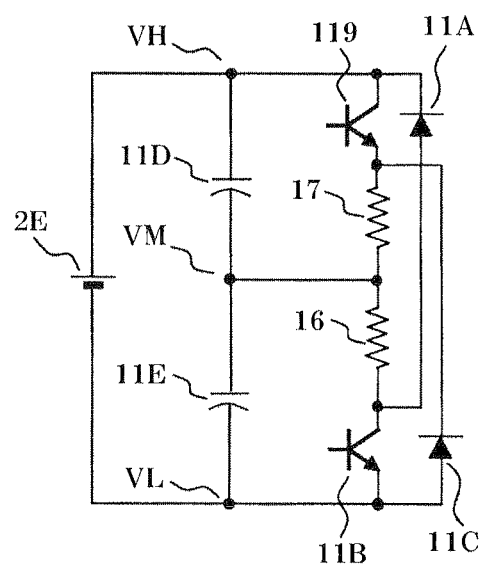
FIG. 29 is a diagram illustrating a motor driven by two DC power sources and two transistors.

Referring to FIG. 29, hereinafter is described an example of a control circuit including one DC voltage source and two transistors. Reference 16 indicates an A-phase winding, reference 11B indicates a transistor for supplying A-phase current Ia, and reference 11A indicates a diode that regenerates the magnetic energy of the A-phase winding to a DC voltage source 2E. Reference 17 indicates a B-phase winding, reference 119 indicates a transistor for supplying B-phase current Ib, and reference 11C indicates a diode that regenerates the magnetic energy of the B-phase winding to the DC voltage source 2E.

References 11D and 11E indicate capacitors for supplying and regenerating electric power to the windings 16 and 17. In this case, an intermediate potential VM is substantially intermediate of the voltage of the DC voltage source 2E. One of the capacitors may be omitted.

Although the capacitors 11D and 11E are provided as loads, the control circuit shown in FIG. 29 is run by one DC voltage source and two transistors.

Fourteenth Embodiment

Figure 30:
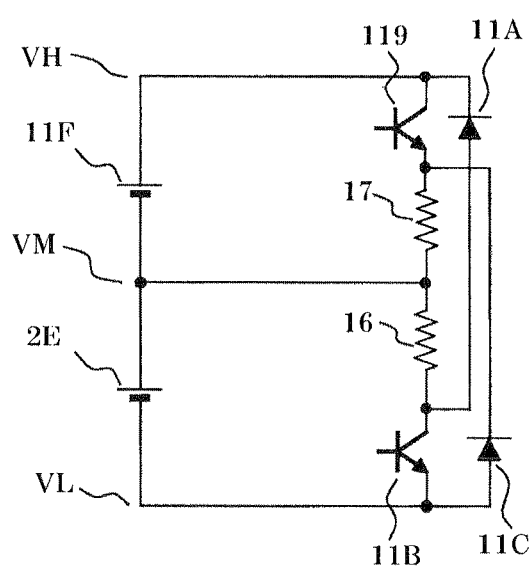
FIG. 30 is a diagram illustrating a motor driven by two DC power sources and two transistors.

FIG. 30 shows an example of a control circuit including two DC voltage sources and two transistors. The intermediate potential VM shown in FIG. 29 is created by DC voltage sources 2E and 11F.

Fifteenth Embodiment

Figure 31:
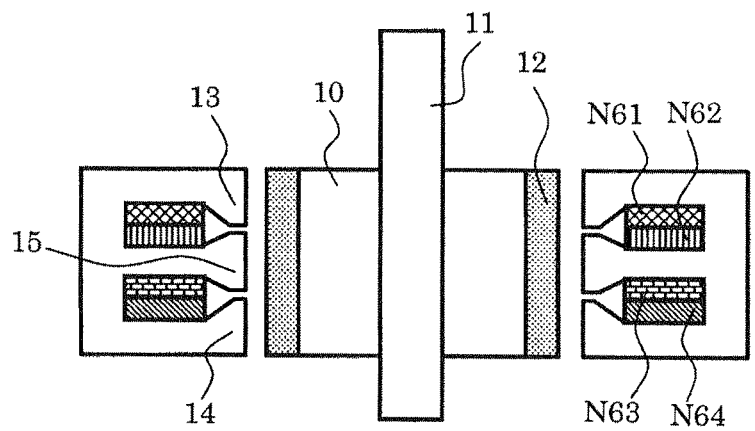
FIG. 31 is a diagram illustrating an example of a motor having slots in each of which two annular windings are wound in parallel.
Figure 32:
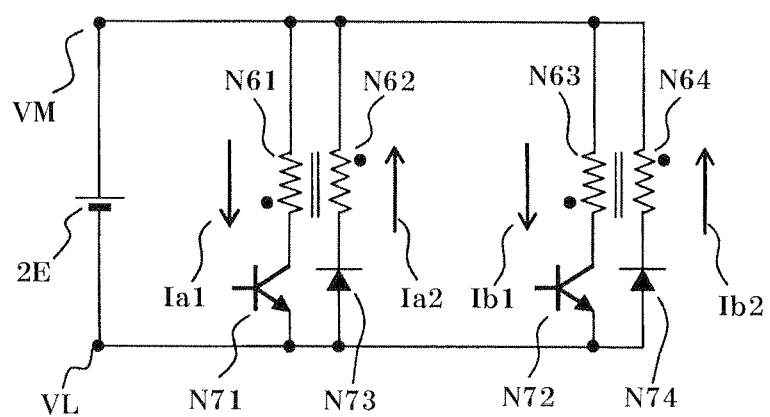
FIG. 32 is a diagram illustrating an example of a control circuit for supplying current to the windings illustrated in FIG. 31.

FIGS. 31 and 32 show an example of the motor of the present invention and a control circuit, including one DC voltage source and two transistors.

In FIG. 31, the windings 16 and 17 of the motor shown in FIG. 1 are each divided into two. The A-phase winding 16 is divided into windings N61 and N62, and the B-phase winding 17 is divided into windings N63 and N64. Since two windings are wound in each slot, the two windings in one slot have substantially even interlinkage flux.

In the motor, the number of turns of each of the A-phase windings N61 and N62 is Nw. Currents passed to the windings N61 and N62 are Ia1 and Ia2, respectively. Also, both of the windings are ideally rendered to have even interlinkage flux, with the inductance being La. Further, mutual inductance of the A- and B-phase windings is Lmab, and the interlinkage flux component acted by the permanent magnets of the rotor poles on the A-phase stator poles is φamg. In this case, the voltage and current are expressed as follows:

$$Va = La \times d(Ia1 + Ia2)/dt - Lmab \times d(Ib1 + Ib2)/dt + \quad (28)$$
$$Nw \times d\phi amg/dt$$
$$= Nw \times d(\phi ai)/dt - Nw \times d(\phi amu)/dt + \quad (29)$$
$$Nw \times d\phi amg/dt$$

In the above formulas, φai is an interlinkage flux component which is produced by current (Ia1+Ia2) of both of the A-phase windings and the inductance La thereof. Also, in the formulas, φamu is a magnetic flux component produced by B-phase current (Ib1+Ib2) and interlinking the A-phase windings.

As shown in Formulas (28) and (29), the magnetic flux component of the inductance La of the A-phase windings is expressed as follows:

$$La \times (Ia1+Ia2) = Nw \times \phi ai \quad (30)$$

As shown in FIG. 32, the current Ia1 is directed from potential VM toward potential VL and supplied via a transistor N71. The current Ia2 is directed from potential VL toward potential VM and supplied via a diode N73. The direction of the voltage of the A-phase winding N61 is reversed from that of the voltage of the A-phase winding N62, but both of the voltages have the same magnitude.

In order to more commonalize interlinkage flux (φai+φamu+φamg) of both of the A-phase windings N61 and N62, so-called bifilar winding may be adopted. In the bifilar winding, two windings are wound in individual slots so that one winding extends along the other winding as close as possible. In practice, the interlinkage flux is not completely the same between the A-phase windings N61 and N62, but leakage flux components are produced, although the value is small. In Formulas (28) and (29), winding resistance is rendered to be zero and ignored. To be precise, a voltage drop that is a product of winding resistance and current may be added.

The B-phase windings N63 and N64 have a relationship therebetween similar to that of the A-phase windings. The number of turns of each of the windings is Nw. Currents of the windings are Ib1 and Ib2. Both of the windings are ideally rendered to have even interlinkage flux, with the inductance being Lb. Further, mutual inductance of the A- and B-phase windings is Lmab, and the interlinkage flux component acted by the permanent magnets of the rotor poles on the B-phase stator poles is φbmg. In this case, the voltage and current are expressed as follows:

$$Vb = Lb \times d(Ib1 + Ib2)/dt - Lmab \times d(Ia1 + Ia2)/dt + \quad (31)$$
$$Nw \times d\phi bmg/dt$$
$$= Nw \times d(\phi bi)/dt - Nw \times d(\phi bmu)/dt + \quad (32)$$
$$Nw \times d\phi bmg/dt$$

In the above formulas, φbi is an interlinkage flux component which is produced by current (Ib1+Ib2) of both of the B-phase windings and the inductance Lb. Also, in the formulas, φbmu is a magnetic flux component produced by A-phase current (Ia1+Ia2) and interlinking the B-phase windings.

As shown in Formulas (31) and (32), the magnetic flux component of the inductance Lb of the B-phase windings is expressed as follows:

$$La \times (Ia1+Ia2) = Nw \times \phi bi \quad (33)$$

As shown in FIG. 32, the current Ib1 is directed from potential VM toward potential VL and supplied via a transistor N72. The current Ib2 is directed from potential VL toward potential VM and supplied via a diode N74.

The voltage and current of these four windings can be controlled by the control circuit shown in FIG. 32. Reference N71 is a transistor for supplying voltage and current to the A-phase winding N61. Reference N73 is a diode for supplying current to the DC voltage source 2E when a voltage of (VM−VL) or more is to be applied to the A-phase winding N62. Reference N72 is a transistor for supplying voltage and current to the B-phase windings N63. Reference N74 is a diode for supplying and regenerating current to the DC voltage source 2E when voltage of (VM−VL) or more is to be applied to the B-phase winding N63.

Let us discuss here the currents Ia1 and Ia2 of the A-phase windings N61 and N62, respectively. Let us assume first that the currents Ia1 and Ia2 are zero, the rotational speed dθr/dt of the rotor is zero, and the B-phase currents Ib1 and Ib2 are also zero. Accordingly, the second and third terms on the right-hand sides of Formulas (28) and (29) are zero. When the transistor N71 is turned on, the voltage (VM−VL) of the DC voltage source 2E is applied to the winding N61 to increase the current Ia1 according to Formula (28). For example, if the transistor N71 is turned off when the current Ia1 is increased to 5 A, the current Ia1 instantaneously turns to zero and at the same time the current Ia2 turns from 0 A to 5 A. After that, the current Ia2 decreases according to Formula (28). Repeating the increase/decrease performance of the A-phase current (Ia1+Ia2), the current Ia1 of the A-phase winding N61 is fully controlled.

The A-phase current Ia of the A-phase winding 16 of the motor shown in FIG. 1 is almost equal to the A-phase current (Ia1+Ia2) shown in FIGS. 31 and 32. Both of the currents Ia1 and Ia2 are the currents of phase A. In this case, the flux φai of phase A establishes the relationship as shown in Formula (30). In this case, when the B-phase currents are supplied, voltage components of the second terms on the right-hand sides of Formulas (28) and (29) superimpose the A-phase inductive voltage Va.

Further, when the rotor is being rotated, voltage components of the third terms on the right-hand sides of Formulas (28) and (29) superimpose the A-phase inductive voltage Va. In this case, the superimposed voltage components are required to be taken into account in the voltage control of phase A by the transistor N71.

The same relationship is applied to the voltage Vb and currents Ib1 and Ib2 of the B-phase windings N63 and N64. Reference N72 is a transistor for supplying voltage and current to the B-phase winding N63. Reference 74 is a diode for supplying current to the DC voltage source 2E when a voltage of (VM−VL) or more is to be applied to the B-phase winding N64. Reference N72 is a transistor for supplying voltage and current to the B-phase windings N63. Reference N74 is a diode for supplying and regenerating current to the DC voltage source 2E when a voltage of (VM−VL) or more is to be applied to the B-phase winding N63.

Let us discuss here the currents Ib1 and Ib2 of the B-phase windings N63 and N64, respectively. Let us assume first that the currents Ib1 and Ib2 are zero, the rotational speed dθr/dt of the rotor is zero, and the A-phase currents Ia1 and Ia2 are also zero. Accordingly, the second and third terms on the right-hand sides of Formulas (31) and (32) are zero. When the transistor N72 is turned on, the voltage (VM−VL) of the DC voltage source 2E is applied to the winding N63 to increase the current Ib1 according to Formula (31). For example, if the transistor N72 is turned off when the current Ib1 is increased to 5 A, the current Ib1 instantaneously turns to zero and at the same time the current Ib2 turns from 0 A to 5 A. After that, the current Ib2 decreases according to Formula (31). Repeating the increase/decrease performance of the B-phase current (Ib1+Ib2), the current Ib1 of the B-phase winding N63 is fully controlled.

The B-phase current Ib of the B-phase winding 17 of the motor shown in FIG. 1 is almost equal to the B-phase current (Ib1+Ib2) shown in FIGS. 31 and 32. Both of the currents Ib1 and Ib2 are the currents of phase B. In this case, the flux ϕbi of phase B establishes the relationship as shown in Formula (33). In this case, when the A-phase currents are supplied, voltage components of the second terms on the right-hand sides of Formulas (31) and (32) superimpose the B-phase inductive voltage Vb.

Further, when the rotor is being rotated, voltage components of the third terms on the right-hand sides of Formulas (31) and (32) superimpose the B-phase inductive voltage Vb. In this case, the superimposed voltage components are required to be taken into account in the voltage control of phase B by the transistor N72.

A technique for performing control using one DC voltage source, two transistors and two diodes has so far been described as shown in FIGS. 31 and 32. Voltage drop components of one control element, which correspond to the voltage drop of one semiconductor, is ½ of the voltage drop in the three-phase AC inverter shown in FIG. 57. Thus, reduction of loss and high efficiency are realized. Since control is simplified in FIG. 32, cost reduction, size reduction and high efficiency are achieved in the motor. The motor shown in FIG. 31 may also be variously altered into the ones shown such as in FIGS. 23, 26 and 27.

Sixteenth Embodiment

Hereinafter is described a method and apparatus for controlling a motor that does not include a so-called encoder as a position sensor, and the like. When a motor such as in a small fan is driven, the motor is usually treated as a component including, all elements, such as a control circuit. Accordingly, such motors, as components including position sensing function and control function, are questioned about the competitiveness as commercial products. In a motor, when the motor is mass-produced, it is not uncommon that sensorless circuits and all other control circuits including power transistors are integrated into a single silicon chip. In such a case, a printed circuit board of conventional art is not used due to cost problem, but wiring is very often directly provided. Then, the direct wiring is mounted as one component of the motor. From this point of view, the motor of the present invention has a configuration different from the motors of conventional art, and thus is required to be provided with a unique sensorless position sensing function.

Figures 33, 34:
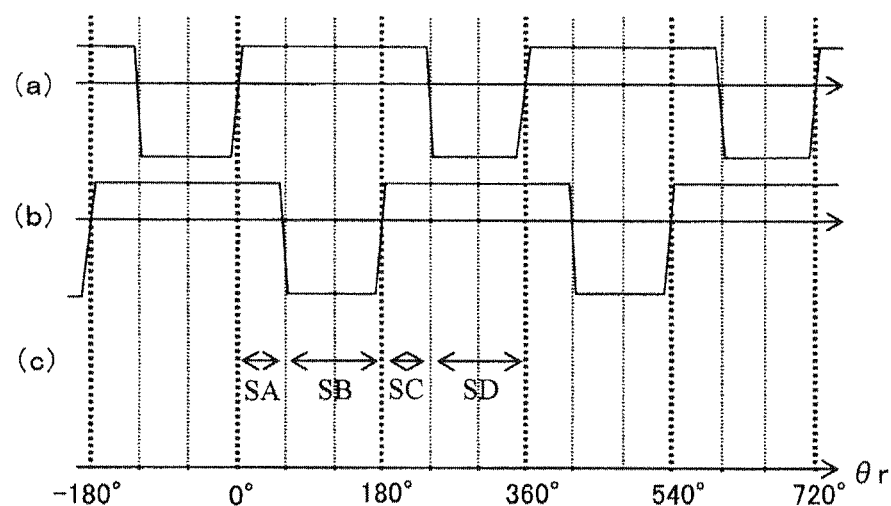
FIG. 33 is a diagram illustrating inductive voltage of a motor illustrated such as in FIG. 1 and ranges in the circumferential direction.
FIG. 34 is a table showing a classification, for example, of inductive voltage in individual rotational position ranges of the motor illustrated such as in FIG. 1.

FIG. 33 shows by (a) A-phase inductive voltage Va and by (b) B-phase inductive voltage Vb. These are the same as (i) and (j) of FIG. 8. In this case, as shown by (c) of FIG. 33, rotor position is detected by identifying ranges SA, SB, SC and SD in electrical angle of 0° to 360°.

FIG. 34 shows a theoretical correlation for the identification. For example, when the A-phase inductive voltage Va is "H" with a positive value and the B-phase inductive voltage Vb is "L" with a negative value, the range SB is identified. Thus, the rotational position θr of the rotor is detected to be 60° to 180°. When the A- and B-phase inductive voltages Va and Vb are both "H" with a positive value, the rotational position θr of the rotor cannot be specified. However, in an application such as of a fan in which the motor continues rotating in one direction, the rotational position θr of the rotor can be specified based on the anteroposterior relation, thereby realizing sensorless position detection. A specific detection circuit for detecting voltages of individual phases may be realized as a phase voltage detection circuit as shown in FIG. 35.

Seventeenth Embodiment

Figure 35:
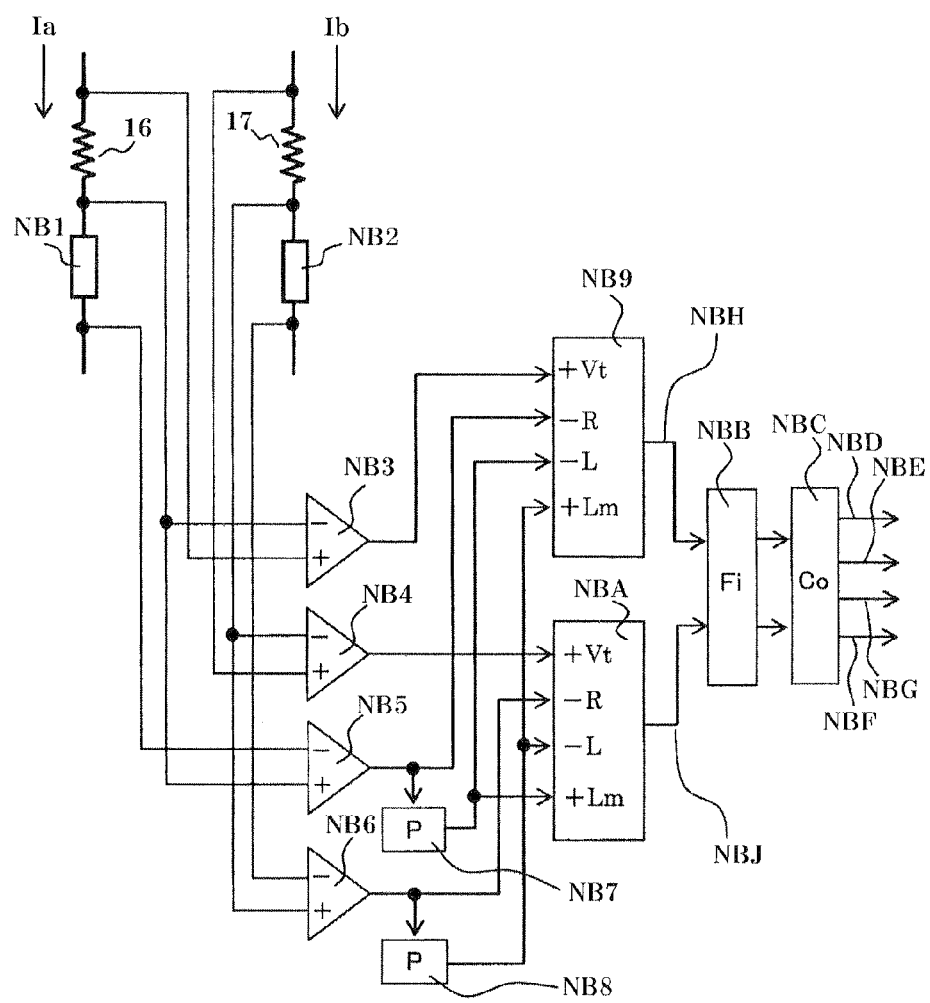
FIG. 35 is a block diagram illustrating detection of inductive voltage.

Referring to FIG. 35, hereinafter is described a technique of more accurately performing sensorless position detection for a motor.

Description hereinafter is based on the configuration of the motor shown such as in FIG. 1 or 8. Reference Vat indicates a voltage across the terminals of the A-phase winding 16. Reference Var indicates an inductive voltage. Reference La indicates an inductance of the A-phase winding. Reference Lmab indicates a mutual inductance of the A- and B-phase windings. Reference R indicates a winding resistance of the A- and B-phase windings. A relationship between the voltage and current is expressed as follows:

$$Vat = Var + Ia \times R + La \times dIa/dt - Lmab \times dIb/dt \quad (34)$$

Similarly, in phase B, reference Vbt indicates a voltage across the terminals of the B-phase winding 17. Reference Vbr indicates an inductive voltage. Reference Lb is an inductance of the B-phase winding. A relationship between the voltage and current is expressed as follows:

$$Vbt = Vbr + Ib \times R + Lb \times dIb/dt - Lmab \times dIa/dt \quad (35)$$

Altering Formulas (34) and (35), the following Formulas (36) and (37) are obtained:

$$Var = Vat - Ia \times R - La \times dIa/dt + Lmab \times dIb/dt \quad (36)$$

$$Vbr = Vbt - Ib \times R - Lb \times dIb/dt + Lmab \times dIa/dt \quad (37)$$

In Formulas (36) and (37), unknown quantities are the A-phase current Ia, B-phase current Ib, voltage Vat across the terminals of the A-phase winding 16 and voltage Vbt across the terminals of the B-phase winding 17

FIG. 35 shows a configuration for detecting the unknown quantities and detecting a rotational position θr of the rotor.

Since the A-phase current Ia is supplied to the A-phase winding 16, a shunt resistor NB1 is connected in series to allow a voltage detecting means NB5 to detect a value of the A-phase current Ia. Also, the voltage Vat across the terminals of the A-phase winding 16 is detected by a voltage detecting means NB3.

Similarly, in phase B, since the B-phase current Ib is supplied to the B-phase winding 17, a shunt resistor NB2 is connected in series to allow a voltage detecting means NB6 to detect a value of the B-phase current Ib. Also, the voltage Vbt across the terminals of the B-phase winding 17 is detected by a voltage detecting means NB4.

Reference NB7 indicates a differentiator for calculating a differential value dIa/dt of the A-phase current Ia. Reference NB8 indicates a differentiator for calculating a differential value dIb/dt of the B-phase current Ib.

Reference NB9 indicates an adder-subtractor for calculating the A-phase inductive voltage Var by adding signals of four items, i.e. Vat, −Ia×R, −La×dIa/dt and Lmab×dIb/dt according to Formula (36). The adder-subtractor NB9 has an output NBH corresponding to the A-phase inductive voltage Var. Reference NBA indicates an adder-subtractor for calculating the B-phase inductive voltage Vbr by adding signals of four items, i.e. Vbt, −Ib×R, −Lb×dIb/dt and Lmab×dIa/dt according to Formula (37). The adder-subtractor NBA has an output NBJ corresponding to the B-phase inductive voltage Vbr.

The voltages Vat and Vbt across the terminals in phases A and B, respectively, are applied with pulse-width modulation, as PWM, or the like by transistors in order to supply the currents Ia and Ib to the windings with correct values. Accordingly, in a resultant voltage waveform, voltages Vp and −Vp of a DC voltage source are repeated. However, detection according to Formulas (36) and (37) realizes detection of the A- and B-phase inductive voltages Var and Vbr, respectively, as shown in FIG. 33.

Reference NBB indicates a filter for removing high-frequency components, such as noise. In simple principle, the filter NBB is not necessary, but may be added, as required, to portions of the control circuit. The voltage detecting means NB5 and NB6 for detecting current use a high-frequency filter HF1. The voltage detecting means NB3 and NB4 for detecting voltage across the terminals use a high-frequency filter HF2. In order to consistently perform calculations based on Formulas (36) and (37), it is effective to bring characteristics of these filters HF1 and HF2 in conformity with each other.

Reference NBC indicates a logic circuit shown in FIG. 34. The logic circuit NBC receive inputs of the A- and B-phase inductive voltages Var and Vbr, respectively, and outputs NBD, NBE, NBF and NBG, which correspond to rotational position information of the ranges SA, SB, SC and SD, respectively. Rotational ranges SA and SC are identified based on rotational direction information and prior rotational position information. In the motor of the present invention, main rotational directions are specified. Accordingly, the ranges SA and SC are each identified based on prior rotational position information, i.e. rotational information immediately before entering the ranges SA and SC.

In the case of a large motor, values of the inductive voltages Var and Vbr can be obtained with accuracy of some degree if the second terms are ignored in Formulas (36) and (37) because the value R of winding resistance is small. In the case of a small motor, the second terms of Formulas (36) and (37) cannot be ignored because the winding resistance R in the winding impedance becomes relatively large. The fourth terms of Formulas (36) and (37) correspond to voltage components associated with the mutual inductance Lmab. Accordingly, in the case of a motor having a surface-magnet rotor that uses ferrite magnets, the voltage components are relatively small. Depending on motor configurations, the fourth terms of Formulas (36) and (37) may sometimes be ignored.

Figure 36:
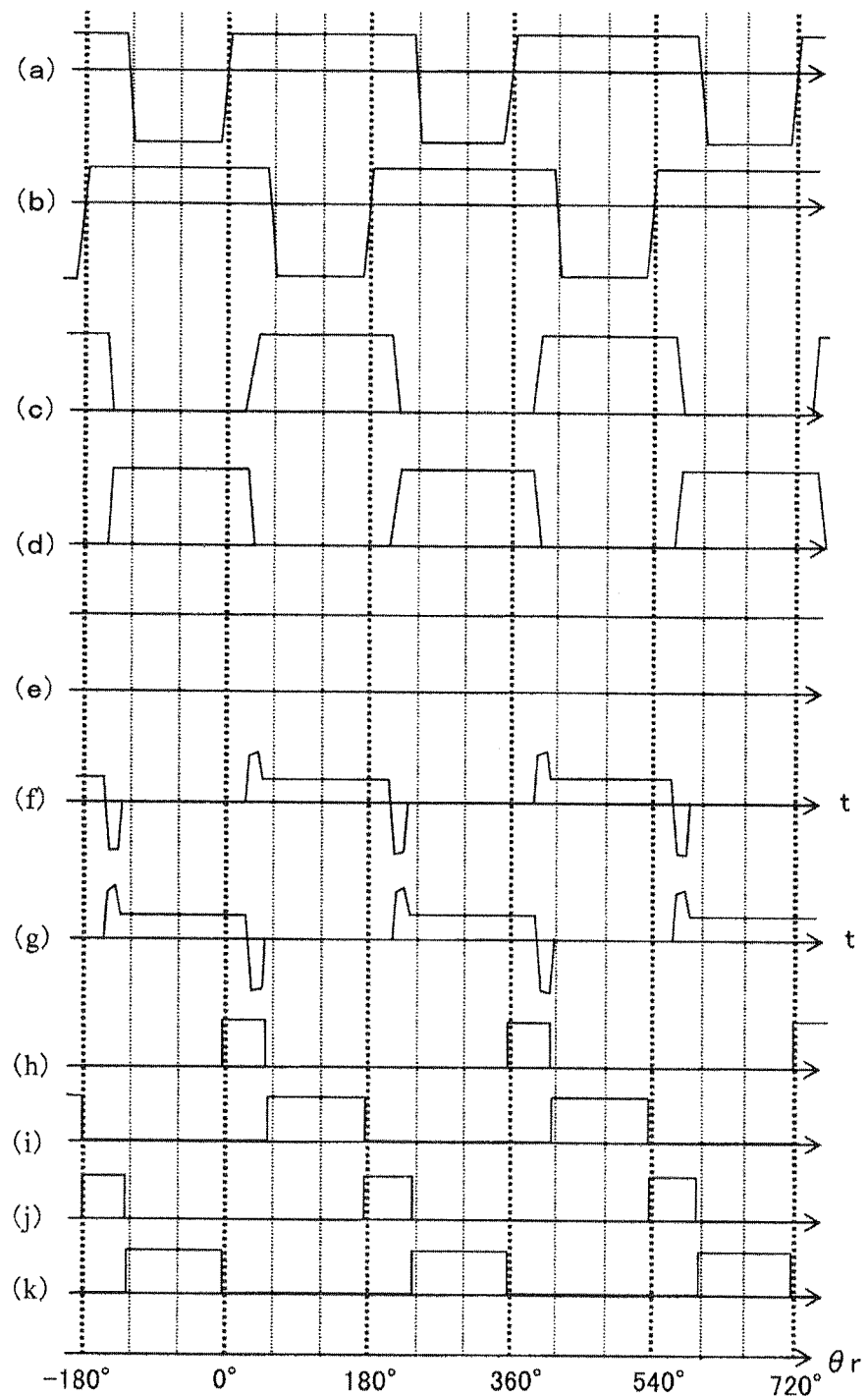
FIG. 36 is a time chart illustrating sensorless position detection.

FIG. 36 shows a relationship between voltage, current, torque, terminal voltage and rotational range signal of the motor. The horizontal axis indicates rotational position θr of the rotor in electrical angle.

FIG. 36 shows by (a) and (b) A- and B-phase inductive voltages Var and Vbr, respectively, when the rotor is rotated at a constant rotational speed. These voltages are the same as those shown in FIG. 8 by (i) and (j) and in FIG. 33 by (a) and (b). FIG. 36 shows by (c) and (d) examples of A- and B-phase currents Ia and Ib, respectively. Alternate supply of these currents can generate the constant torque as shown by (e) of FIG. 36. FIG. 36 shows by (f) the voltage component La×dIa/dt of the third term on the right-hand side of Formula (34). Since PWM control is performed by the transistors, this voltage component practically provides a voltage waveform in which voltages Vp and −Vp of the DC voltage source are repeated. Similarly, FIG. 36 shows by (c) the voltage component Lb×dIb/dt of the third term on the right-hand side of Formula (35). FIG. 36 shows by (h) signals indicative of the rotational range SA. FIG. 36 shows by (i) signals indicative of the rotational range SB. FIG. 36 shows by (j) signals indicative of the rotational range SC. FIG. 36 shows by (k) signals indicative of the rotational range SD.

Eighteenth Embodiment

Figure 37:
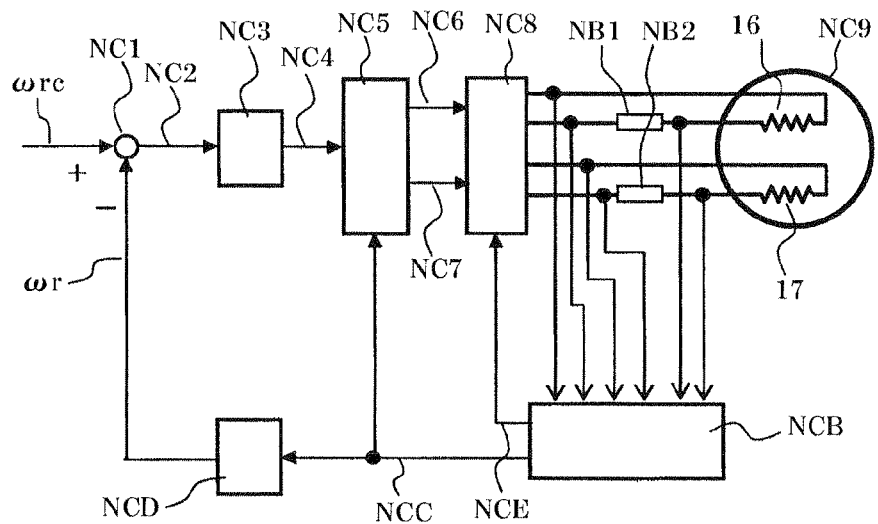
FIG. 37 is a diagram illustrating a motor in which rotation is controlled based on sensorless position detection.

FIG. 37 shows an example of a motor and the control as a whole.

Reference NC9 indicates a motor, reference 16 indicates an A-phase winding and reference 17 indicates a B-phase winding. Reference NB1 indicates a shunt resistor for detecting A-phase current Ia and reference NB2 indicates a shunt resistor for detecting B-phase current Ib. Reference NCB indicates an arithmetic circuit for performing sensorless position detection, as shown in FIG. 35. The arithmetic circuit NCB outputs NCC corresponding to the information regarding rotational position θr, and also outputs NCE corresponding to information regarding current of windings.

Reference ωrc indicates a speed command. Reference NCD indicates a speed calculator that detects a motor speed ωr from the rotational position information NCC. NC1 detects a speed error NC2. Reference NC3 indicates a compensator that outputs a torque command NC4. Reference NC5 indicates a current commanding means that calculates and outputs an A-phase current command NC6 and a B-phase current command NC7 based on the torque command NC4 and the rotational position information NCC. Reference NC8 indicates a current control means that receives inputs of the A- and B-phase current commands NC6 and NC7 and the wining current information NCE to control the A- and B-phase currents Ia and Ib for the generation of torque of the motor.

Figure 38:
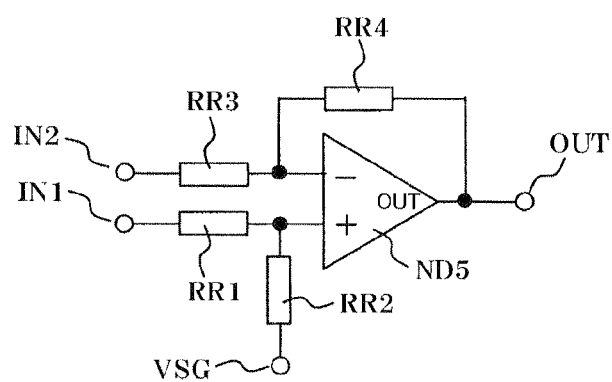
FIG. 38 is a diagram illustrating an example of an operational amplifier.

Various techniques are suggested for the control of current, speed and rotational position of motors. Thus, configurations other than the one shown in FIG. 37 may be provided. An operational amplifier ND5 shown in FIG. 38 may be used in place of the voltage detecting means NB3-NB6 and the adder-subtractor, for example, shown in FIG. 35. Operational amplifiers are broadly used in various applications. Here, the operational amplifier serves as a differential amplifier in which reference VSG indicates a common potential, references IN1 and IN2 indicate inputs and reference OUT indicates an output. For example, when RR1 and RR3 are resistors having a resistance of 10 kΩ and RR2 and RR4 are resistors having a resistance of 50 kΩ, a relationship OUT=5×(IN1−IN2) is established in the differential amplifier.

The sensorless technique discussed above may be realized, for example, by: a configuration in which lots of analogue circuits, such as a differential amplifier, are used; a configuration in which signals are digitized to use digital circuits; and a software technique using a microcomputer. Further, the sensorless technique is performed in parallel such as with current control and speed control of the motor. Accordingly, a convenient system configuration as a whole can be selected.

The technique of sensorless position detection shown in FIG. 35 is based on a principle of detecting inductive voltages of a motor. Accordingly, position detection cannot be carried out at a low-speed rotation near zero rotation. In a low-speed rotation range, characteristics of a synchronous motor may be utilized. In this case, the currents Ia and Ib of the windings may be alternately supplied as in a step motor to achieve start-up and low-speed rotation driving. When a predetermined revolution speed is reached, control is switched to the control for sensorless position detection shown in FIG. 35 to fully perform revolution speed control as desired.

Description hereinafter is provided referring to the flow diagram shown in FIG. 39.

Figure 39:
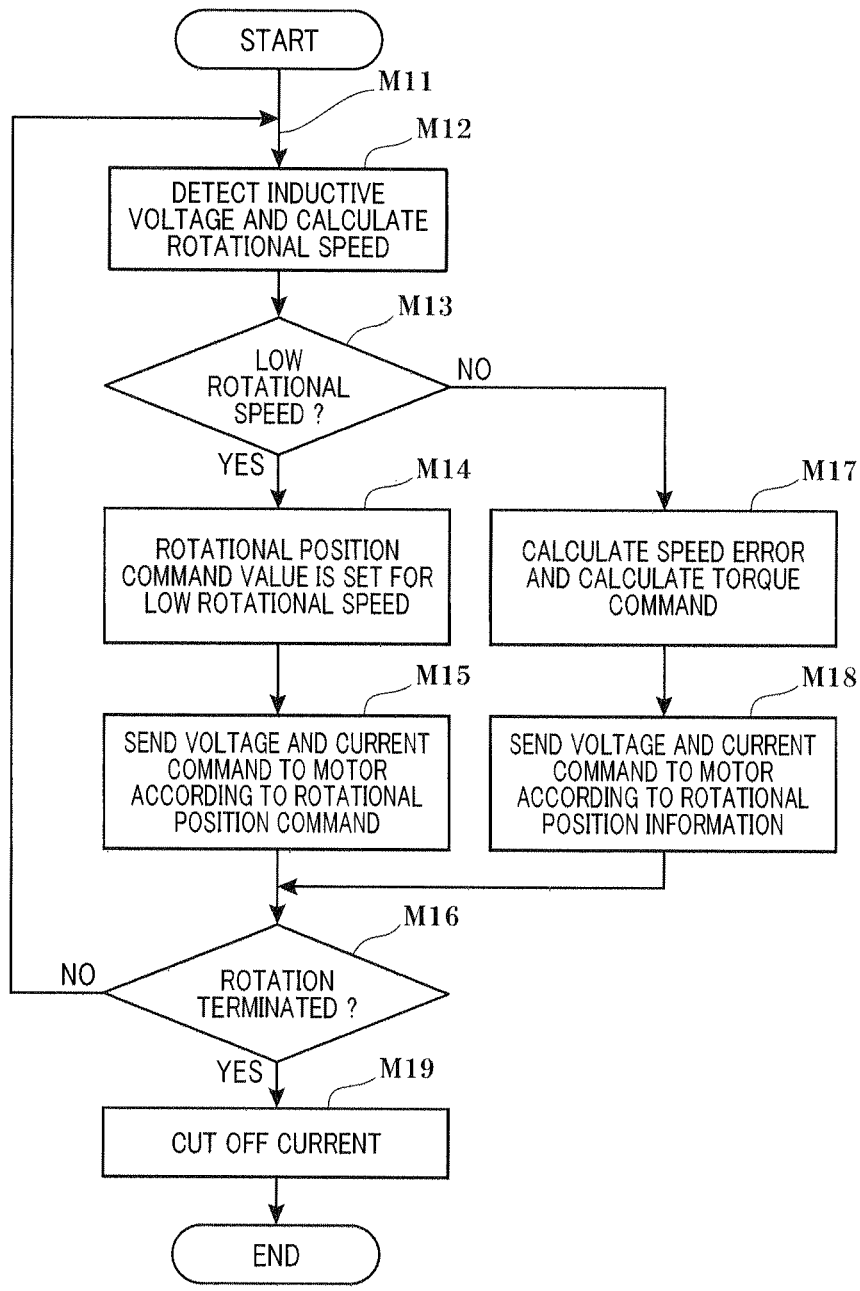
FIG. 39 is a flow diagram illustrating a flow of control in the case where sensorless control is applied to the motor illustrated such as in FIG. 1.

When rotation/start-up of a motor is instructed, control proceeds to M11 from START of FIG. 39. At M12, a rotational speed dθr/dt is calculated based on the change in the inductive voltage of each winding. At M13, it is determined whether the rotational speed is equal to or more than or less than the rotational speed ωcs at which the sensorless control shown in FIG. 35 can be performed. When the revolution speed is still low, such as at the time of start-up or immediately after the start-up, control proceeds to M14. At M14, since the rotational position θr has not been detected, a rotational speed command ωc1 larger than the rotational speed command ωc1 up to then is given. Then, a rotational position command value θc1 that is an accumulated value of rotational speed commands ωc1 is calculated. Accordingly, every time M14 is performed, the rotational speed command ωc1 gradually becomes larger and the rotational position command value θc1 is also accumulated.

At M15, a voltage command value Vcom of each phase is determined according to the rotational position command value θc1 to supply voltage to the winding of each phase. Since the rotational position θr of the rotor then has not yet been specified, the control at M15 is open-loop control corresponding to the driving of a step motor. At M16, it is determined whether the rotation command is terminated. If rotation is yet to be terminated, control returns to M11 to continue rotation control.

At M13, if the rotational speed dθr/dt is equal to or more than the rotational speed ωcs enabling the sensorless control, control proceeds to M17. At M17, as a difference between a speed command value ωcom to be given to the motor and the rotational speed dθr/dt of the motor, a speed error (ωcom−dθr/dt) is calculated to thereby calculate a torque command value Tc. At M18, a voltage command value Vcom of each phase is calculated based on the torque command value Tc and the rotational position information NCC to supply voltage to the winding of each phase. At M16, it is determined whether the rotation command is terminated. If rotation is not yet to be terminated, control returns to M11 to continue rotation control. If rotation is determined to be terminated at M16, control proceeds to M19 where current is cut off to end control of the motor.

The example of motor control shown in FIG. 39 may be variously altered. For example, at M15 and M18, accurate current control and torque control may be conducted using the detected current value. In the applications such as of fans and pumps, motors may be used with such a one-way rotation.

As a matter of course, in the motor of the present invention, a position may be detected using a position detection sensor for the rotation control of the motor. Further, the current detecting means may be realized by a technique of using a Hall device, a technique of using a current transformer, and the like, other than the technique of using shunt resistors. Alternatively, speed detection may be conducted by measuring the position information derived from the sensor less position detection shown in FIG. 35.

Nineteenth Embodiment

Hereinafter is described how to specifically realize current detection in the case where motor control circuits are highly integrated into a single chip to reduce cost and size in mass-production applications, such as of fans.

In such a case, usually, no printed circuit is provided in order to reduce cost. Thus, various issues are raised in terms of shunt resistors that detect current. Such issues include an issue of where to mount shunt resistors when the size of shunt resistors and the amount of generated heat of the shunt resistors are taken into account, an issue of cost of shunt resistors, an issue of accuracy in the resistance of shunt resistors, and an issue of temperature coefficient of resistance values.

Figure 40:
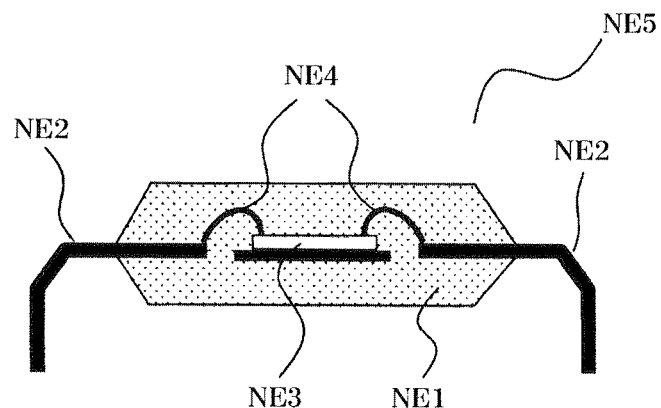
FIG. 40 is a diagram illustrating an example of a configuration in which a shunt resistor is composed of a bonding wire of an integrated circuit.

FIG. 40 shows an example of an integrated circuit NE5 used for controlling a motor.

Reference NE1 indicates a resin mole, reference NE2 indicates a lead frame for input/output lines, reference NE3 indicates a silicon chip, and reference NE4 indicates bonding wires. When the silicon chip NE3 also includes power transistors for controlling currents of the motor windings, the motor windings may be directly connected to the lead frame NE2. In this case, the bonding wires NE4 may be used as a method for detecting current. In the case of power lines, aluminum wires are usually used as bonding wires. When the current capacity is large, a plurality of bonding wires are connected in parallel.

Since manufacturing equipment of integrated circuits is highly developed, the length and size of the bonding wires are managed with comparatively good accuracy, achieving accuracy in the resistance values as shunt resistors. Normally, although bonding wires have a small resistance value, an operational amplifier circuit may be provided in the vicinity of the bonding wires to detect current. When the resistance value of bonding wires is excessively small, a relay point may be provided on the silicon chip or in the vicinity thereof. In this case, the plurality of bonding wires may be connected in series to increase the resistance value that functions as shunt resistors. The resistance value as shunt resistors may additionally include a partial resistance of the relay point and the resistance of the lead frame NE2. Further, an integrated circuit for controlling a motor does not necessarily require to use bonding wires but may use an electrically connecting means having a function equivalent to bonding wires. In such a case, the electrically connecting means may be used as shunt resistors.

Hereinafter are described influences of temperature changes and a technique for coping with the temperature changes.

Normally, shunt resistors are made of a material having a small temperature coefficient of a resistance value. However, when aluminum wires as bonding wires are used as shunt resistors, the resistance value changes by 42% with a temperature change of 100° C., because the temperature coefficient of a resistance value of aluminum is 0.42%/° C. This raises a problem in the accuracy of controlling a motor.

Figure 41:
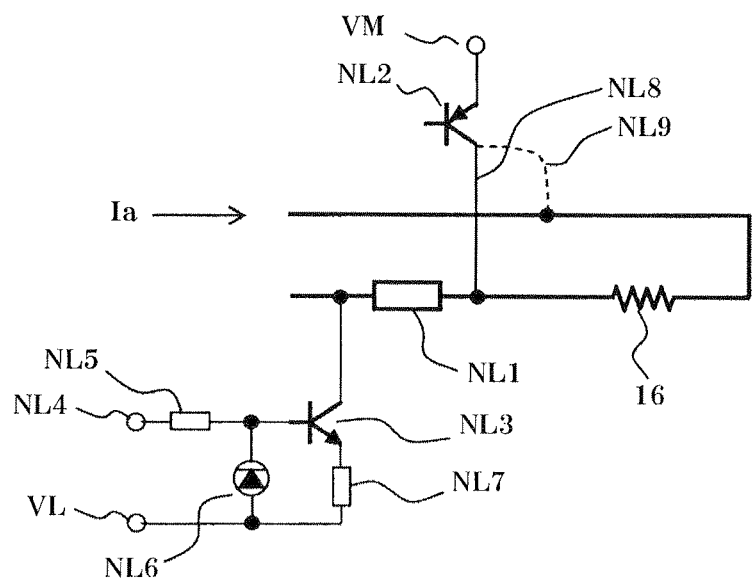
FIG. 41 is a diagram illustrating an example of a configuration in which temperature changes of a shunt resistor is detected by a constant current circuit.

FIG. 41 shows a technique for detecting a resistance value of a shunt resistor. Reference 16 indicates an A-phase winding and reference NL1 is a shunt resistor. When the motor is being rotated, A-phase current Ia is supplied to the A-phase winding 16 and the shunt resistor NL1. References NL2 and NL3 are transistors. Reference NL4 indicates an input terminal for resistance value measurement signals which become high in detecting a resistance value and become low otherwise. Reference NL6 is a zener diode that generates a constant voltage. Reference NL7 indicates a resistor that generates the constant voltage together with the zener diode NL6.

These elements configure a constant current circuit. For example, when NL6 is a 2V-zener diode and NL7 is a 2Ω-resistor, current of about 1 A is supplied to the resistor NL7 when the transistors NL2 and NL3 are in an on-state. Accordingly, voltage across the shunt resistor NL1 is dropped to a level corresponding to the level at which current of 1 A is supplied. Thus, the voltage indicates a resistance value RR5 of the shunt resistor NL1 at the temperature as of then.

After measurement of the resistance value RR5 of the shunt resistor, a value of the A-phase current Ia at the temperature as of then is measured based on the voltage across the shunt resistor NL1. The resistance value of the shunt resistor NL1 is measured in a time zone when the motor is not driven so as not to affect the rotation control of the motor. Even during rotation of the motor, a measurement to an extent of several msec does not cause any problem in many applications. Since a resistance value can be measured in a very short time, a current capacity, for example, of an element used for measurement may only have to be of short-time rating. Thus, the element may be manufactured as a small-size element.

The transistors NL2 and NL3 may be commonalized for extensive use as the transistor that supplies the A-phase current Ia. Measurement of a shunt resistance value in phase B may be conducted similar to phase A.

When a connection NL8 is changed to a connection NL9, the measurement circuit shown in FIG. 35 is connected. Accordingly, not only the voltage drop of the shunt resistor is measured, but also a resistance value RR6 of the A-phase winding 16 at the temperature as of then can be measured. Since a resistance value RR7 of the A-phase winding 16 at a reference temperature is already given, the temperature of the A-phase winding 16 may be obtained by back calculation. It should be noted that gold, silver, copper and aluminum all have a temperature coefficient of a resistance value, which is approximate to 0.4%/° C.

Hereinafter is described a technique for more accurately conducting the sensorless position detection shown in FIG. 35.

The A-phase inductive voltage Var is expressed by Formula (36). A voltage drop component of the second term of Formula (36) is required to be the voltage drop at the temperature of the winding. Although the temperature change of inductance is comparatively small, the current values in the third and fourth terms of Formula (36) are required to be correct current values compensated with the influence of the temperature. Thus, the current values of Formula (36) can be correctly obtained by correcting the temperature changes of the winding resistance of the motor and compensating the influence of temperature on the measured current values. The same applies to the B-phase inductive voltage Vbr of Formula (37).

Twentieth Embodiment

Figure 42:
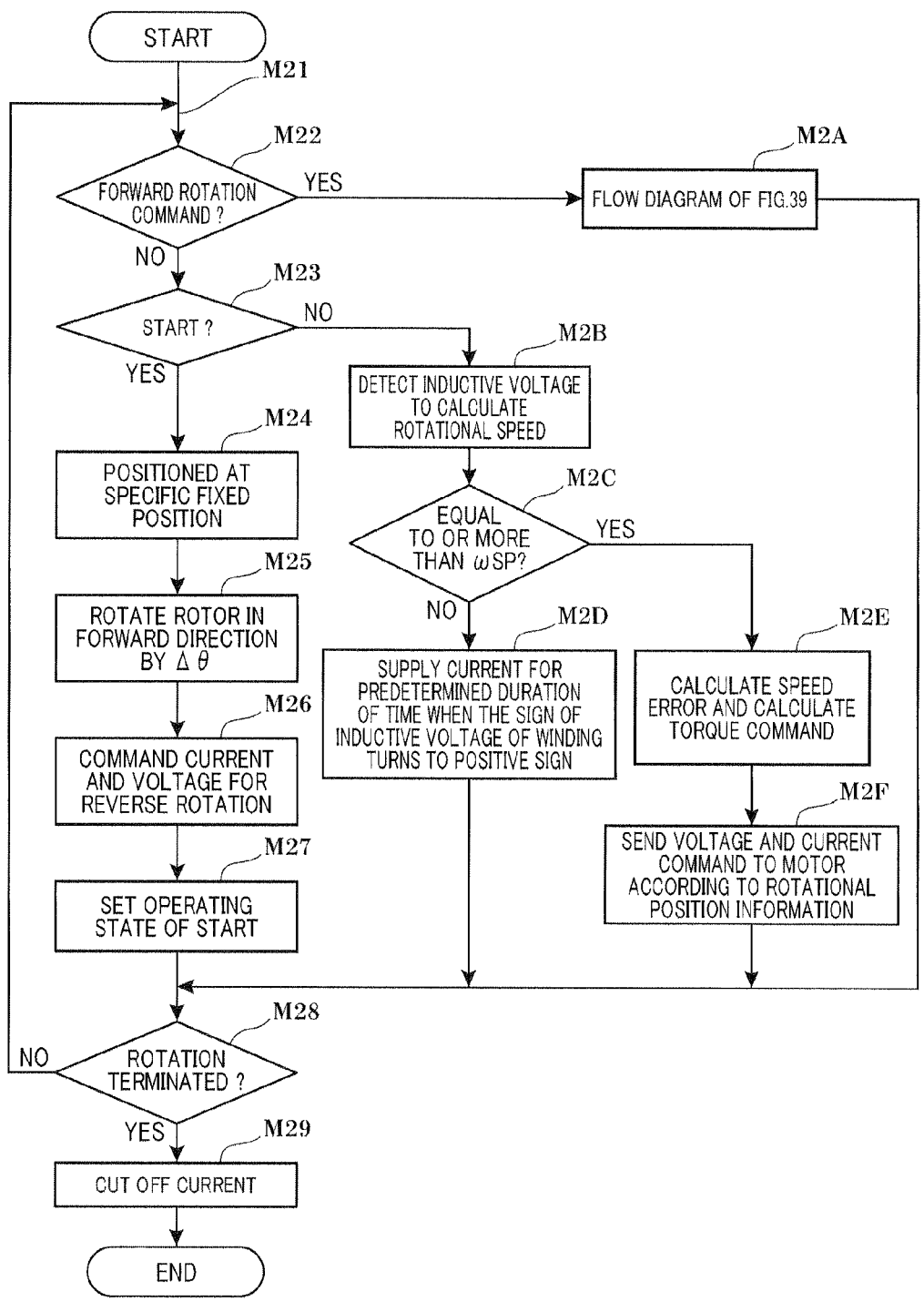
FIG. 42 is a flow diagram illustrating a flow for performing rotation control in both directions in the motor illustrated such as in FIG. 1.

Referring to FIG. 42, hereinafter is described a technique for achieving reverse rotation under unidirectional current control of two phases in the motor configuration shown such as in FIG. 1, 8 or 10.

This method is provided on the assumption that the motor is mainly rotated in the forward direction but requires reverse rotation during unsteady time. In particular, as will be understood from (i) and (j) of FIG. 8, rotation in reverse direction can only generate discontinuous torque. Accordingly, in the control method, special activation is required to make use of inert rotation in a reverse rotation operation during steady time as well.

First, control proceeds to M21 from START of FIG. 42. At M22, it is determined whether a rotation command is of forward rotation or of reverse rotation. If the rotation command is of forward rotation, control proceeds to M2A where the forward rotation control shown in the flow diagram of FIG. 39 is performed. After that, control proceeds to M28.

If the rotation command at M22 is of reverse rotation, control proceeds to M23. At M23, it is determined whether the command is a start of reverse rotation. If the command is a start of reverse direction, control proceeds to M24. At M24, the A-phase current Ia is supplied to bring the rotor to a specific position that is a rotational position 240° C. in electrical angle. Then, at M25, the B-phase current Ib is supplied for a specific short time of $\Delta t1$ to rotate the rotor in forward direction by $\Delta\theta$. The rotational position $\theta r$ of $(240°+\Delta\theta)$ in electrical angle falls in a range where torque of reverse direction is generated upon supply of the A-phase current Ia.

At M26, the A-phase current Ia is supplied for a specific time $\Delta t2$ to accelerate and drive the rotor in reverse direction. In this case the rotor is sufficiently well accelerated so that the inert rotation afterward continues until the subsequent rotation control. At M27, the fact of having started reverse rotation is stored.

At M28, it is determined whether the rotation command is terminated. If not terminated, control returns to the initial M21. If terminated, control proceeds to M29 where current is cut off to end the control.

At the determination made at M23, if it is determined that reverse rotation has already been started, control proceeds to M2B. At M2B, a rotational speed $d\theta r/dt$ is calculated from the inductive voltage of each winding and control proceeds to M2C. At M2C, it is determined whether the rotational speed is equal to or higher, or equal to or lower than a rotational speed $\omega sp$ at which the reverse rotation can be continuously controlled.

If the speed corresponds to low-speed rotation, control proceeds to M2D. At M2D, since the speed corresponds to low-speed rotation immediately after the start of reverse rotation, for example, positive/negative sign of the inductive voltage of the winding is identified. At the timing when the voltage turns from negative to positive, current is supplied to the winding for a specific time of $\Delta t3$, for further acceleration. Alternative to this, current may be supplied to the winding in the time zones when the inductive voltage of the winding has a positive value. The time zones correspond to the time zones shown in (i) and (j) of FIG. 36.

At M2C, if the speed is equal to or higher than the rotational speed $\omega sp$ at which the reverse rotation can be continuously controlled, control proceeds to M2E. At M2E, as a difference between a speed command value $\omega com$ and the rotational speed $d\theta r/dt$ of the motor, a speed error $(\omega com - d\theta r/dt)$ is calculated to thereby calculate a torque command value Tc. At M2F, a voltage command value Vcom is calculated for each phase based on the torque command value Tc and the rotational position information NCC to supply voltage to the winding of each phase. Alternatively, accurate current control and torque control may be conducted, although intermittently, using a detected current value.

As described referring to FIG. 42, not only forward rotation but also reverse rotation is achieved with unidirectional currents of two phases as shown in FIGS. 10 and 11. Although the rotational position is limited, torque can be generated in reverse direction.

The reverse direction torque corresponds to deceleration torque during the time of forward rotation. Accordingly, in a state where the motor is rotated in forward direction, if it is desired that the motor is rapidly decelerated, the deceleration is achieved by generating torque in reverse direction as described above. Since the deceleration torque is regenerative torque from the viewpoint of energy, for enabling regenerative operation. As described above, the motor of the present invention enables rotation control in both of forward and reverse directions, under the simple control with the use of unidirectional currents of two phases. Further, the motor of the present invention also enables power running control and regenerative control in the rotation in each of the directions. Thus, the motor of the present invention enables four-quadrant operation.

Twenty-First Embodiment

Figure 43:
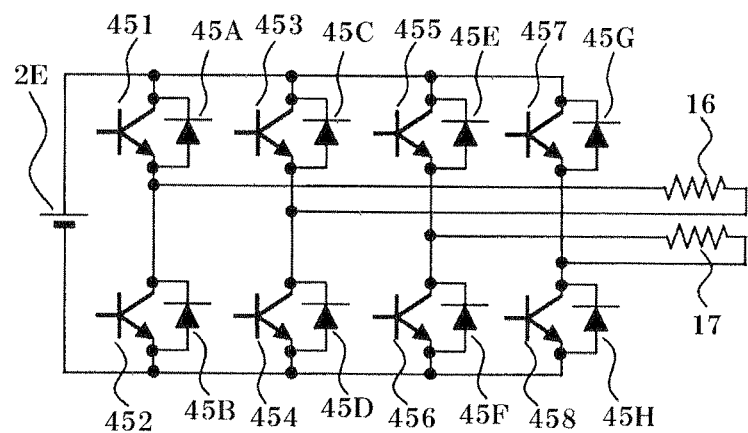
FIG. 43 is a diagram illustrating an example of a control circuit capable of supplying two-way current to two-phase windings of the motor illustrated such as in FIG. 1.

FIG. 43 shows an example of a control unit which is able to supply current in both of positive and negative directions.

Description below is provided based on the motor shown such as in FIG. 1 or 8. Reference 16 indicates an A-phase winding and reference 17 indicates a B-phase winding. When transistors 451 and 454 are turned on, a positive voltage is applied to the A-phase winding 16, and when transistors 453 and 452 are turned on, a negative voltage is applied to the A-phase winding 16. References 45A, 45B, 45C and 45D indicate diodes that pass reverse current of the respective transistors. Similarly, when transistors 455 and 458 are turned on, a positive voltage is applied to the B-phase winding 17, and when transistors 457 and 456 are turned on, a negative voltage is applied to the B-phase winding 17.

References 45E, 45F, 45G and 45H indicate diodes that pass reverse current of the respective transistors. Under PWM control by turning on/off the transistors, desired current is supplied to both of the windings 16 and 17.

Although the control circuit shown in FIG. 43 has a high number of transistors, as eight, the circuit enables generation of not only forward torque but also reverse toque. Thus, controllability of the motor is enhanced. However, since the motor current is supplied through two transistors, the on-state voltage drop of the control circuit is equivalent to that of two transistors and thus loss is increased.

Twenty-Second Embodiment

Figure 44:
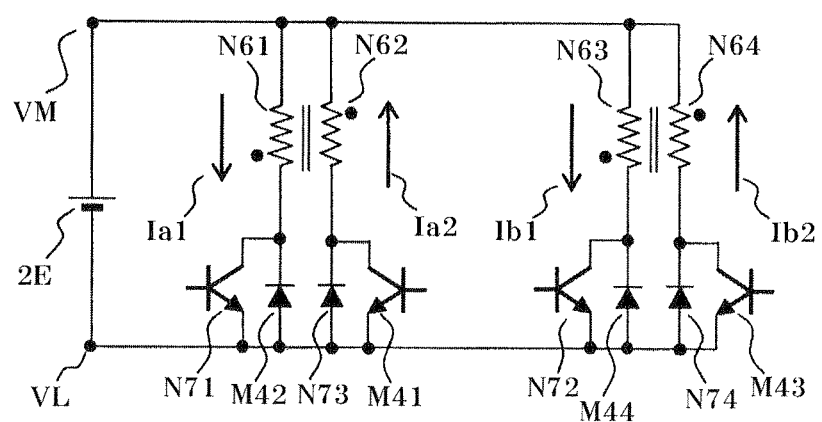
FIG. 44 is a diagram illustrating an example of a control circuit functionally capable of supplying two-way current to the motor illustrated in FIG. 31.

FIG. 44 shows a configuration for performing control by supplying two positive and negative currents using four transistors.

The configuration shown in FIG. 44 is obtained by adding transistors M41 and M43 and diodes M42 and M44 to the configuration shown in FIG. 32. The motor is configured as the one shown in FIG. 31. It is desirable that the A-phase windings N61 and N62 are applied with bifilar winding. It is also desirable that the B-phase windings N63 and N64 are applied with bifilar winding. The electromagnetic relationship as expressed by Formulas (28) to (33) is also established in the configuration shown in FIG. 44.

As described above referring to FIG. 32, currents for the A-phase windings N61 and N62 are controlled by controlling current (Ia1+Ia2) by turning on/off the transistor N71. In this case, the (Ia1+Ia2) has a positive value. Since the transistors N71 and M41 are symmetrically arranged, negative currents for the A-phase windings N61 and N62 are controlled by similarly controlling the current (Ia1+Ia2) by turning on/off the transistor N41. In this case, the (Ia1+Ia2) has a negative value.

Similarly, the currents for the B-phase windings N63 and N64 are controlled by controlling current (Ib1+Ib2) by turning on/off the transistor N72. Negative currents for the B-phase windings N63 and N64 are controlled by controlling the current (Ib1+Ib2) by turning on/off the transistor N43. In this case, the (Ib1+Ib2) has a negative value.

The motor configuration and the control circuit configuration as shown in FIG. 44 enable full control of positive torque and negative torque, although the control circuit is simply configured using four transistors. However, in this configuration, two windings are wound in each slot. Locating two windings in a single space simply increases the winding resistance value by a factor of two. This problem may be mitigated by increasing the cross-sectional area of each slot and increasing the size of each winding.

Twenty-Third Embodiment

Figure 45:
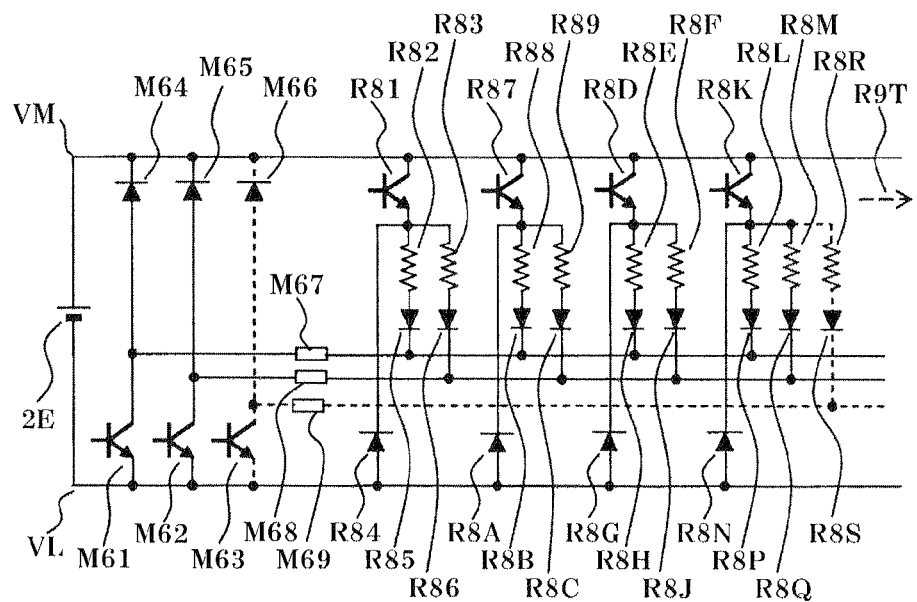
FIG. 45 is a diagram illustrating an example of a control circuit including a plurality of motors that can be driven by one-way current, sharing a part of a drive circuit.

FIG. 45 shows a technique for reducing cost by reducing the number of transistors for driving the currents Ia and Ib of the windings, when several motors of the present invention are controlled.

In the applications such as of automobiles, household electric appliances and OA (office automation), it is often the case that several motors are used in a single system and the motors are not necessarily simultaneously driven. The present configuration is able to reduce cost and size of such a system as a whole in such applications. Specifically, the configuration is realized by sharing a control circuit.

In FIG. 45, references R82 and R83 indicate A- and B-phase windings, respectively, of a first motor MM1 of the present invention. Reference R88 and R89 indicate A- and B-phase windings, respectively, of a second motor MM2 of the present invention. Reference R8E and R8F indicate A- and B-phase windings, respectively, of a third motor MM3 of the present invention. Reference R8L and R8M indicate A- and B-phase windings, respectively, of a fourth motor MM4 of the present invention.

Reference R81 indicates a transistor for selecting either of the A- and B-phase windings R82 and R83 of the motor MM1. A diode R84 configures a path for passing current when the transistor R81 is turned off. Reference R87 indicates a transistor for selecting either of the A- and B-phase windings R88 and R89 of the motor MM2. A diode R8A configures a path for passing current when the transistor R87 is turned off. Reference R8D indicates a transistor for selecting either of the A- and B-phase windings R8E and R8F of the motor MM3. A diode R8G configures a path for passing current when the transistor R8D is turned off. Reference R8K indicates a transistor for selecting either of the A- and B-phase windings R8L and R8M of the motor MM4. A diode R8N configures a path for passing current when the transistor R8K is turned off.

Reference M61 indicates a common transistor for supplying current to be passed through the windings R82, R88, R8E and R8L. A diode M64 configures a path for passing current when the transistor M61 is turned off. Reference M67 indicates a current measuring means, such as a shunt resistor, for measuring current for driving the transistor M61. Reference M62 indicates a common transistor for supplying current to be passed through the windings R83, R89, R8F and R8M. A diode M65 configures a path for passing current when the transistor M62 is turned off. Reference M68 indicates a current measuring means, such as a shunt resistor, for measuring current for driving the transistor M62.

Diodes R85, R86, R8B, R8C, R8H, R83, R8P and R8Q are provided to block reverse voltage so that voltage of a different winding will not be applied.

In order to control the rotation of the motor MM1, current is alternately supplied to the A- and B-phase windings R82 and R83. When the transistors R81 and M61 are turned on, voltage is applied to the A-phase winding R82 for the supply of the current Ia. When the transistors R81 and M61 are turned off, the current Ia is passed through the diodes R84 and M64 and reduced. In this case, the A-phase winding R82 is applied with negative voltage. Thus, when the transistors R81 and M61 are turned on/off, the voltage applied to the A-phase winding R82 is controlled and the A-phase current Ia is controlled. Similar to the A-phase winding R82, the voltage and current of the B-phase winding R83 are also controlled by turning on/off the transistors R81 and M62.

Similarly, in the rotation control of the motor MM2, the voltage and current of the A-phase winding R88 are controlled by turning on/off the transistors R87 and M61. The voltage and current of the B-phase winding R89 are controlled by turning on/off the transistors R87 and M62.

Similarly, in the rotation control of the motor MM3, the voltage and current of the A-phase winding R8E are controlled by turning on/off the transistors R8D and M61. The voltage and current of the B-phase winding R8F are controlled by turning on/off the transistors R8D and M62.

Similarly, in the rotation control of the motor MM4, the voltage and current of the A-phase winding R8L are controlled by turning on/off the transistors R8K and M61. The voltage and current of the B-phase winding R8M are controlled by turning on/off the transistors R8K and M62.

As a result, the transistors required for driving the four motors MM1, MM2, MM3 and MM4 are six transistors R81, R87, R8D, R8K, M61 and M62. In average, 1.5 transistors are used for driving one motor. The number of transistors required in adding one more motor is one. When the number of motors that are not required to be simultaneously driven is increased, rotation control of one motor is managed by one transistor.

Some problems may be found in the configuration described referring to FIG. 45. For example, decrease of the A-phase current Ia and increase of the B-phase current Ib, which would occur in the motor MM1, are contradictory for the common transistor R81 and cannot be simultaneously treated by the common transistor R81. Further, when these currents are overlapped with each other, the current capacity of the transistor R81 is required to be increased. Therefore, these currents are required to be controlled so as not to overlap with each other.

These problems may be solved by designing the arrangement of the windings shown in FIG. 45 such that, in a motor, a transistor for passing current for the A-phase winding will not simultaneously serve as a transistor for passing current for the B-phase winding. A specific example of such a winding arrangement is set forth below.

In the first motor MM1, the winding indicated by R83 is rendered to be an A-phase winding and the winding indicated by R88 is rendered to be a B-phase winding. In the second motor MM2, the winding indicated by R89 is rendered to be an A-phase winding and the winding indicated by R8E is rendered to be a B-phase winding. In the third motor MM3, the winding indicated by R8F is rendered to be an A-phase winding and the winding indicated by R8L is rendered to be a B-phase winding. In the fourth motor MM4, the winding indicated by R8M is rendered to be an A-phase winding and the winding indicated by R82 is rendered to be a B-phase winding. In this case, the arrangement of the windings in FIG. 45 is shifted rightward so that each winding will have a phase of the winding located immediately leftward. Thus, the transistors connected to the potential VM side are different between the A- and B-phase windings.

In this arrangement of the windings, in the motor MM1, A-phase winding R83 is controlled by turning on/off the transistors R81 and M62 and the B-phase winding R88 is controlled by turning on/off the transistors R87 and M61. In this case, the currents Ia and Ib of the A- and B-phase windings R83 and R88, respectively, are prevented from interfering with each other and thus can be independently controlled with no inhibition. The similar relationship is established as well in the currents of the windings in other motors MM2, MM3 and MM4.

Commonalization of the control circuit as shown in FIG. 45 is easily realized because the currents of the windings in the motor are unidirectional. In the case of AC electric motors driven by AC current, commonalization of a control circuit is difficult.

The configuration shown in FIG. 45 may be variously altered. For example, a transistor M63 as indicated by a broken line and another transistor, not shown, may be added parallel to the transistors M61 and M62. In this case, four windings may be arranged extending from the emitters of the respective transistors R81, R87, R8D and R8K to the added transistors to thereby connect 4×4=16 windings. Further, in this case, designing the configuration such that the A- and B-phase windings of the same motor will not be connected to the same transistor, the A- and B-phase currents Ia and Ib of a motor can be independently controlled. Accordingly, in this case, eight motors are controlled by eight transistors. The number of transistors per one motor is one, realizing low cost and small size.

Further, in a motor controlled by unidirectional currents of three phases as well, transistors may be added as indicated by the broken line in the configuration shown in FIG. 45. In this case, the winding indicated by R8R is a winding of a third phase, the diode indicated by R8S is a diode for blocking reverse voltage, the means indicated by M69 is a current detecting means, the transistor indicated by M63 is a transistor for controlling current, and the diode indicated by M66 is a diode for regeneration. DC motors may be one of the types of the motors that can be applied to and controlled by the configuration of FIG. 45. In this way, when a motor is controlled by unidirectional currents such as of one, two or three phases, the control circuit can be communalized.

In the case where the winding indicated by R82 serves as an A-phase winding and the winding indicated by R83 serves as a B-phase winding in a motor, as described above, the connection and arrangement of the windings are advantageously simplified because the ends on one side of the A- and B-phase windings are mutually connected. Further, as indicated by a broken-line arrow R8T, further addition may be possible.

In the configuration shown in FIG. 45, the plurality of motors may be simultaneously rotated and controlled. In this technique, torque is generated under time-shared control, utilizing the inertia of the motor and loads. For example, the current of the motor MM1 is controlled for the first 10 msec and the current of the motor MM2 is controlled for the subsequent 10 msec. This is alternately repeated to control the speed of the two motors. Further, as shown in FIG. 42, the control using unidirectional current enables not only forward rotation but also, although intermittently, reverse torque generation and reverse speed control. In this way, the configuration shown in FIG. 45 enables simultaneous speed control of any number of motors.

Twenty-Fourth Embodiment

Figure 46:
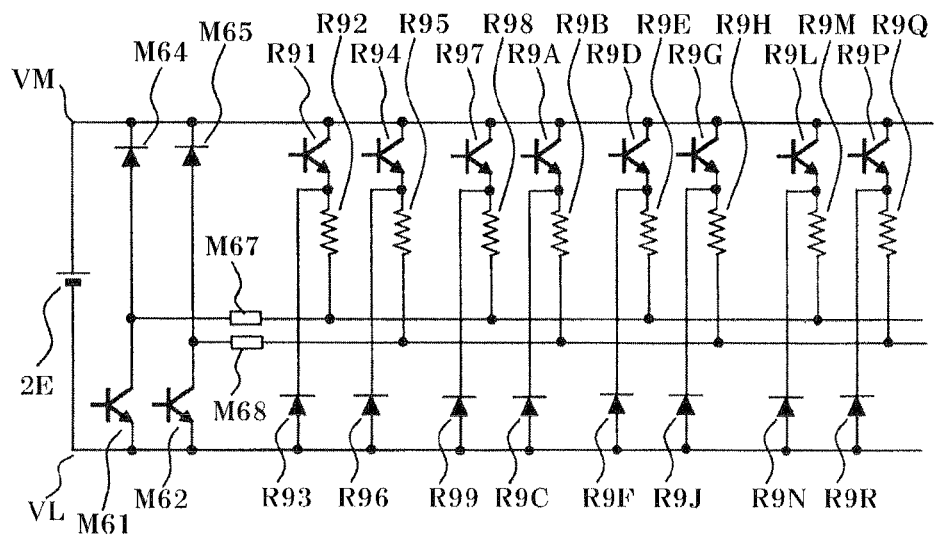
FIG. 46 is a diagram illustrating an example of a control circuit including a plurality of motors that can be driven by one-way current, sharing a part of a drive circuit.

FIG. 46 shows another technique of reducing cost by reducing the number of transistors for driving the currents Ia and Ib of the windings in controlling a plurality of motors of the present invention.

In FIG. 46, references R92 and R95 indicate A- and B-phase windings of a first motor MM1 of the present invention. References R98 and R9B indicate A- and B-phase windings of a second motor MM2 of the present invention. References R9E and R9H indicate A- and B-phase windings of a second motor MM3 of the present invention. References R9M and R9Q indicate A- and B-phase windings of a fourth motor MM4 of the present invention.

Reference R91 indicates a transistor for selecting the A-phase winding R92 and supplying current thereto in the motor MM1. A diode R93 configures a path for passing current when the transistor R91 is turned off.

Reference R94 indicates a transistor for selecting the B-phase winding R95 and supplying current thereto in the motor MM1. A diode R96 configures a path for passing current when the transistor R94 is turned off.

Reference R97 indicates a transistor for selecting the A-phase winding R98 and supplying current thereto in the motor MM2. A diode R99 configures a path for passing current when the transistor R97 is turned off.

Reference R9A indicates a transistor for selecting the B-phase winding R9B and supplying current thereto in the motor MM2. A diode R9C configures a path for passing current when the transistor R9A is turned off.

Reference R9D indicates a transistor for selecting the A-phase winding R9E and supplying current thereto in the motor MM3. A diode R9F configures a path for passing current when the transistor R9D is turned off.

Reference R9G indicates a transistor for selecting the B-phase winding R9H and supplying current thereto in the motor MM3. A diode R9J configures a path for passing current when the transistor R9G is turned off.

Reference R9L indicates a transistor for selecting the A-phase winding R9M and supplying current thereto in the motor MM4. A diode R9N configures a path for passing current when the transistor R9L is turned off.

Reference R9P indicates a transistor for selecting the B-phase winding R9Q and supplying current thereto in the motor MM4. A diode R9R configures a path for passing current when the transistor R9P is turned off.

In order to rotate and control the motor MM1 shown in FIG. 46, current is alternately supplied to the A- and B-phase windings R92 and R95. When the transistors R91 and M61 are turned on, voltage is applied to the A-phase winding R92 for the supply of the current Ia. When the transistors R91 and M61 are turned off, the current Ia is passed through the diodes R93 and M64 and decreased. In this case, negative voltage is applied to the A-phase winding R92. Thus, when the transistors R91 and M61 are turned on/off, the voltage applied to the A-phase winding R92 is controlled and thus the A-phase current Ia is controlled.

Similar to the A-phase winding R92, the voltage and current of the B-phase winding R95 are also controlled by turning on/off the transistors R94 and M62.

Similarly, in the rotation control of the motor MM2 shown in FIG. 46 as well, the voltage and current of the A-phase winding R98 are controlled by turning on/off the transistors R97 and M61. The voltage and current of the B-phase winding R9B are controlled by turning on/off the transistors R9A and M62.

Similarly, in the rotation control of the motor MM3 shown in FIG. 46 as well, the voltage and current of the A-phase winding R9E are controlled by turning on/off the transistors R9D and M61. The voltage and current of the B-phase winding R9H are controlled by turning on/off the transistors R9G and M62.

Similarly, in the rotation control of the motor MM4 shown in FIG. 46 as well, the voltage and current of the A-phase winding R9M are controlled by turning on/off the transistors R9L and M61. The voltage and current of the B-phase winding R9Q are controlled by turning on/off the transistors R9P and M62.

As a result, ten transistors R91, R94, R97, R9A, R9D, R9G, R9L, R9P, M61 and M62 are necessary for driving four motors MM1, MM2, MM3 and MM4. In average, 2.5 transistors are used for driving one motor. The number of transistors required in adding one more motor is two. When the number of motors that are not required to be simultaneously driven are increased, rotation control of one motor is managed by two transistors. Compared to the configuration shown in FIG. 45, the one shown in FIG. 46 includes four more transistors but can omit four diodes.

The configuration shown in FIG. 46, in which the motor is controlled by unidirectional currents of three phases, may also additionally include the configuration as indicated by the broken lines in FIG. 45. The same applies to the motors controlled by unidirectional currents of four phases, five phases, or the like.

In the configuration shown in FIG. 46 as well, currents of the plurality of motors may be time-shared for sequential control. Thus, speed of the plurality of motors can be simultaneously controlled in parallel. Further, as shown in FIG. 42, the control using unidirectional current enables not only forward rotation but also, although intermittently, reverse torque generation and reverse speed control. In this way, the configuration shown in FIG. 46 enables simultaneous speed control of any number of motors.

In FIGS. 45 and 46, of the transistors connected in series to each winding, either one of them may be turned on to provide a current-supply mode for supplying the current of the winding to flywheels. In other words, or as a matter of course, the on- and off-state modes of the transistors may be combined with each other, and the combined modes may be applied with various control modes, such as PWN control.

Twenty-Fifth Embodiment

Figure 47:
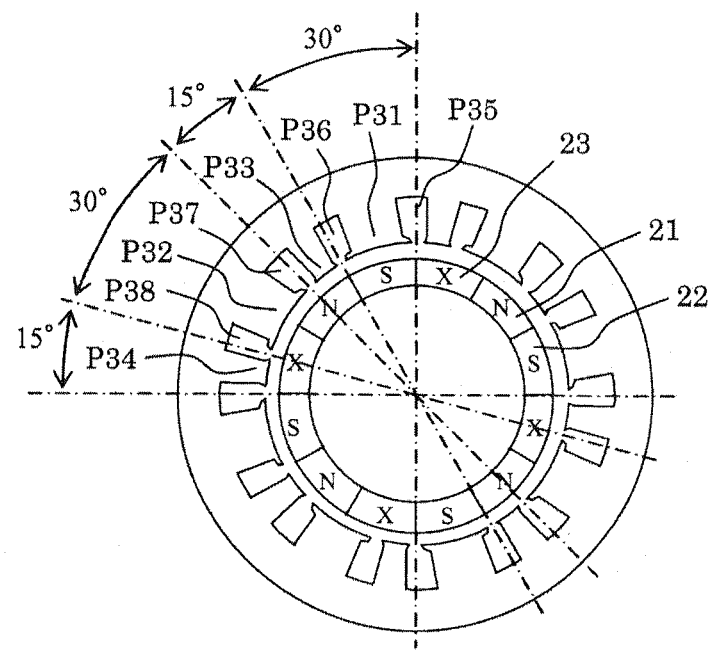
FIG. 47 is a diagram illustrating a motor of the present invention having a configuration in which the stator is composed by stacking electromagnetic steel plates in the direction of the rotor shaft.

FIG. 47 shows a modification of the motor of the present invention. The whole circumference of the motor corresponds to 360° in mechanical angle and 360°×4=1440° in electrical angle.

Figure 48:
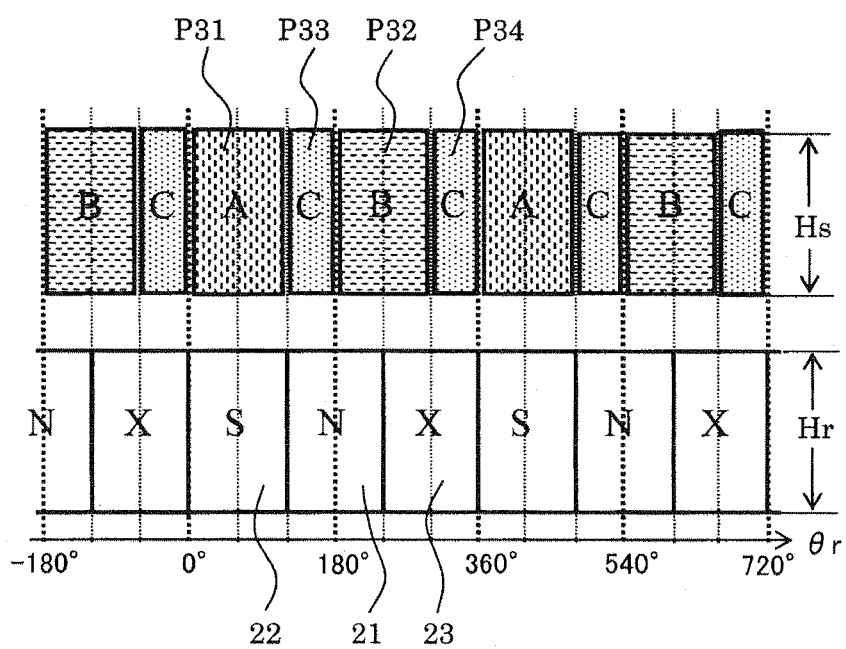
FIG. 48 is a circumferential linear development view illustrating the stator pole configuration and the rotor pole configuration at a portion where the stator and the rotor are opposed to each other in the motor configuration illustrated in FIG. 47.

In the motor shown in FIG. 1, paths of magnetic flux are also present in the direction along the rotor shaft. Compared to this, the modification provides planar magnetic paths, as in three-phase AC motors of conventional art, and has a configuration in which the stator is configured by stacking electromagnetic steel plates each having a shape as shown in FIG. 47 in the direction along the rotor shaft. Reference P31 indicates A-phase teeth, reference P32 indicates B-phase teeth, and references P33 and P34 indicate C-phase teeth. FIG. 48 shows on its upper side a linear development of a circumferential surface configuration of the stator, at a portion opposed to the rotor. This corresponds to a stator pole configuration of the individual phases.

In the example shown in FIG. 48, the A-phase stator poles P31 and the B-phase stator poles P32 each has a circumferential width corresponding to 30° in mechanical angle and 120° in electrical angle. The C-phase stator poles P33 and P34 each has a circumferential width corresponding to 15° in mechanical angle and 60° in electrical angle. The stator pole configuration shown in FIG. 48 on its upper side is the same as the stator pole configuration 24 shown in FIG. 7B.

Reference P35 indicates slots in which a winding for passing the A-phase current Ia is arranged. Reference 36 indicates slots in which a winding for passing A-phase negative current −Ia is arranged. Reference P37 indicates slots in which a winding for passing B-phase current Ib is arranged. Reference 38 indicates slots in which a winding for passing B-phase negative current −Ib is arranged. Various winding methods, such as wave winding, loop winding and drum winding, may be applied to the windings wound in the slots.

The rotor in the modification is the same as the one shown in FIG. 1 or 2. Reference 21 indicates N magnetic poles, reference 22 indicates S magnetic poles and reference 23 indicates X magnetic poles. FIG. 48 shows on its lower side a linear development of a circumferential surface configuration of the rotor, at a portion opposed to the stator. This rotor configuration is the same as the one shown in FIG. 7A.

Current values of the A-phase voltage Va and current Ia and the B-phase voltage Vb and current Ib are the same as those which are shown such as in FIGS. 8 and 9. The motor is rotated and driven with the supply of two unidirectional currents, i.e. DC currents. In this case, the drive circuit may be simplified. As a matter of course, the motor may be used as an AC motor which is activated by AC current in which positive and negative are alternated.

As shown in FIGS. 47 and 48, the stator of the motor of the present invention may be manufactured as a core in which electromagnetic steel plates are stacked in the direction along the rotor shaft.

(Modifications)

Motor systems enabling control of rotation with two DC currents have been described so far. However, various modifications and applications are available. For example, various values may be selected for the circumferential width of each stator salient pole and rotor salient pole. Also, the shape of each salient pole may not only be the simple rectangular shape as shown in the figures, but also be a shape with rounded corners or a tapered shape.

The winding configuration may be modified such as into a wavy loop configuration. Since the winding configuration is simple, use of aluminum as a conductor is easy from a viewpoint of technique of manufacture. The simple winding configuration may be applied, for example, to outer-rotor motors, axial gap motors, linear motor, or motors obtained by combining various motors.

From a viewpoint of control, waveforms of the current and voltage of the motor windings may be variously modified such as by superimposing harmonic current components.

With the combination of a transmission, the ranges of torque and rotation speed may be more broadly varied. Also, various sizes of motors may be manufactured ranging from small-size motors equal to or smaller than 1 Nm, middle-size motors equal to or larger than 100 Nm, to larger-size motors. These motors of various modifications and applications should be encompassed in the present invention as far as the modification techniques are included in the spirit of the motor of the present invention.

INDUSTRIAL APPLICABILITY

The motor including the control circuit according to the present invention can be driven with DC current. Accordingly, the control circuit is simplified to thereby reduce the cost and size of the motor. The motor includes two annular-shaped windings to facilitate manufacture of the motor. These windings with a simple winding configuration achieve a high space factor. Since loop winding is applied to the windings, the motor has no coil ends and thus the size is reduced.

The magnetic circuit configuration of the motor can be provided by cutting and pressing electromagnetic steel plates, leading to comparatively easy mass-production. In this way, the motor of the present invention, which achieves reduction in both its cost and size, can be used in various applications, such as automobiles, household electric appliances, OA and industries.

What is claimed is:

1. A brushless electric motor comprising:
a stator having a circumferential direction;
a rotor arranged to face with the stator and to be rotatable;
an annular A-phase winding WA wound in the circumferential direction of the stator;
a stator pole group SPGA configured to generate magnetic flux φA to interlink with the A-phase winding WA;
an annular B-phase winding WB wound in the circumferential direction of the stator;
a stator pole group SPGB configured to generate magnetic flux to interlink with the B-phase winding WB;
a third stator pole group SPGC arranged at the stator;
N magnetic poles arranged at the rotor;
S magnetic poles arranged at the rotor; and
X magnetic poles arranged at the rotor as third rotor poles showing a magnetic characteristic which is between magnetic characteristics of the N magnetic poles and the S magnetic poles of the rotor,
wherein at least one of the stator pole groups SPGA and SPGB has a magnetic pole width SPH of 180 degrees or less in an electrical angle in the circumferential direction.

2. The brushless electric motor of claim 1, wherein
the A-phase winding WA is configured to receive a one-way current which serves as a direct current IA, the direct current IA being increased or decreased for control thereof, and
the B-phase winding WB is configured to receive a one-way current which serves as a direct current IB, the direct current IB being increased or decreased for control thereof.

3. The brushless electric motor of claim 1, wherein the X magnetic pole of the rotor is formed with use of an N magnetic pole of a permanent magnet and an S magnetic pole of a permanent magnet.

4. The brushless electric motor of claim 1, wherein the stator pole group SPGC is composed of C-phase stator poles SPC each having a circumferential width HSC and the stator pole group SPGA is composed of A-phase stator poles SPA each having a circumferential width HAS, the circumferential width HSC being smaller than the circumferential width HAS, and
the stator pole group SPGB is composed of B-phase stator poles SPB each having a circumferential width HSB, the circumferential width HSC being smaller than the circumferential width HSB.

5. The brushless electric motor of claim 1, wherein the N magnetic poles and at least ones of the S magnetic poles and the X magnetic poles of the rotor are provided as rotor poles provided with intermediate magnetic characteristics between N magnetic pole characteristics and S magnetic pole characteristics in the circumferential direction, wherein ratios between the N magnetic pole characteristics and the S magnetic pole characteristics change gradually in the circumferential direction.

6. The brushless electric motor of claim 1, comprising four or more magnetic poles,
wherein the four or more magnetic poles have
a boundary portion RCCW produced between the N magnetic poles and the S magnetic poles of the rotor, the boundary portion RCCW being depicted by advancing counterclockwise thereamong in the circumferential direction and
a boundary portion RCW produced between the N magnetic poles and the S magnetic poles of the rotor, the boundary portion RCW being depicted by advancing clockwise thereamong in the circumferential direction, wherein, when viewing a plurality of rotor poles whose shapes assigned to a range of electrical angles of 0 to 360 degrees in the circumferential direction of the rotor, each of the X magnetic poles is produced by magnetically synthesizing magnetic characteristics of two or more rotor poles located between the boundary portion RCCW and the boundary portion RCW in the circumferential direction.

7. The brushless electric motor of claim 1, wherein the N magnetic poles, the S magnetic poles, and the X magnetic poles includes a rotor pole that generate torque by being attracted by stator poles, the rotor pole being made of soft magnetic material.

8. The brushless electric motor of claim 1, wherein
the S magnetic poles of the rotor are composed of S magnetic pole magnets made of ferrite magnets,
the X magnetic poles are composed of N magnetic pole magnets made of ferrite magnets, and
the N magnetic poles are composed of soft magnetic members having a higher saturation flux density.

9. The brushless electric motor of claim 1, wherein
the S magnetic poles of the rotor are composed of S magnetic pole magnets made of such as rare-earth magnets having a higher magnetic flux density,
the X magnetic poles are composed of N magnetic pole magnets made of such as ferrite magnets which are lesser in material cost, though being lower in a magnetic flux density, and
the N magnetic poles are composed of soft magnetic members having a higher saturation flux density.

10. The brushless electric motor of claim 1, comprising
winding switching means WCA for switching the number of windings of the A-phase winding; and
winding switching means WCB for switching the number of windings of the B-phase winding WB.

11. The brushless electric motor of claim 1, wherein the stator is composed of a soft magnetic member part of which or all of which is produced as magnetic steel sheets which are bent.

12. The brushless electric motor of claim 1, wherein the stator is composed of a soft magnetic member part of which or all of which is a powder magnetic core produced by performing compression molding with soft magnetic powder.

13. The brushless electric motor of claim 1, wherein the N magnetic poles, the S magnetic poles, and the X magnetic poles of the rotor are disk-shaped permanent magnets.

14. The brushless electric motor of claim 13, comprising a control circuit for controlling drive of the motor, the control circuit having a configuration of which 50% or more portion is arranged radially inside a soft magnetic member of the stator.

15. The brushless electric motor of claim 13, wherein the disk-shaped permanent magnets have outer diameters larger than inner diameters of the A-phase windings WA or inner diameters of the B-phase windings WB.

16. The brushless electric motor of claim 1, comprising:
a DC power source PS1;
a transistor TR1 connected in series to both the DC power source PS1 and the A-phase winding WA;
a transistor TR2 connected in series to both the DC power source PS1 and the A-phase winding WA;
a transistor TR3 connected in series to both the DC power source PS1 and the B-phase winding WB; and
a transistor TR4 connected in series to both the DC power source PS1 and the B-phase winding WB,
wherein the transistors TR1 and TR2 are controlled to supply DC current IA to the A-phase winding WA for control thereof and the transistors TR3 and TR4 are controlled to supply DC current IB to the B-phase winding WB for control thereof.

17. The brushless electric motor of claim 1, comprising:
a DC power source PS2;
a DC power source PS3 connected in series to the DC power source PS2;
a transistor TR5 connected in series to both the DC power source PS2 and the A-phase winding WA;
a diode 1 connected in series to both the A-phase winding WA and the DC power source PS3;
a transistor TR6 connected in series to both the DC power source PS2 and the B-phase winding WB; and
a diode 2 connected in series to both the B-phase winding WB and the DC power source PS3,
wherein the transistor TR5 is controlled to supply DC current IA to the A-phase winding WA for control thereof and the transistor TR6 is controlled to supply DC current IB to the B-phase winding WB for control thereof.

18. The brushless electric motor of claim 1, comprising:
a DC power source PS2;
a DC power source PS3 connected in series to the DC power source PS2;
a transistor TR7 connected in series to both the DC power source PS2 and the A-phase winding WA;
a diode 3 arranged to regenerate energy of the A-phase winding WA to the DC power source PS3 when the transistor TR7 is turned an on-state thereof, which provides an energization state, to an off-state thereof, which provides an interrupt state;
a transistor TR8 connected in series to both the DC power source PS3 and the B-phase winding WB; and
a diode 4 arranged to regenerate energy of the B-phase winding WB to the DC power source PS2 when the transistor TR8 is turned an on-state thereof, which provides an energization state, to an off-state thereof, which provides an interrupt state,
wherein the transistor TR7 is controlled to supply DC current IA to the A-phase winding WA for control thereof and the transistor TR8 is controlled to supply DC current IB to the B-phase winding WB for control thereof.

19. The brushless electric motor of claim 1, comprising:
a DC power source PS1;
a transistor TR9 connected in series to the A-phase winding WA;
a winding WAX wound in a slot which is the same as a slot in which the A-phase winding WA is wound;
a diode 5 connected in series to both the winding WAX and the DC power source PS1;
a transistor TR10 connected in series to the B-phase winding;
a winding WBX wound in a slot which is the same as a slot in which the B-phase winding WB is wound; and
a diode 6 connected in series to both the winding WBX and the DC power source PS1,
wherein the transistor TR9 is controlled to control DC current IA passing through the A-phase winding WA and the transistor TR10 is controlled to control DC current IB passing through the B-phase winding WB.

20. The brushless electric motor of claim 1, wherein
the A-phase winding WA or the B-phase winding WB is
  composed of windings WX3, WX4 wound parallel to
  each other in the same slot,
the winding WX3 is connected in series to the transistor
  TR11,
the transistor TR11 is connected parallel to the diode D7,
the winding WX4 is connected in series to the transistor
  TR12, and
the diode D8 is connected parallel to the transistor TR12.

* * * * *